US012803852B2

(12) United States Patent
Wang

(10) Patent No.: US 12,803,852 B2
(45) Date of Patent: Nov. 17, 2026

(54) ECP TIMESLOT DETERMINATION METHOD, USER EQUIPMENT, AND NETWORK SIDE DEVICE

(71) Applicant: DATANG MOBILE COMMUNICATIONS EQUIPMENT CO., LTD., Beijing (CN)

(72) Inventor: Junwei Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 273 days.

(21) Appl. No.: 18/691,458

(22) PCT Filed: May 20, 2022

(86) PCT No.: PCT/CN2022/094208

§ 371 (c)(1),
(2) Date: Mar. 13, 2024

(87) PCT Pub. No.: WO2023/040328

PCT Pub. Date: Mar. 23, 2023

(65) Prior Publication Data

US 2024/0388485 A1 Nov. 21, 2024

(30) Foreign Application Priority Data

Sep. 14, 2021 (CN) ........................ 202111084150.1

(51) Int. Cl.
*H04L 27/26* (2006.01)
*H04W 56/00* (2009.01)
*H04W 72/0446* (2023.01)

(52) U.S. Cl.
CPC ..... *H04L 27/2605* (2013.01); *H04W 56/0015* (2013.01); *H04W 72/0446* (2013.01)

(58) Field of Classification Search
None
See application file for complete search history.

(56) References Cited

U.S. PATENT DOCUMENTS

2019/0191433 A1 6/2019 Park et al.
2020/0280398 A1* 9/2020 Hwang ................ H04L 1/1887
(Continued)

FOREIGN PATENT DOCUMENTS

CN 111988848 A 11/2020
CN 113303010 A 8/2021
(Continued)

OTHER PUBLICATIONS

Spreadtrum Communications, "Remaining issues in synchronization mechanism for NR V2X", 3GPP TSG RAN WG1 #100-e, e-Meeting, Feb. 24-Mar. 6, 2020, total 8 pages, R1-2000423.
(Continued)

*Primary Examiner* — Benjamin Lamont
(74) *Attorney, Agent, or Firm* — KILPATRICK TOWNSEND & STOCKTON LLP

(57) ABSTRACT

The present disclosure relate to an ECP timeslot determination method, a user equipment (UE), and a network side device. The method includes a UE determines, according to an indication of a network side device, whether ECP timeslot indication information indicates a timeslot comprising an SSB; and the UE determines, according to the determination result of whether ECP timeslot indication information indicates a timeslot comprising an SSB and the ECP timeslot indication information, an ECP timeslot within a preset unit length sent by the network side device. According to the described method, ECP timeslot indication information may indicate a timeslot comprising an SSB and may not indicate a timeslot comprising an SSB; and a UE flexibly determines, and an indication of a network side device, whether ECP timeslot indication information indicates a timeslot compris-
(Continued)

ing an SSB, and therefore accurately determines, according to the described determination result and the ECP timeslot indication information.

18 Claims, 26 Drawing Sheets

(56) References Cited

U.S. PATENT DOCUMENTS

2022/0086832 A1* 3/2022 Shao ..................... H04L 5/0007
2023/0015843 A1* 1/2023 Li ..................... H04W 74/0891

FOREIGN PATENT DOCUMENTS

WO 2020233420 A1 11/2020
WO 2021159344 A1 8/2021

OTHER PUBLICATIONS

European Patent Office, Extended European Search Report Issued in Application No. 22868705.9, Nov. 18, 2024, Germany, 126 pages.
Office Action of Corresponding CN Patent Application No. 202111084150.1 Dated May 29, 2025.
The Office Action received in the counterpart European Application 22868705.9, mailed on Sep. 1, 2026.

* cited by examiner

ECP TIMESLOT DETERMINATION METHOD, USER EQUIPMENT, AND NETWORK SIDE DEVICE

CROSS REFERENCE TO RELATED APPLICATION

The application is a US National Stage of International Application No. PCT/CN2022/094208, filed on May 20, 2022, which claims the priority of Chinese patent application No. 202111084150.1, filed with China National Intellectual Property Administration on Sep. 14, 2021 and entitled "ECP Slot Determination Method, User Equipment, and Network Side Device". The entire contents of which are incorporated herein by reference.

FIELD

The disclosure relates to the field of microfluidic technology, and in particular to a method for determining an ECP, a user equipment, and a network side device.

BACKGROUND

With the development of communication technology, it is necessary to support video streaming services with a higher rate, and a broadcast mode can be used for video streaming service transmission, that is, video streaming services can be received without user equipment feedback information. A single frequency network (SFN) technology can effectively improve service transmission efficiency. Although the SFN technology can improve the service transmission rate and user coverage, it needs the support of Extended Cyclic Prefix (ECP). When the slot for data transmission is an ECP slot, it needs to notify the user equipment to allow the user equipment to receive data according to the relevant parameters of ECP.

In the LTE system, a transmission position of the synchronization signal block (Synchronous signaling block, SSB) is fixed. A slot including the initial access signal and a slot for unicast scheduling are the Normal Cyclic Prefix (Normal Cyclic Prefix, NCP) slot in default, and an indication is used for indicating whether a slot is the ECP slot, but the indication is invalid for the slot that include initial access signal transmission and the slot for unicast scheduling.

In a New Radio (NR) system, a radio frame includes multiple candidate positions, and any one or more of the candidate positions are used for the SSB transmission. The above method of determining the ECP slot is not applicable to the NR system.

SUMMARY

The disclosure provides a method for determining an ECP slot, a user equipment and a network side device, to solve the problem of determining an ECP slot in an NR system.

In a first aspect, some embodiments of the disclosure provide an ECP slot determination method, applied to a user equipment, UE, and the method includes:

- determining whether an ECP slot indication is valid for a slot carrying an SSB according to an instruction from a network side device;
- determining an ECP slot within a preset unit length sent from the network side device according to a determination result of whether the ECP slot indication is valid for the slot carrying the SSB and the ECP slot indication.

In an optional implementation, the determining whether the ECP slot indication is valid for the slot carrying the SSB according to the instruction from the network side device, includes:

- in response to receiving a higher layer signaling including configuration information sent from the network side device, determining whether the ECP slot indication is valid for the slot carrying the SSB according to the configuration information.

In an optional implementation, the determining whether the ECP slot indication is valid for the slot carrying the SSB according to the instruction from the network side device, includes:

- in response to receiving a higher layer signaling not including configuration information from the network side device, determining whether the ECP slot indication is valid for the slot carrying the SSB based on a default rule;
- where the default rule is that the ECP slot indication is valid for the slot carrying the SSB, or the ECP slot indication is invalid for the slot carrying the SSB.

In an optional implementation, the determining whether the ECP slot indication is valid for the slot carrying the SSB according to the instruction from the network side device, includes:

- for any preset unit length, determining whether a total quantity of sub-indications in the ECP slot indication of the preset unit length is greater than a first preset quantity; where the sub-indication is configured to indicate whether a corresponding slot is the ECP slot;
- in response to the total quantity of sub-indication in the ECP slot indication of the preset unit length being greater than the first preset quantity, determining that the ECP slot indication is valid for the slot carrying the SSB; in response to the total quantity of sub-indication in the ECP slot indication of the preset unit length not being greater than the first preset quantity, determining that the ECP slot indication is invalid for the slot carrying the SSB.

In an optional implementation, the first preset quantity is a difference between a total quantity of slots within the preset unit length and a slot adjustment amount.

In an optional implementation, the determining whether the ECP slot indication is valid for the slot carrying the SSB according to the instruction from the network side device, includes:

- for any preset unit length, in response to receiving one ECP slot indication corresponding to the preset unit length, determining that the ECP slot indication is invalid for the slot carrying the SSB;
- in response to receiving two ECP slot indications corresponding to the preset unit length, determining that a first ECP slot indication is invalid for the slot carrying the SSB, and a second ECP slot indication is valid for the slot carrying the SSB.

In an optional implementation, a sum of the total quantity of sub-indications in the first ECP slot indication and a total quantity of sub-indications in the second ECP slot indication is a total quantity of slots within the preset unit length; where the sub-indication is configured to indicate whether the corresponding slot is the ECP slot.

In an optional implementation, determining the ECP slot(s) within the preset unit length sent from the network side device based on the determination result of whether the ECP slot indication is valid for the slot carrying the SSB and the ECP slot indication, includes:

for any preset unit length, in response to the ECP slot indication being invalid for the slot carrying the SSB, determining a first slot that can be indicated within the preset unit length from the slots not carrying the SSB within the preset unit length according to a sequence of slots not carrying the SSB within the preset unit length and a preset indication rule; in response to the ECP slot indication being valid for the slot carrying the SSB, determining the first slot that can be indicated within the preset unit length from all slots within the preset unit length according to a sequence of all slots within the preset unit length and the preset indication rule;

determining a sub-indication corresponding to each first slot within the preset unit length according to a sequence of first slots within the preset unit length and the ECP slot indication for the preset unit length; where the ECP slot indication includes a plurality of sub-indications, and the sub-indication is configured to indicate whether a corresponding slot is the ECP slot;

for any first slot within the preset unit length, in response to the sub-indication indicating that the corresponding slot is the ECP slot, determining that the first slot is the ECP slot.

In an optional implementation, in response to the ECP slot indication being invalid for the slot carrying the SSB, and a total quantity of sub-indication in the ECP slot indication of the preset unit length is greater than a total quantity of first slots within the preset unit length, the method further includes:

determining a remaining sub-indication corresponding to part or all of the first slots within a next preset unit length according to a sequence of the first slots within the next preset unit length; and/or determining a remaining sub-indication corresponding to part or all of second slots according to a sequence of second slots within the preset unit length, where the second slot is a slot other than the first slot among the slots not carrying the SSB in the preset unit length;

where the remaining sub-indication is a sub-indication that does not have a corresponding first slot in the ECP slot indication for the preset unit length.

In an optional implementation, the first slots within the preset unit length and the sub-indication corresponding to each first slot are determined in sequential order; or the first slots within the preset unit length and the sub-indication corresponding to each first slot are determined in reverse order.

In an optional implementation, if the ECP slot indication is valid for the slot carrying the SSB, after determining the slot carrying the SSB as the ECP slot, the method further includes:

determining a position symbols used for NCP based on an SSB position symbol in the slot carrying the SSB.

In an optional implementation, the determining position symbol used for the NCP based on the SSB position symbol in the slot carrying the SSB, includes:

determining the SSB position symbol in the slot carrying the SSB as the position symbol used for the NCP; or determining each of all position symbols in a half, where the SSB position symbol is located, of the slot carrying the SSB as the position symbol used for the NCP.

In an optional implementation, the determining the position symbol used for the NCP based on the SSB position symbol in the slot carrying the SSB, further includes:

determining a position symbol of PDCCH for sending a system broadcast message in the slot carrying the SSB as the position symbol used for the NCP.

In an optional implementation, before determining the slots within the preset unit length sent from the network side device based on a determination result of whether the ECP slot indication is valid for the slot carrying the SSB and the ECP slot indication, the method further includes:

determining the slot carrying the SSB and/or the slot not carrying the SSB within the preset unit length.

In the second aspect, embodiments of the disclosure provide a method for determining an ECP slot, applied to a network side device, and includes:

sending an ECP slot indication for a preset unit length to a UE according to whether the ECP slot indication is valid for a slot carrying an SSB.

In an optional implementation, the method further includes:

sending a higher layer signaling including configuration information to the UE;

where the configuration information indicates that the ECP slot indication is valid for the slot carrying the SSB; or the configuration information indicates that the ECP slot indication is invalid for the slot carrying the SSB.

In an optional implementation, the method further includes:

sending a higher layer signaling that does not include configuration information to the UE, and the higher layer signaling that does not include configuration information is configured to instruct the UE to determine whether the ECP slot indication is valid for the slot carrying the SSB based on a default rule; where the default rule is that the ECP slot indication is valid for the slot carrying the SSB, or the ECP slot indication is invalid for the slot carrying the SSB.

In an optional implementation, the sending the ECP slot indication for the preset unit length to the UE according to whether the ECP slot indication is valid for the slot carrying the SSB, includes:

in response to that the ECP slot indication is valid for the slot carrying the SSB, configuring the ECP slot indication in such a way that a total quantity of sub-indications in the ECP slot indication is greater than a first preset quantity; otherwise, configuring the ECP slot indication in such a way that the total quantity of sub-indication is not greater than the first preset quantity;

where the sub-indication is configured to indicate whether a corresponding slot is the ECP slot.

In an optional implementation, the first preset quantity is a difference between a total quantity of slots within the preset unit length and a slot adjustment amount.

In an optional implementation, the sending the ECP slot indication for the preset unit length to the UE according to whether the ECP slot indication is valid for the slot carrying the SSB, includes:

in response to the ECP slot indication being valid for the slot carrying the SSB, configuring, for the preset unit length, a first ECP slot indication being invalid for the slot carrying the SSB, and a second ECP slot indication being valid for the slot carrying the SSB; and sending the second ECP slot indication to the UE after sending the first ECP slot indication to the UE;

in response to the ECP slot indication being invalid for the slot carrying the SSB, configuring one ECP slot indication for the preset unit length.

In an optional implementation, a sum of the total quantity of sub-indications in the first ECP slot indication and a total quantity of sub-indications in the second ECP slot indication is a total quantity of slots within the preset unit length; where the sub-indication is configured to indicate whether the corresponding slot is the ECP slot.

In an optional implementation, the sending the ECP slot indication for the preset unit length to the UE according to whether the ECP slot indication is valid for the slot carrying the SSB, includes:

for any preset unit length: in response to the ECP slot indication being invalid for the slot carrying the SSB, determining, from slots not carrying the SSB within the preset unit length, a first slot indicatable within the preset unit length according to a sequence of the slots not carrying the SSB within the preset unit length and a preset indication rule; in response to the ECP slot indication being valid for the slot carrying the SSB, determining, from all slots within the preset unit length, the first slot indicatable within the preset unit length according to a sequence of the all slots within the preset unit length and the preset indication rule;

determining a sub-indication corresponding to each first slot within the preset unit length based on whether each first slot within the preset unit length is the ECP slot; where the sub-indication is configured to indicate whether a corresponding slot is the ECP slot;

determining the ECP slot indication for the preset unit length based on the sub-indication corresponding to each first slot within the preset unit length.

In an optional implementation, if the ECP slot indication is invalid for the slot carrying the SSB, determining the ECP slot indication for the preset unit length according to the sub-indication corresponding to each first slot within the preset unit length, includes:

determining the ECP slot indication for the preset unit length, based on the sub-indication corresponding to each first slot in the preset unit length and remaining sub-indication(s) corresponding to part or all of first slots in a next preset unit length; and/or determining the ECP slot indication for the preset unit length, based on the sub-indication corresponding to each first slot in the preset unit length, and remaining sub-indication(s) corresponding to part or all of second slots, where the second slot is a slot other than the first slot among the slots not carrying the SSB within the preset unit length.

In an optional implementation, the first slots within the preset unit length and the ECP slot indication are determined in sequential order; or both the first slots within the preset unit length and the ECP slot indication are determined in reverse order.

In an optional implementation, if the ECP slot indication is valid for the slot carrying the SSB, after determining that the slot carrying the SSB is the ECP slot, the method further includes:

determining the position symbol used for the NCP based on the SSB position symbol in the slot carrying the SSB.

In an optional implementation, determining the position symbol used for the NCP based on the SSB position symbol in the slot carrying the SSB, includes:

determining the SSB position symbol in the slot carrying the SSB as the position symbol used for the NCP; or determining each of all the position symbols in the half, where the SSB position symbol is located, of the slot carrying the SSB as the position symbol used for the NCP.

In an optional implementation, determining the position symbol used for the NCP based on the SSB position symbol in the slot carrying the SSB, further includes:

determining the position symbol of the PDCCH for sending the system broadcast message in the slot carrying the SSB as the position symbol used for the NCP.

In an optional implementation, before sending the ECP slot indication of the preset unit length to the UE according to whether the ECP slot indication is valid for the slot carrying the SSB, the method further includes:

determining the slot carrying the SSB and/or the slot not carrying the SSB within the preset unit length.

In a third aspect, embodiments of the disclosure provide a UE including a processor and a memory; where the memory is configured to store computer instructions;

the processor is configured to read the computer instructions and perform following operations:

determining whether a slot indication is valid for a slot carrying an SSB according to an instruction from a network side device;

determining an ECP slot for a preset unit length sent from the network side device according to a determination result of whether the ECP slot indication is valid for the slot carrying the SSB and the ECP slot indication.

In an optional implementation, the determining whether the ECP slot indication is valid for the slot carrying the SSB according to the instruction from the network side device, includes:

in response to receiving a higher layer signaling including configuration information sent from the network side device, determining whether the ECP slot indication is valid for the slot carrying the SSB according to the configuration information.

In an optional implementation, the determining whether the ECP slot indication is valid for the slot carrying the SSB according to the instruction from the network side device, includes:

in response to receiving a higher layer signaling not including configuration information from the network side device, determining whether the ECP slot indication is valid for the slot carrying the SSB based on a default rule;

where the default rule is that the ECP slot indication is valid for the slot carrying the SSB, or the ECP slot indication is invalid for the slot carrying the SSB.

In an optional implementation, the determining whether the ECP slot indication is valid for the slot carrying the SSB according to the instruction from the network side device, includes:

for any preset unit length, determining whether a total quantity of sub-indications in the ECP slot indication for the preset unit length is greater than a first preset quantity; where the sub-indication is configured to indicate whether the corresponding slot is the ECP slot;

in response to the total quantity of sub-indication in the ECP slot indication of the preset unit length being greater than the first preset quantity, determining that the ECP slot indication is valid for the slot carrying the SSB; in response to the total quantity of sub-indication in the ECP slot indication of the preset unit length not being greater than the first preset quantity, determining that the ECP slot indication is invalid for the slot carrying the SSB.

In an optional implementation, the first preset quantity is a difference between the total quantity of slots within the preset unit length and a slot adjustment amount.

In an optional implementation, the determining whether the ECP slot indication is valid for the slot carrying the SSB according to the instruction from the network side device, includes:

for any preset unit length, in response to receiving one ECP slot indication corresponding to the preset unit length, determining that the ECP slot indication is invalid for the slot carrying the SSB;

in response to receiving two ECP slot indications corresponding to the preset unit length, determining that a first ECP slot indication is invalid for the slot carrying the SSB, and a second ECP slot indication is valid for the slot carrying the SSB.

In an optional implementation, a sum of the total quantity of sub-indications in the first ECP slot indication and the total quantity of the sub-indications in the second ECP slot indication is the total quantity of slots within the preset unit length.

In an optional implementation, determining the ECP slot(s) within the preset unit length sent from the network side device based on the determination result of whether the ECP slot indication is valid for the slot carrying the SSB and the ECP slot indication, includes:

for any preset unit length, in response to the ECP slot indication being invalid for the slot carrying the SSB, determining a first slot indicatable within the preset unit length from the slots not carrying the SSB within the preset unit length according to a sequence of slots not carrying the SSB within the preset unit length and a preset indication rule; in response to the ECP slot indication being valid for the slot carrying the SSB, determining the first slot indicatable within the preset unit length from all slots within the preset unit length according to a sequence of all slots within the preset unit length and the preset indication rule;

determining a sub-indication corresponding to each first slot within the preset unit length according to a sequence of first slots within the preset unit length and the ECP slot indication for the preset unit length; where the ECP slot indication includes a plurality of sub-indications, and the sub-indication is configured to indicate whether a corresponding slot is the ECP slot;

for any first slot within the preset unit length, in response to the sub-indication indicating that the corresponding slot is the ECP slot, determining that the first slot is the ECP slot.

In an optional implementation, if the ECP slot indication is invalid for the slot carrying the SSB, and a total quantity of sub-indication in the ECP slot indication of the preset unit length is greater than a total quantity of first slots within the preset unit length, the method further includes:

determining remaining sub-indication(s) corresponding to part or all of the first slots within a next preset unit length according to the sequence of the first slots within the next preset unit length; and/or determine remaining sub-indication(s) corresponding to part or all of second slots according to a sequence of the second slots within the preset unit length, where the second slots are slots other than the first slot among the slots not carrying the SSB in the preset unit length;

where the remaining sub-indication is a sub-indication that does not have a corresponding first slot in the ECP slot indication of the preset unit length.

In an optional implementation, the first slots within the preset unit length and the sub-indication corresponding to each first slot are determined in sequential order; or the first slots within the preset unit length and the sub-indication corresponding to each first slot are determined in reverse order.

In an optional implementation, if the ECP slot indication is valid for the slot carrying the SSB, after determining the slot carrying the SSB as the ECP slot, the method further includes:

determining a position symbol used for NCP based on an SSB position symbol in the slot carrying the SSB.

In an optional implementation, the determining position symbol used for the NCP based on the SSB position symbol in the slot carrying the SSB, includes:

determining the SSB position symbol in the slot carrying the SSB as the position symbol used for the NCP; or determining each of all position symbols in a half, where the SSB position symbol is located, of the slot carrying the SSB as the position symbol used for the NCP.

In an optional implementation, the determining position symbol used for the NCP based on the SSB position symbol in the slot carrying the SSB, further includes:

determining a position symbol of PDCCH for sending a system broadcast message in the slot carrying the SSB as the position symbol used for the NCP.

In an optional implementation, before determining the slot within the preset unit length sent from the network side device based on the determination result of whether the ECP slot indication is valid for the slot carrying the SSB and the ECP slot indication, the method further includes:

determining the slot carrying the SSB and/or the slot not carrying the SSB within the preset unit length.

In a fourth aspect, embodiments of the disclosure provide a network side device including a processor and a memory; where the memory stores computer instructions;

the processor is configured to read the computer instructions and perform following operations:

sending an ECP slot indication for a preset unit length to a UE according to whether the ECP slot indication is valid for the slot carrying an SSB.

In an optional implementation, the operations further include:

sending a higher layer signaling including configuration information to the UE;

where the configuration information indicates that the ECP slot indication is valid for the slot carrying the SSB; or the configuration information indicates that the ECP slot indication is invalid for the slot carrying the SSB.

In an optional implementation, the operations further includes:

sending a higher layer signaling that does not includes configuration information to the UE, and the higher layer signaling that does not includes configuration information is configured to instruct the UE to determine whether the ECP slot indication is valid for the slot carrying the SSB based on the default rule; where the default rule is that the ECP slot indication is valid for the slot carrying the SSB, or the ECP slot indication is invalid for the slot carrying the SSB.

In an optional implementation, sending the ECP slot indication of the preset unit length to the UE according to whether the ECP slot indication is valid for the slot carrying the SSB, includes:

in response to the ECP slot indication is valid for the slot carrying the SSB, configuring the ECP slot indication in such a way that a total quantity of sub-indications is greater than a first preset quantity; otherwise, configuring the ECP slot indication in such a way that the total quantity of sub-indication is not greater than the first preset quantity;

where the sub-indication is configured to indicate whether a corresponding slot is the ECP slot.

In an optional implementation, the first preset quantity is a difference between a total quantity of slots within the preset unit length and a slot adjustment amount.

In an optional implementation, sending the ECP slot indication for the preset unit length to the UE according to whether the ECP slot indication is valid for the slot carrying the SSB, includes:

in response to the ECP slot indication being valid for the slot carrying the SSB, configuring, for the preset unit length, a first ECP slot indication being invalid for the slot carrying the SSB, and a second ECP slot indication being valid for the slot carrying the SSB; and sending the second ECP slot indication to the UE after sending the first ECP slot indication to the UE;

in response to the ECP slot indication being invalid for the slot carrying the SSB, configuring one ECP slot indication corresponding to the preset unit length.

In an optional implementation, a sum of the total quantity of sub-indications in the first ECP slot indication and a total quantity of sub-indications in the second ECP slot indication is a total quantity of slots within the preset unit length; where the sub-indication is configured to indicate whether the corresponding slot is an ECP slot.

In an optional implementation, sending the ECP slot indication for the preset unit length to the UE according to whether the ECP slot indication is valid for the slot carrying the SSB, includes:

for any preset unit length, in response to the ECP slot indication being invalid for the slot carrying the SSB, determining a first slot that can be indicated within the preset unit length according to a sequence of the slots not carrying the SSB within the preset unit length and a preset indication rule, from the slots not carrying the SSB within the preset unit length; in response to the ECP slot indication being valid for the slot carrying the SSB, determining a first slot that can be indicated within the preset unit length according to a sequence of all slots within the preset unit length and a preset indication rule from all slots within the preset unit length;

determining a sub-indication corresponding to each first slot within the preset unit length based on whether each first slot within the preset unit length is the ECP slot; where the sub-indication is configured to indicate whether a corresponding slot is the ECP slot;

determining the ECP slot indication for the preset unit length based on the sub-indication corresponding to each first slot within the preset unit length.

In an optional implementation, if the ECP slot indication is invalid for the slot carrying the SSB, and a total quantity of sub-indications in the ECP slot indication of the preset unit length is greater than a total quantity of first slots within the preset unit length, the method further includes:

determining remaining sub-indication(s) corresponding to part or all of the first slots within a next preset unit length according to the sequence of the first slots within the next preset unit length; and/or determine remaining sub-indication(s) corresponding to part or all of second slots according to a sequence of the second slots within the preset unit length, and the second slots are slots not carrying the SSB in the preset unit length and other than the first slots.

In an optional implementation, the first slots within the preset unit length and the sub-indication corresponding to each first slot are determined in sequential order; or the first slots within the preset unit length and the sub-indication corresponding to each first slot are determined in reverse order.

In an optional implementation, in response to the ECP slot indication being valid for the slot carrying the SSB, after determining that the slot carrying the SSB is the ECP slot, the method further includes:

determining a position symbol used for NCP, based on an SSB position symbol in the slot carrying the SSB.

In an optional implementation, the determining position symbol used for the NCP based on the SSB position symbol in the slot carrying the SSB, includes:

determining the SSB position symbol in the slot carrying the SSB as the position symbol used for the NCP; or determining each of all position symbols in a half, where the SSB position symbol is located, of the slot carrying the SSB as the position symbol used for the NCP.

In an optional implementation, the determining position symbol used for the NCP based on the SSB position symbol in the slot carrying the SSB, further includes:

determining a position symbol of PDCCH for sending a system broadcast message in the slot carrying the SSB as the position symbol used for the NCP.

In an optional implementation, before determining the slot within the preset unit length sent from the network side device based on the determination result of whether the ECP slot indication is valid for the slot carrying the SSB and the ECP slot indication, the method further includes:

determining the slot carrying the SSB and/or the slot not carrying the SSB within the preset unit length.

In a fifth aspect, embodiments of the disclosure provide a UE including:

an indication determination module, configured to determine whether an ECP slot indication is valid for a slot carrying an SSB according to an instruction from a network side device; and/or an ECP slot determination module, configured to determine an ECP slot within a preset unit length sent from the network side device according to a determination result of whether the ECP slot indication is valid for the slot carrying the SSB and the ECP slot indication.

In a sixth aspect, embodiments of the disclosure provide a network side device including:

a sending module configured to send an ECP slot indication for a preset unit length to a UE according to whether an ECP slot indication is valid for a slot carrying an SSB.

In a seventh aspect, some embodiments of the disclosure provide a storage medium, storing computer-executable instructions, and the computer-executable instructions are used to cause a computer to execute the method in the first or second aspect.

In a solution provided by the above-mentioned embodiments of the disclosure, the ECP slot indication may be valid for the slot carrying the SSB, or may not be valid for the slot carrying the SSB, and the UE flexibly determines whether the ECP slot indication is valid for the slot carrying SSB according to the instruction from the network side device; and then according to the above determination result and the ECP slot indication, accurately determine the ECP slot(s) within the preset unit length sent from the network side device, which can be compatible with the flexibility of the existing design and guarantee network side devices are flexibly deployed.

BRIEF DESCRIPTION OF FIGURES

In order to more clearly illustrate the embodiments of the disclosure, the following will briefly introduce the drawings that need to be used in the description of the embodiments. The drawings in the following description are only some embodiments of the disclosure.

DETAILED DESCRIPTION

Figure 1:
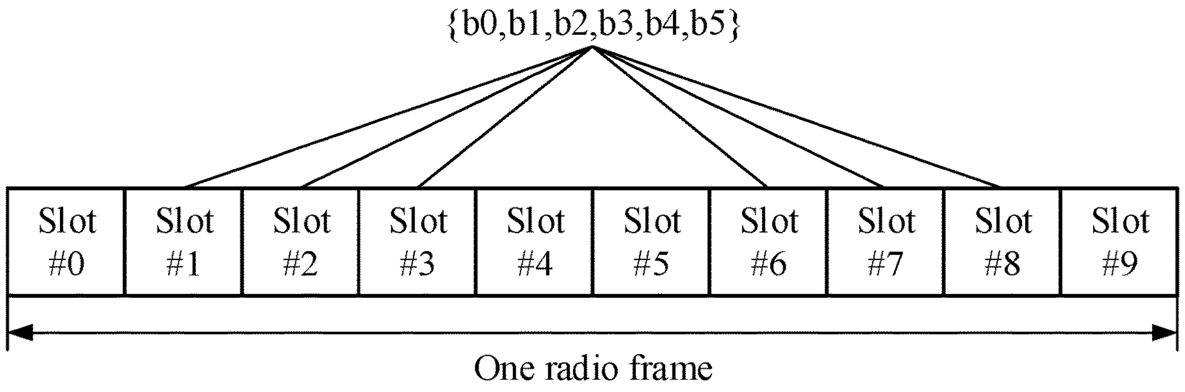
FIG. 1 is a schematic diagram of an indication of ECP slot in an LTE system provided by an embodiment of the disclosure.

In order to make the purpose, technical solution and advantages of the disclosure clearer, the disclosure will be further described in detail below in conjunction with the accompanying drawings. Apparently, the described embodiments are only some of the embodiments of the disclosure, not all of them.

Parts of the terms used in the embodiments of the disclosure are explained below to facilitate the understanding.

(1) In the embodiments of the disclosure, the terms "network" and "system" are often used interchangeably.

(2) The term "a plurality of" in the embodiments of the disclosure refers to two or more, and other quantifiers are similar.

(3) The terms "first" and "second" in the embodiments of the disclosure are only used for descriptive purposes, and cannot be understood as indicating or implying relative importance or implicitly indicating the quantity of indicated technical features. Thus, a feature defined as "first" and "second" may explicitly or implicitly indicates one or more of these features being included.

(4) "and/or" in the embodiment of the disclosure describes the association relationship of associated objects, indicating that there may be three kinds of relationships, for example, A and/or B, which may mean: A exists alone, A and B exist simultaneously, and B exists alone. The character "/" generally indicates that the contextual objects are an "or" relationship.

(5) The UE involved in the embodiment of the disclosure may be a device that provides voice and/or data connectivity to users, a handheld device with a wireless connection function, or other processing devices connected to a wireless modem. In different systems, the name of the UE may be different. The wireless UE can communicate with one or more core networks (CN) via the radio access network (RAN), and the wireless UE can be a mobile terminal device, such as a mobile phone (or called a "cellular" phone) and computers with mobile terminals, for example portable, pocket, hand-held, computer built-in or vehicle-mounted mobile devices, which exchange voice and/or data with the radio access network. For example, Personal Communication Service, PCS telephone, cordless telephone, Session Initiated Protocol, SIP telephone, Wireless Local Loop, WLL station, Personal Digital Assistant (PDA) and other devices. A wireless UE may also be called a system, a subscriber unit, a subscriber station, a mobile station, a mobile station, a remote station, an access point, a remote terminal, an access terminal, a user terminal, a user agent, and a user device are not limited in this embodiment of the disclosure.

(6) The network side device involved in the embodiment of the disclosure may be a base station, and the base station may include multiple cells providing services for the UE. Depending on the specific application, the base station can also be called an access point, or it can be a device in the access network that communicates with the wireless terminal device through one or more sectors on the air interface, or other names. The network side device can be used to replace received air frames with Internet Protocol (IP) packets, and serve as a router between the wireless terminal device and the rest of the access network, where the rest of the access network can include IP communication network. The network side device can also coordinate attribute management of the air interface. For example, the network side device involved in the embodiment of the disclosure may be a Global System for Mobile communications (GSM) or a network side device Base Transceiver Station (BTS) in Code Division Multiple Access (CDMA), may also be a network side device (NodeB) in Wide-band Code Division Multiple Access (WCDMA), and may also be an evolution network side device (eNB or e-NodeB) in a long term evolution, LTE system, a 5G base station (gNB) in the 5G network architecture (next generation system), or a Home evolved Node B (HeNB), a relay node, a home base station, a pico base station, etc., are not limited in this embodiment of the disclosure. In some network structures, the network side device may include a centralized unit (CU) node and a distributed unit (DU) node, and the centralized unit and the distributed unit may also be arranged geographically separately.

One or more antennas can be used between the network side device and the UE to perform Multi Input Multi Output (MIMO) transmission. The MIMO transmission can be single user MIMO (SU-MIMO) or multi user MIMO (MU-MIMO). According to the shape and number of root antenna combinations, the MIMO transmission can be 2D-MIMO, 3D-MIMO, FD-MIMO, or massive-MIMO, or diversity transmission, precoding transmission, or beamforming transmission, etc.

The technical solutions provided by the embodiments of the disclosure can be applied to various systems, especially 5G systems. For example, the applicable system may be global system of mobile communication (GSM) system, code division multiple access (CDMA) system, Wideband Code Division Multiple Access (WCDMA) general packet radio service (GPRS) system, long term evolution (LTE) system, long term evolution advanced (LTE-A) system, universal mobile telecommunications system (UMTS) Worldwide interoperability for microwave access (WiMAX) system, 5G NR system, etc. These various systems all include UE and network side device. The system may also include a core network part, such as an Evolved Packet System (EPS), a 5G system (5GS), and the like.

In the LTE system, the transmission position of the SSB is fixed. FIG. 1 illustrates by taking the case of subcarrier spacing (SCS) being 15 KHz and one radio frame as an example. In this radio frame, the transmission positions of SSB are in slot #0 and slot #5, slot #4 and slot #9 are used for unicast scheduling, and slot #0, slot #4, slot #5 and slot #9 are NCP slots by default. A 6-bit ECP slot indication is valid for whether a slot other than the slot including the initial access signal and the slot for unicast scheduling is an ECP slot. Referring to FIG. 1, in the ECP slot indication, b0 indicates whether slot #1 is an ECP slot, b1 indicates whether slot #2 is an ECP slot, b2 indicates whether slot #3 is an ECP slot, and b3 indicates whether slot #6 is an ECP slot, b4 indicates whether slot #7 is an ECP slot, and b5 indicates whether slot #8 is an ECP slot.

Figure 2A:
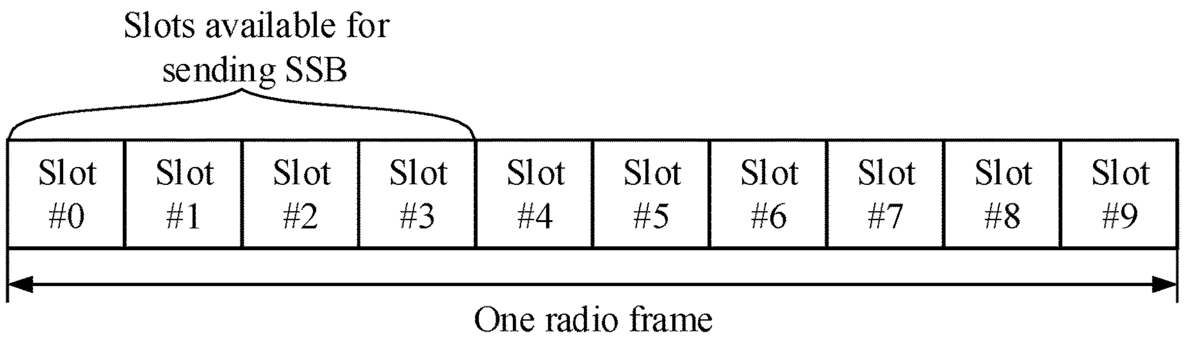
FIG. 2A is a schematic diagram of a radio frame in an NR system provided by an embodiment of the disclosure.
Figure 2B:
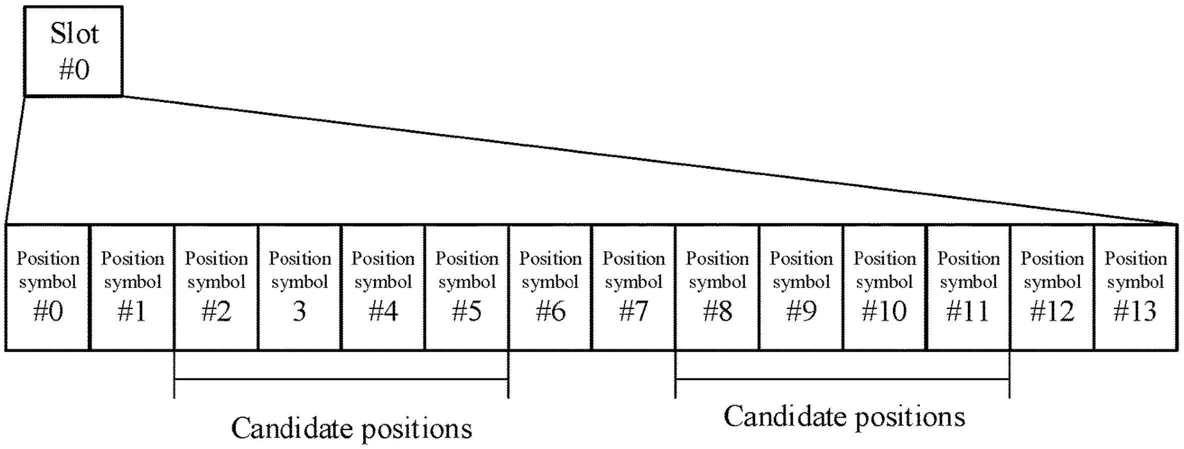
FIG. 2B is a schematic diagram of candidate positions for sending SSBs in a slot in the NR system provided by an embodiment of the disclosure.
Figure 2C:
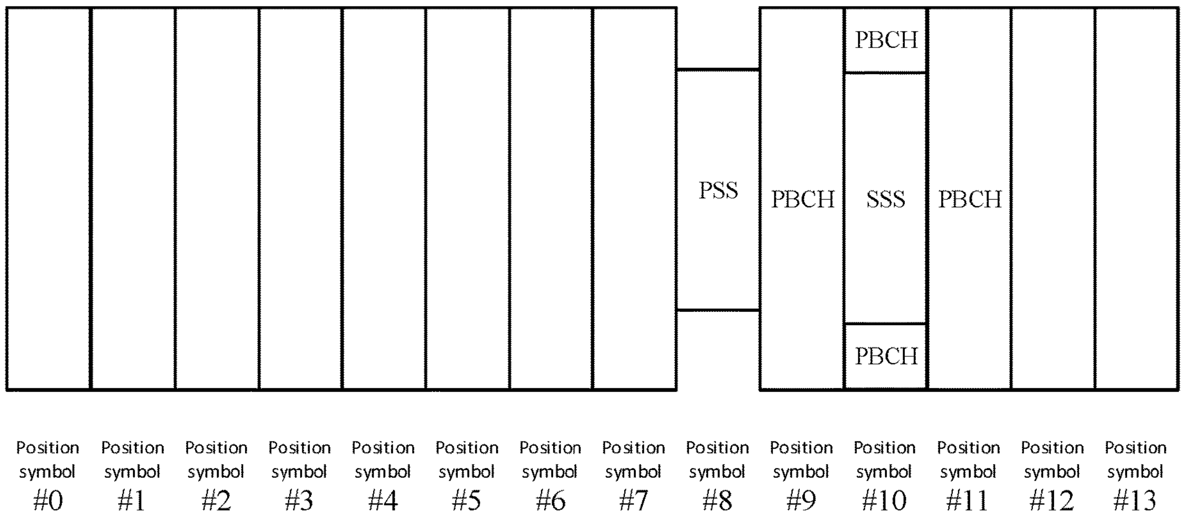
FIG. 2C is a schematic structural diagram of an SSB provided in an embodiment of the disclosure.

In the NR system, a radio frame includes multiple candidate positions. FIG. 2A takes the case of SCS-15 KHz and one radio frame as an example for illustration. There are slots #0 to #9 in the radio frame, and the four slots from slot #0 to slot #3 can be used for sending SSB. In addition, slot #0 to slot #3 each has 2 candidate positions for sending SSB. FIG. 2B takes slot #0 as an example, and slot #0 includes 14 position symbols indicated as position symbol #0 to position symbol #13. The position symbol #2 to the position symbol #5 form one candidate position for sending SSB, and the position symbol #8 to the position symbol #11 form another candidate position for sending SSB. Here, the SSB structure in position symbol #8 to position symbol #11 can be seen as shown in FIG. 2C. The SSB includes a Primary Synchronous Signal (PSS), a Second Synchronous Signal (SSS) and a Physical Broadcast Channel (PBCH). In addition to symbols behind the symbols for the PSS and SSS being for PBCH data, the symbols at two sides of the SSS symbol are also for PBCH data. When performing cell search, the UE performs a synchronization search according to the PSS/SSS, and receives PBCH after completing the synchronization search. According to the above-mentioned FIGS. 2A to 2C, it can be seen that there are at most 8 candidate positions for sending SSB in a radio frame. That is, SSB can be communicated through any one or more of the candidate positions, and the number of slots and position symbols for sending SSB are not fixed. Therefore, the above-mentioned manner of determining the ECP slot in the LTE system is not applicable to the NR system.

In order to solve the problem of determining the ECP slot in the NR system, the embodiment of the disclosure provides a method for determining an ECP slot, a user equipment, and a network side device. In the embodiments, the ECP slot indication may be valid for the slot carrying the SSB, or invalid for the slot carrying the SSB. The UE flexibly determines whether the ECP slot indication is valid for a slot carrying the SSB according to the instruction from the network side device; and then determines an ECP slot sent from the network side device within a preset unit length according to determination result and the ECP slot indication, which can be compatible with the flexibility of the existing design and ensure the flexible deployment of network side devices.

The embodiments of the disclosure may be applied to a 5G system, and may also be applied to other systems.

Embodiments of the disclosure will be described in detail below in conjunction with the accompanying drawings.

During the description, implementations by the UE and the network side device, and the implementation of cooperation between the UE and the network side device will be described. Such description does not mean that the UE and the network side device must be used together or must be used separately. In fact, when the UE and the network side device are used separately, they also solve the problems of the UE and the network side device respectively. When the UE and the network side device are used in combination, a better technical effect will be obtained.

Figure 3:
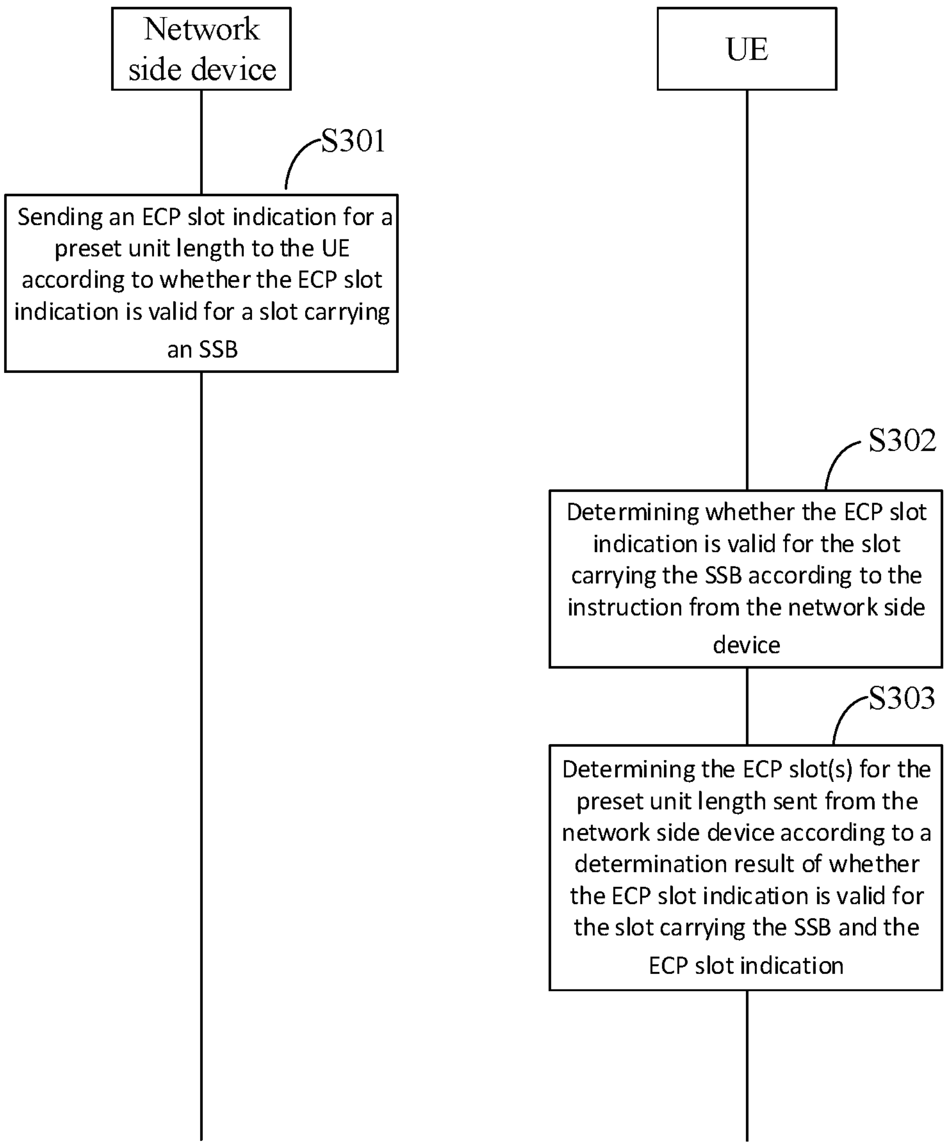
FIG. 3 is a flowchart of an interaction illustrating a first method for determining an ECP slot provided by an embodiment of the disclosure.

FIG. 3 is a first flowchart of interaction for a method of determining an ECP slot provided by the embodiment of the disclosure, as shown in FIG. 3, the method may include:

S301: sending, by a network side device, an ECP slot indication for a preset unit length to the UE according to whether the ECP slot indication is valid for a slot carrying an SSB.

In the NR system, the slot for sending SSB is more flexible, and SSB can be communicated through any one or more candidate positions. Therefore, the number of slots and position symbols for sending SSB are not fixed. Whether the ECP slot indication is valid for a slot carrying the SSB can also be flexibly set. Exemplarily, the network side device determines whether the ECP slot indication is valid for the slot carrying the SSB according to the service requirement.

During implementation, the network side device determines the ECP slot indication for a preset unit length to be sent to the UE according to whether the ECP slot indication is valid for a slot carrying the SSB or is invalid for a slot carrying the SSB. That is, for a preset unit length, an ECP slot indication being valid for a slot carrying an SSB and an ECP slot indication being invalid for a slot carrying an SSB are different.

In the embodiments, the above ECP slot indication includes a plurality of sub-indications, and each sub-indication is configured to indicate whether a corresponding slot is the ECP slot. That is, if the ECP slot indication is valid for a slot carrying the SSB, the ECP slot indication includes a sub-indication for indicating whether the slot carrying the SSB is an ECP slot; if the ECP slot indication is invalid for the slot carrying the SSB, the ECP slot indication does not include sub-indication for indicating whether the slot carrying the SSB is an ECP slot.

S302: determining, by the UE, whether the ECP slot indication is valid for the slot carrying the SSB according to an indication from the network side device.

As mentioned above, for a preset unit length, an ECP slot indication being valid for a slot carrying an SSB and an ECP slot indication being invalid for a slot carrying an SSB are different. Therefore, the UE needs to determine whether the ECP slot indication is valid for the slot carrying the SSB according to the indication from the network side device; and then the UE can accurately determine the ECP slot(s) within the preset unit length after receiving the slot(s) of the preset unit length.

S303: determining, by the UE, ECP slot(s) within the preset unit length sent from the network side device, according to a determination result of whether the ECP slot indication is valid for a slot carrying the SSB, and the ECP slot indication.

In the above solution, the ECP slot indication may be valid for a slot carrying the SSB, or may not be valid for a slot carrying the SSB, and the UE flexibly determines whether the ECP slot indication is valid for a slot carrying the SSB according to the instruction from the network side device, and the ECP slot(s) within the preset unit length sent from the network side device can be accurately determined according to the above determination result and the ECP slot indication, which can be compatible with the flexibility of the existing design and ensure the flexible deployment of the network side device.

Figure 4:
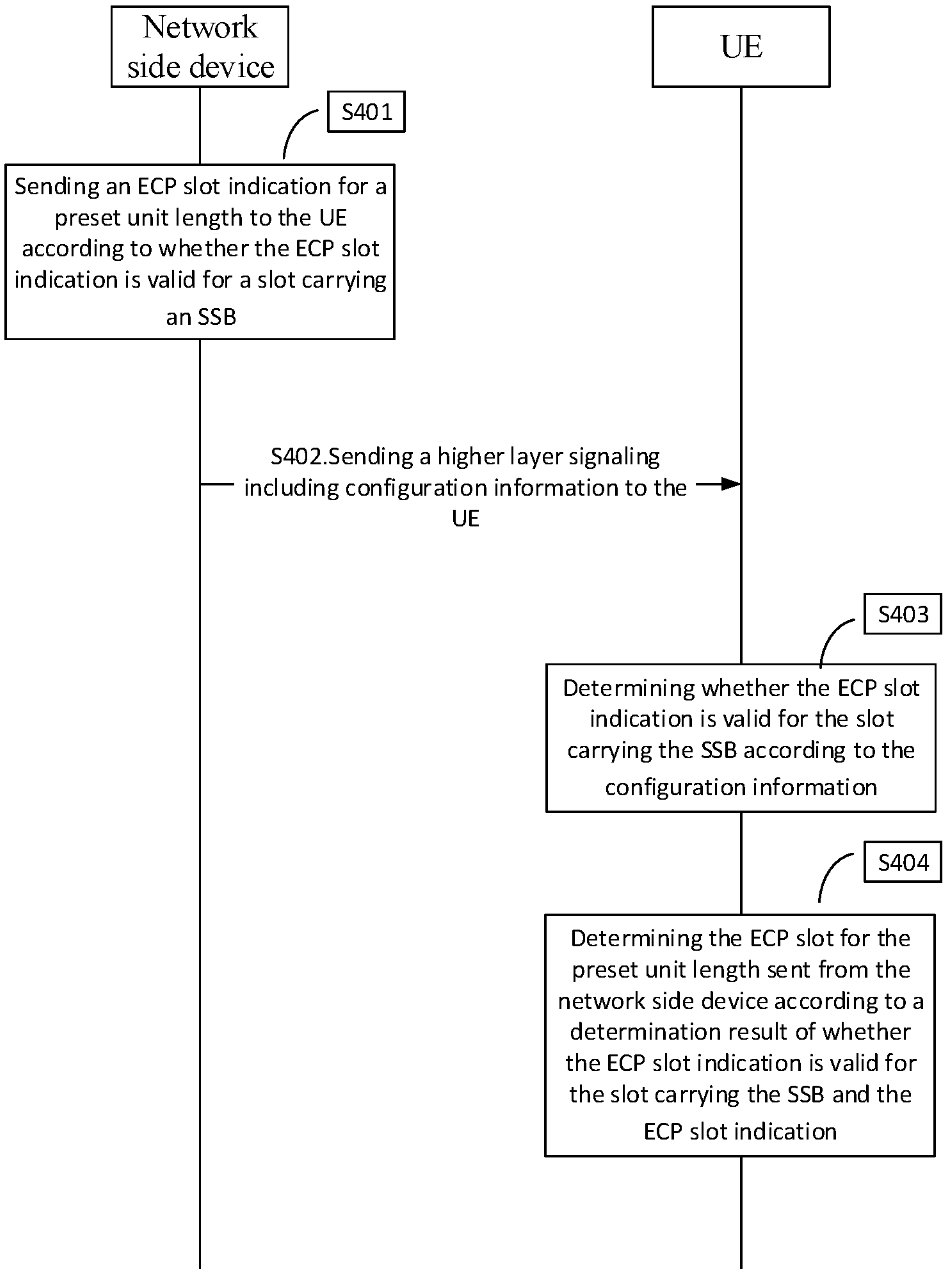
FIG. 4 is a flowchart of an interaction illustrating a second method for determining an ECP slot provided by an embodiment of the disclosure.

FIG. 4 is a second flowchart of interaction illustrating a method for determining the ECP slot provided by the embodiment of the disclosure, as shown in FIG. 4, the method may include:

S401: sending, by the network side device, an ECP slot indication for a preset unit length to the UE according to whether the ECP slot indication is valid for a slot carrying an SSB.

For a specific implementation manner of S401, reference may be made to the foregoing embodiments, and details are not repeated here.

S402: sending, by the network side device, a higher layer signaling including configuration information to the UE.

The above-mentioned higher layer signaling may be a system broadcast message communicated over a broadcast control channel, or a broadcast/multicast configuration message communicated over a multicast control channel, or a UE-based radio link control message, or a control message based on a media access layer, which is not specifically limited in the embodiment.

During implementation, configuration information may be added into the above-mentioned higher layer signaling, which is indicated as "isSSBslotinlcuded". Exemplarily, when "isSSBslotinlcuded" is configured as 1, it indicates that the ECP slot indication is valid for a slot carrying the SSB, that is, the ECP slot indication includes sub-indication for indicating whether the slot carrying the SSB is an ECP slot; when "isSSBslotinlcuded" is configured as 0, it means that the ECP slot indication is invalid for a slot carrying the SSB, that is, there is no sub-indication in the ECP slot indication for indicating whether the slot carrying the SSB is an ECP slot.

It can be understood that the above configuration of "isSSBslotinlcuded" is just an example. When "isSSBslotinlcuded" is configured as 1, it can indicate that the ECP slot indication is invalid for a slot carrying the SSB; when "isSSBslotinlcuded" is configured as 0, it can indicate that the ECP slot indication is valid for the slot carrying the SSB; or "isSSBslotinlcuded" can be configured as other values, which are not specifically limited in the disclosure, and can be configured according to actual application scenarios.

S403: determining, by the UE, whether the ECP slot indication is valid for a slot carrying an SSB according to the configuration information.

As mentioned above, the configuration value of the configuration information indicates whether the ECP slot indication is valid for a slot carrying the SSB. Correspondingly, the UE can determine whether the ECP slot indication is valid for a slot carrying the SSB according to the configuration information. For the specific configuration of the information, the above mentioned steps can be referred, which will not be repeated here.

S404: determining, by the UE, an ECP slot for the preset unit length sent from the network side device, according to a determination result of whether the ECP slot indication is valid for a slot carrying the SSB, and the ECP slot indication.

For a specific implementation manner of S404, reference may be made to the foregoing embodiments, and details are not repeated here.

In the above solution, the network side device adds configuration information to the higher layer signaling to make an explicit indication. The configuration information indicates whether the ECP slot indication is valid for a slot carrying the SSB. The UE can directly determine whether the ECP slot indication is valid for the slot carrying the SSB according to the configuration information.

Figure 5:
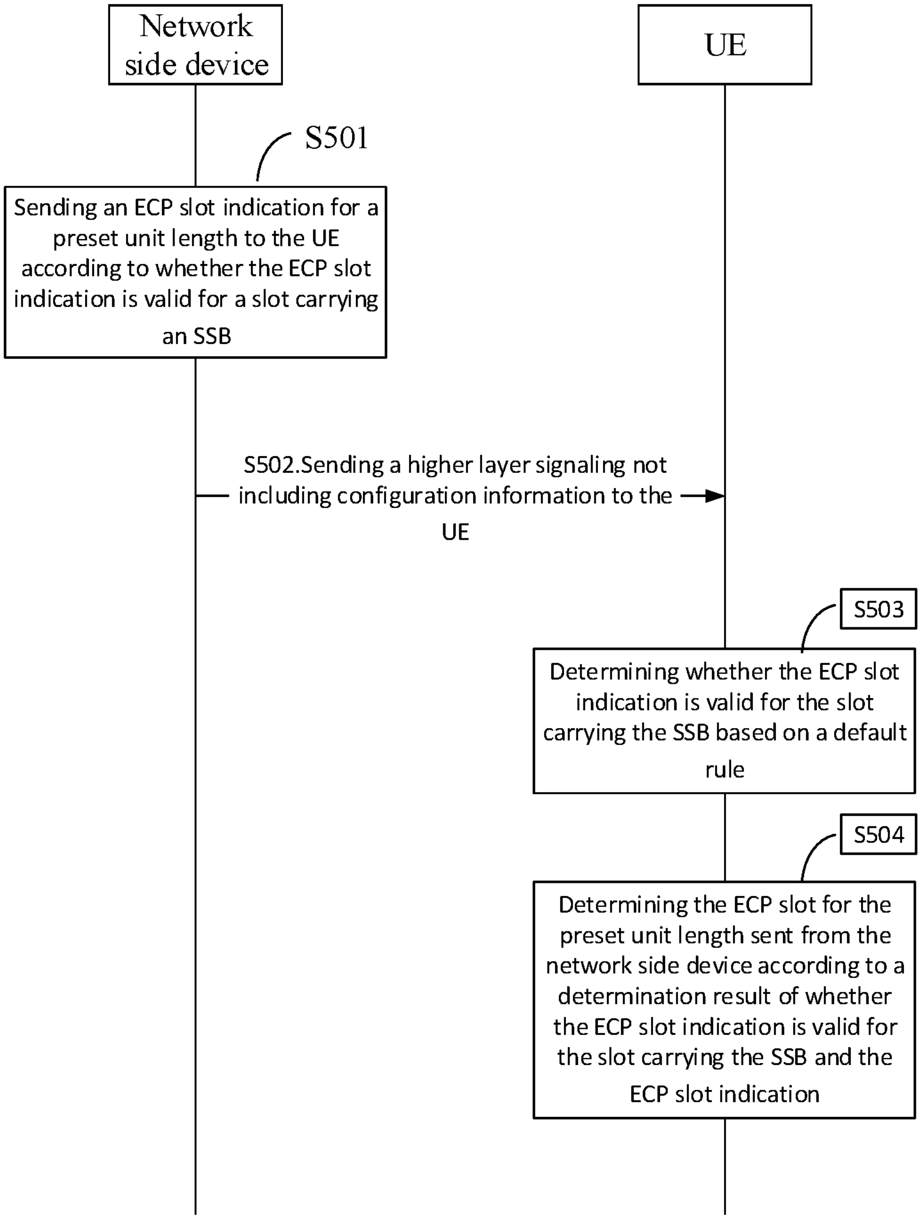
FIG. 5 is a flowchart of an interaction illustrating a third method for determining an ECP slot provided by an embodiment of the disclosure.

FIG. 5 is a third flowchart of interaction illustrating a method for determining an ECP slot provided in the embodiments of the disclosure, as shown in FIG. 5, the method may include:

S501: sending, by the network side device, an ECP slot indication for a preset unit length to the UE according to whether the ECP slot indication is valid for a slot carrying an SSB.

For a specific implementation manner of S501, reference may be made to the foregoing embodiments, and details are not repeated here.

S502: sending, by the network side device, a higher layer signaling not including configuration information to the UE.

Here, the specific implementation manner of the higher layer signaling may refer to the foregoing embodiments, which will not be repeated here.

During implementation, if the ECP slot indication being valid for whether the slot carrying the SSB is indicated based on a default rule, the network side device may send a higher layer signaling not including configuration information to the UE. The UE and the network side device follow the same default rule, and the default rule can be set according to the actual application scenario. In some optional embodiments, the default rule is that the ECP slot indication is valid for a slot carrying the SSB. In some other optional embodiments, the default rule is that the ECP slot indication is invalid for a slot carrying the SSB.

S503: determining, by the UE, whether the ECP slot indication is valid for the slot carrying the SSB based on a default rule.

When the network side device sends a higher layer signaling that does not include configuration information, it means that whether the ECP slot indication is valid for a slot carrying the SSB is determined based on a default rule. For example, the default rule is that the ECP slot indication is valid for the slot carrying the SSB. After receiving the higher layer signaling that does not include configuration information, the UE determines that the ECP slot indication is valid for the slot carrying the SSB; or, when the default rule is that the ECP slot indication is invalid for the slot carrying the SSB, and the UE determines that the ECP slot indication is invalid for the slot carrying the SSB, after receiving the higher layer signaling that does not include the configuration information.

S504: determining, by the UE, ECP slot(s) within the preset unit length sent from the network side device, according to a determination result of whether the ECP slot indication is valid for a slot carrying the SSB, and the ECP slot indication.

For a specific implementation manner of S504, reference may be made to the foregoing embodiments, and details are not repeated here.

In the above solution, the UE and the network side device follow the same default rule, and the network side device sends the higher layer signaling that does not include configuration information to the UE, and the UE determines whether the ECP slot indication is valid for a slot carrying the SSB based on the default rule, which can perform explicit instructions in a more convenient way to meet the needs of different application scenarios.

It can be understood that the above-mentioned embodiment in FIG. 4 can be combined with the embodiment in FIG. 5. That is, if it can be determined based on the default rule whether the ECP slot indication is valid for a slot carrying the SSB, the network side device sends a higher layer signaling that does not include the configuration information to the UE; otherwise, the network side device sends a higher layer signaling including the configuration information to the UE. For a specific implementation manner, reference may be made to the above-mentioned embodiment in FIG. 4 and the embodiment in FIG. 5, and details are not repeated here.

Figure 6:
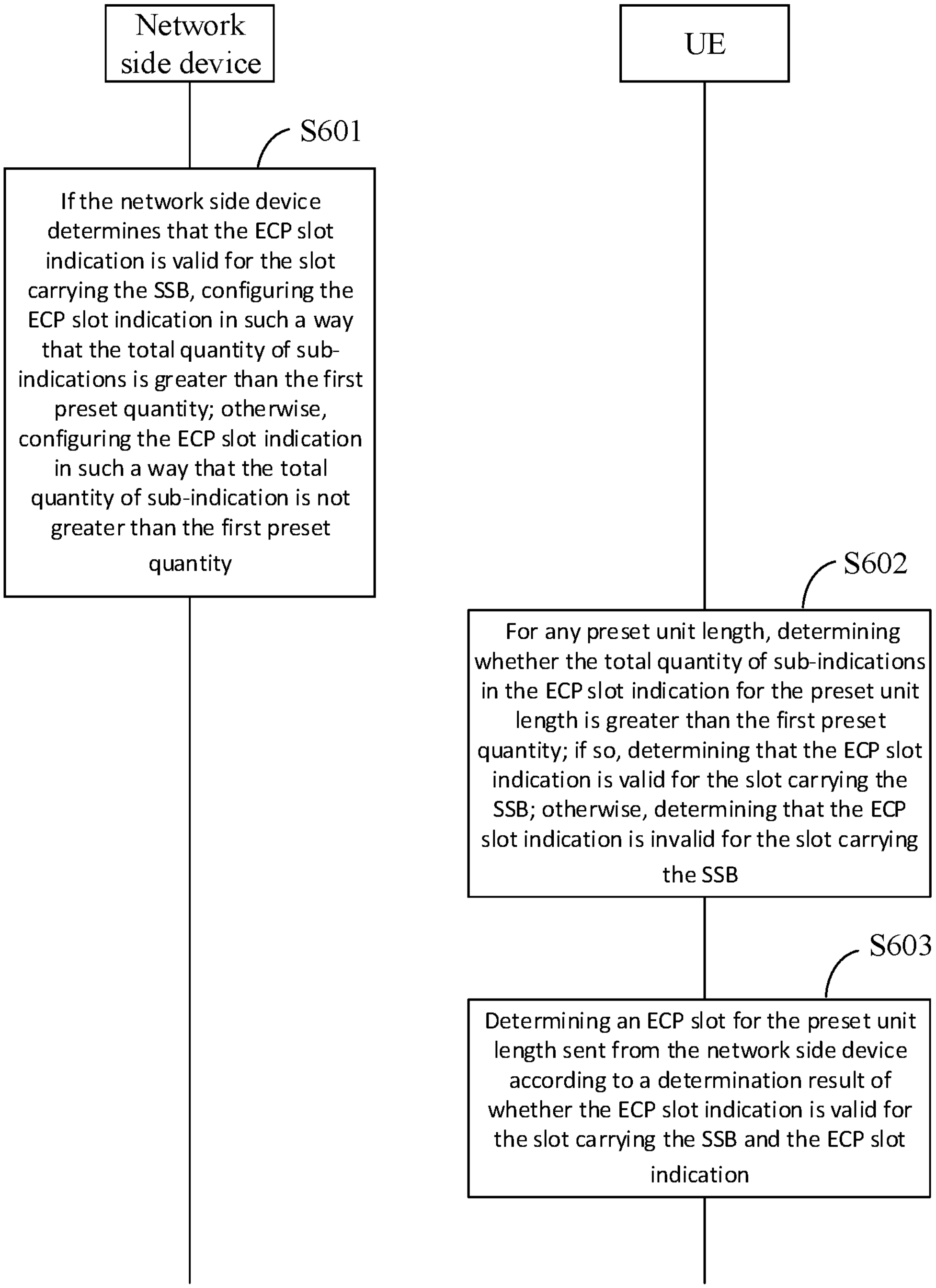
FIG. 6 is a flowchart of an interaction illustrating a fourth method for determining an ECP slot provided by an embodiment of the disclosure.

FIG. 6 is a fourth flowchart of interaction illustrating a method for determining an ECP slot provided by the embodiments of the disclosure, as shown in FIG. 6, the method may include:

S601: in response to determining that the ECP slot indication is valid for a slot carrying an SSB, configuring, by the network side device, an ECP slot indication in which a total quantity of sub-indications is greater than a first preset quantity; otherwise, configuring an ECP indication in which the total quantity of sub-indications is not greater than the first preset quantity.

As mentioned above, the sub-indication is configured to indicate whether a corresponding slot is an ECP slot.

In some optional embodiments, the first preset quantity is a difference between the total quantity of slots within the preset unit length and a slot adjustment amount. That is, the first preset quantity N1=slotduration−K, here, slotduration is the total quantity of slots within a preset unit length, and K is the slot adjustment amount.

Taking SCS=15 KHz and the preset unit length as one radio frame as an example, the total quantity of slots in the preset unit length is 10, that is, when SCS=15 KHz, there are 10 slots in one radio frame.

The above-mentioned slot adjustment amount can be 0, 1, 4, etc., and the embodiments do not specifically limit the determination method of the above-mentioned slot adjustment amount, for example:

1) the slot adjustment amount can be a value predetermined by the agreement;
2) the slot adjustment amount can be a value configured by the network side device for the UE;
3) the slot adjustment amount can be a value calculated according to the system message, for example, the number of slots occupied by the SSB sent from the network side device is used as the value of K according to the system message; or, a maximum number of slots carrying the SSB within the preset unit length is taken as the value of K.

The above methods for determining the slot adjustment amount are illustrated as examples. In implementation, as long as the UE determines the slot adjustment amount in the same way as the network-side device, the method is OK, no further examples are given here.

S602: For any preset unit length, determining, by the UE, whether the total quantity of sub-indications in the ECP slot indication for the preset unit length is greater than the first preset quantity; in response to determining that the total quantity of sub-indications in the ECP slot indication for the preset unit length is greater than the first preset number, determining that the ECP slot indication is valid for the slot carrying the SSB; in response to determining that the total quantity of sub-indications in the ECP slot indication for the preset unit length is not greater than the first preset number, determining that the ECP slot indication is invalid for the slot carrying the SSB.

In the embodiments, the UE can use any of the above methods to determine the slot adjustment amount (as long as the UE uses the same method as the network side device to determine the slot adjustment amount), and then determine the first preset quantity. Comparing the total quantity of sub-indications in the ECP slot indication for the preset unit length (that is, how many slots in total can be indicated by the ECP slot indication) with the first preset quantity, in response to determining that the total quantity of sub-indications in the ECP slot indication for the preset unit length is greater than the first preset number, determining that the ECP slot indication is valid for the slot carrying the SSB; and in response to determining that the total quantity of sub-indications in the ECP slot indication for the preset unit length is not greater than the first preset number, determining that the ECP slot indication is invalid for the slot carrying the SSB.

S603: determining, by the UE, ECP slot(s) within the preset unit length sent from the network side device according to a determination result of whether the ECP slot indication is valid for a slot carrying the SSB, and the ECP slot indication.

For a specific implementation manner of S603, reference may be made to the foregoing embodiments, and details are not repeated here.

In the above solution, the network side device configures the relationship between the total quantity of sub-indications in the ECP slot indication and the first preset quantity according to whether the ECP slot indication is valid for a slot carrying the SSB. Correspondingly, the UE can accurately determine whether the ECP slot indication is valid for a slot carrying the SSB based on the relationship between the total quantity of sub-indications in the ECP slot indication and the first preset quantity. In this case, the implicit indication is more flexible, thereby meeting the needs of different application scenarios.

Figure 7:
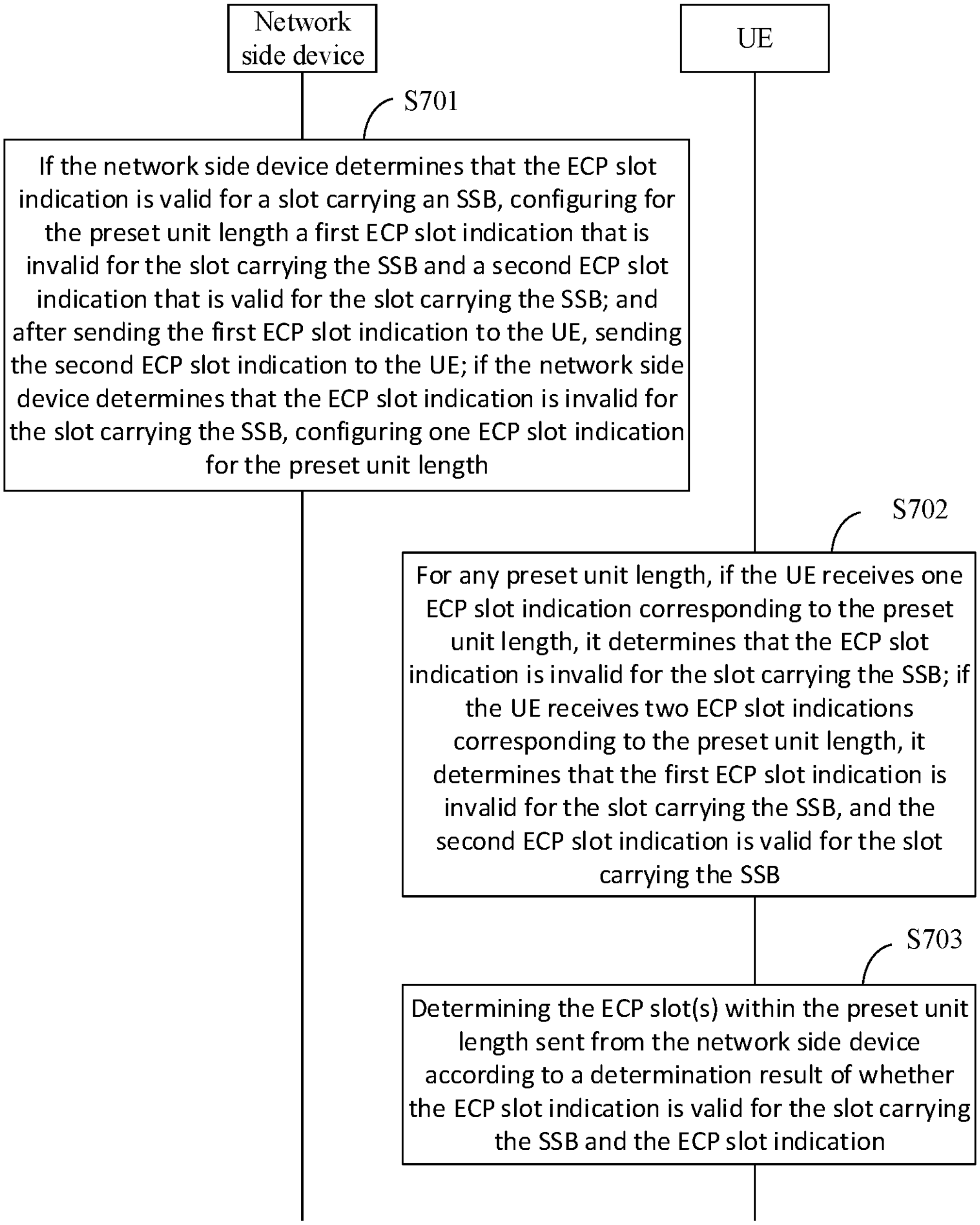
FIG. 7 is a flowchart of an interaction illustrating a fifth method for determining an ECP slot provided by an embodiment of the disclosure.

FIG. 7 is a fifth flowchart of interaction illustrating a method for determining an ECP slot provided by the embodiment of the disclosure, as shown in FIG. 7, the method may include:

S701: in response to determining that the ECP slot indication is valid for a slot carrying an SSB, configuring for a preset unit length, by a network side device, a first ECP slot indication that is invalid for the slot carrying the SSB, and a second ECP slot indication that is valid for the slot carrying the SSB; and sending the second ECP slot indication to the UE after sending the first ECP slot indication to the UE; and in response to determining that the ECP slot indication is invalid for the slot carrying the SSB, configuring, by the network side device, one ECP slot indication corresponding to the preset unit length.

In implementation, for any preset unit length, two kinds of ECP slot indication can be configured, the first ECP slot indication includes a second preset number of sub-indications, and is invalid for the slot carrying the SSB; the second ECP slot indication includes a third preset number of sub-indications, and is valid for the slot carrying the SSB. In some embodiments, the second ECP slot indication is also valid for a slot not carrying the SSB that is not indicated by the first ECP slot indication.

In the embodiments, in order for the UE to distinguish between the first ECP slot indication and the second ECP slot indication, the network side device needs to first send the first ECP slot indication to the UE, and then send the second ECP slot indication to the UE.

In some optional embodiments, a sum of the total quantity of sub-indications in the first ECP slot indication and the total quantity of sub-indications in the second ECP slot indication is the total quantity of slots within the preset unit length. That is, the total quantity of slots within the preset unit length N0 is equal to (N2+N3), where N2 is the total quantity of sub-indications in the first ECP slot indication (that is, the second preset quantity), and N3 is the total quantity of sub-indication in the second ECP slot (that is, the third preset quantity).

Still taking SCS=15 KHz and the preset unit length is one radio frame as an example, the total quantity of slots in the preset unit length is 10, that is, when SCS=15 KHz, there are 10 slots in one radio frame; if the total quantity of sub-indications in the first ECP slot indication is 6, the total quantity of sub-indications in the second ECP slot indication is 4.

S702: For any preset unit length, in response to receiving one ECP slot indication corresponding to the preset unit length, determining, by the UE, that the ECP slot indication is invalid for a slot carrying the SSB; in response to receiving two ECP slot indications corresponding to the preset unit length, determining, by the UE, that the first ECP slot indication is invalid for the slot carrying the SSB, and the second ECP slot indication is valid for the slot carrying the SSB.

In the embodiments, if the UE only receives one ECP slot indication corresponding to the preset unit length, it determines that the ECP slot indication is invalid for a slot carrying the SSB.

If the UE receives two ECP slot indications corresponding to the preset unit length, it determines that the first ECP slot indication received first is not valid for the slot carrying the SSB, and the second ECP slot indication received later is valid for the slot carrying the SSB.

S703: determining, by the UE, ECP slot(s) within the preset unit length sent from the network side device according to a determination result of whether the ECP slot indication is valid for the slot carrying the SSB, and the ECP slot indication.

For a specific implementation manner of S703, reference may be made to the foregoing embodiments, and details are not repeated here.

In the above solution, the network side device configures the quantity of ECP slot indications corresponding to the preset unit length according to whether the ECP slot indication is valid for a slot carrying an SSB. The UE can accurately determine whether the ECP slot indication is valid for the slot carrying the SSB according to the quantity of ECP slot indication corresponding to the preset unit length, and thus the implicit indication can be performed more flexibly to meet the requirements of different application scenarios.

Figure 8:
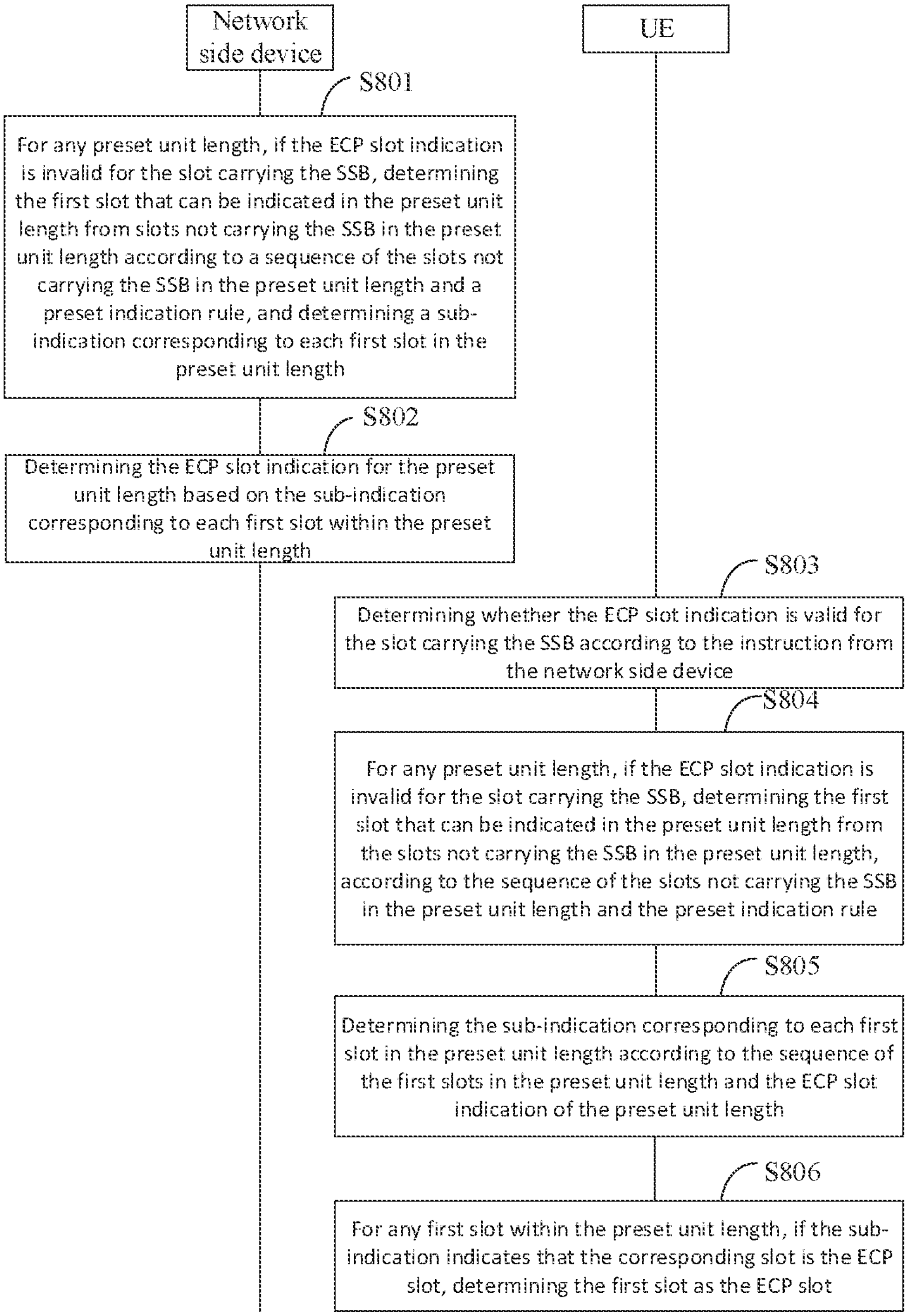
FIG. 8 is a flowchart of an interaction illustrating a sixth method for determining an ECP slot provided by an embodiment of the disclosure.

For a scenario where the ECP slot indication is invalid for a slot carrying an SSB, FIG. 8 is sixth flowchart of interaction illustrating a method for determining an ECP slot provided in the embodiment of the disclosure. As shown in FIG. 8, the method may include:

S801: for any preset unit length, in response to that the ECP slot indication is invalid for a slot carrying an SSB, determining, by the network side device, first slots indicatable in the preset unit length from slots not carrying the SSB in the preset unit length according to a sequence of slots not carrying the SSB in the preset unit length and a preset indication rule, and determining sub-indication corresponding to each first slot in the preset unit length.

In the embodiments, the above-mentioned preset indication rule is preset, such as including which slot within the preset unit length needs to be indicated, and the specific indication rule can be set according to the actual application scenario.

Exemplarily, the network side device can determine which slot can be indicated based on the preset indication rule, and determine the first slots that can be indicated within the preset unit length according to the sequence of slots not carrying the SSB within the preset unit length, and then determine sub-indication corresponding to each first slot (indicating that the corresponding slot is an ECP slot, or indicating that the corresponding slot is not an ECP slot) according to whether the first slot is an ECP slot.

S802: determining, by the network side device, the ECP slot indication for the preset unit length based on sub-indication corresponding to each first slot for the preset unit length.

In implementation, the sub-indication corresponding to each first slot within the preset unit length may be combined to obtain corresponding ECP slot indication.

In some embodiments, the quantity of sub-indications included in the ECP slot indication is fixed. However, when the ECP slot indication is invalid for a slot carrying the SSB, the first slot is determined from slots not carrying the SSB, then there may be a case that the total quantity of sub-indications in the ECP slot indication for the preset unit length is greater than the total quantity of the first slots within the preset unit length. For example, the ECP slot indication for the preset unit length includes 8 sub-indications, and there are 6 first slots in the preset unit length, so there are two remaining sub-indications without corresponding first slots.

Based on this, in some optional embodiments, if the total quantity of sub-indications in the ECP slot indication for the preset unit length is greater than the total quantity of first slots in the preset unit length, the following is further included:

- determining remaining sub-indication(s) corresponding to part or all of first slots in a next preset unit length according to a sequence of the first slots in the next preset unit length; and/or
- determining remaining sub-indication(s) corresponding to part or all of second slots according to a sequence of the second slots in the preset unit length, where the second slots are slots not carrying an SSB within the preset unit length except the first slots;
- take SCS=15 KHz and the preset unit length is one radio frame as an example: there are 10 slots in the preset unit length, which are respectively indicated as slot #0 to slot #9, among which, slot #1 and slot #2 are slots carrying an SSB, slot #3, slot #4, slot #5, slot #8 and slot #9 are the first slot, then slot #0, slot #6 and slot #7 are the second slot.

Still take the above two remaining sub-indications as an example:

- the two remaining sub-indications may indicate the first two of the first slots within the next preset unit length;
- the two remaining sub-indications may indicate the first two of the second slots within the preset unit length, such as the above-mentioned slot #0 and slot #6;
- it is also possible that one remaining sub-indication is valid for the first one of first slots in the next preset unit length, and the other remaining sub-indication is valid for the first one of the second slots in the preset unit length, such as the above-mentioned slot #0.

In implementation, the sub-indication corresponding to each first slot within the preset unit length and the remaining sub-indication may be combined to obtain corresponding ECP slot indication.

S803: determining, by the UE, whether the ECP slot indication is valid for the slot carrying the SSB according to the instruction from the network side device.

For the specific implementation manner of S803, reference may be made to the foregoing embodiments, and details are not repeated here.

S804: For any preset unit length, in response to that the ECP slot indication is invalid for a slot carrying an SSB, determining first slots that can be indicated in the preset unit length from slots not carrying the SSB in the preset unit length, according to a sequence of slots not carrying the SSB in the preset unit length and a preset indication rule.

Determination of the first slots that can be indicated within the preset unit length by the UE is similar to the above-mentioned determination of the first slots that can be indicated within the preset unit length by the network side device, and will not be repeated here.

S805: determining, by the UE, the sub-indication corresponding to each first slot in the preset unit length according to the sequence of the first slots in the preset unit length and the ECP slot indication for the preset unit length.

In an implementation, each first slot has a corresponding sub-indication for indicating that the first slot is an ECP slot or not an ECP slot. Based on this, the UE needs to determine the sub-indication corresponding to each first slot in the preset unit length according to the sequence of the first slots in the preset unit length, and the ECP slot indication of the preset unit length.

As mentioned above, there may be a case that the total quantity of sub-indications in the ECP slot indication of the preset unit length is greater than the total quantity of the first slots in the preset unit length. In this case, the ECP slot indication for the preset unit length may further include a remaining sub-indication being valid for a first slot in a next preset unit length, and/or a sub-indication being valid for a second slot in the preset unit length, in addition to the sub-indication being valid for the first slot in the preset unit length.

Based on this, in some optional embodiments, if the total quantity of sub-indication in the ECP slot indication of the preset unit length is greater than the total quantity of first slots in the preset unit length, the following is further included:

- determining remaining sub-indication(s) corresponding to part or all of first slots in a next preset unit length according to a sequence of the first slots in the next preset unit length; and/or
- determining remaining sub-indication(s) corresponding to part or all of second slots according to a sequence of the second slots in the preset unit length, where the second slots are slots not carrying the SSB within the preset unit length except the first slots.

Still take the above two remaining sub-indication as an example:

- in response to that the two remaining sub-indications indicate the first two of first slots in the next preset unit length, determining remaining sub-indications corresponding to the first two of first slots in the next preset unit length;
- in response to the two remaining sub-indications indicate a sequence of the first two of second slots within the preset unit length, determining remaining sub-indications corresponding to the first two of second slots within the preset unit length, such as the above-mentioned slot #0 and slot #6;

in response to that one remaining sub-indication is valid for a first one of the first slots in the next preset unit length, and the other remaining sub-indication is valid for a sequence of first one of the second slots in the preset unit length, determining a remaining sub-indication corresponding to the first one of the first slots within the next preset unit length, and the remaining sub-indication corresponding to the first one of the second slots within the preset unit length, such as the remaining sub-indication corresponding to the above-mentioned slot #0.

S806: for any first slot within the preset unit length, in response to that the sub-indication indicates that a corresponding slot is an ECP slot, determining, by the UE, the first slot as an ECP slot.

As mentioned above, the sub-indication is configured to indicate that the corresponding first slot is an ECP slot, or not an ECP slot. For any first slot within the preset unit length, if the sub-indication indicates that the corresponding slot is ECP slot, the first slot can be accurately determined as an ECP slot.

In addition, in some optional embodiments above, there may be remaining sub-indication being valid for the second slots within the preset unit length. Correspondingly, it needs to determine whether these second slots are ECP slots based on the remaining sub-indication corresponding to these second slots.

In some optional embodiments, the first slots within the preset unit length and the sub-indication corresponding to each first slot are determined in a sequential manner.

That is, the above S801 can be implemented in the following manner.

For any preset unit length, according to a sequence of slots not carrying the SSB in the preset unit length and a preset indication rule, the network side device determines the first slots that can be indicated within the preset unit length in sequential order from the slots not carrying the SSB in the preset unit length, and determines in sequential order sub-indication corresponding to each first slot within the preset unit length.

The above S802 can be realized in the following ways.

The network side device determines the ECP slot indication of the preset unit length based on the sub-indication corresponding to each first slot within the preset unit length in sequential order.

The above S804 can be realized in the following manner.

For any preset unit length, determining, by the UE, the first slots that may be indicated within the preset unit length in sequential order from the slots not carrying the SSB in the preset unit length according to a sequence of the slots not carrying the SSB in the preset unit length and the preset indication rule.

The above S805 can be realized in the following manner.

Determining, by the UE, sub-indication corresponding to each first slot in the preset unit length in sequential order according to the sequence of the first slots in the preset unit length and the ECP slot indication for the preset unit length.

Following is specific example for illustration.

Taking SCS=15 KHz and the preset unit length is one radio frame as an example, there are 10 slots in the preset unit length, which are respectively indicated as slot #0 to slot #9. Slot #1 and slot #2 are slots carrying the SSB, the preset indication rule is to indicate a second slot, a third slot, a fourth slot, a seventh slot, an eighth slot, and a ninth slot within the preset unit length. The network side device determines in sequential order that a second one, a third one, a fourth one, a seventh one, and an eighth one of slots not carrying the SSB are respectively slot #3, slot #4, slot #5, slot #8 and slot #9, and there is no ninth one of slots not carrying the SSB within the preset unit length. The network side device determines the sub-indications corresponding to slot #3, slot #4, slot #5, slot #8 and slot #9 in sequential order, and determines the ECP slot indication for the radio frame based on a sequence of the sub-indication corresponding to slot #3, the sub-indication corresponding to slot #4, the sub-indication corresponding to slot #5, the sub-indication corresponding to slot #8, and the sub-indication corresponding to slot #9. The UE determines the second one, the third one, the fourth one, the seventh one, and the eighth one of slots not carrying the SSB within the preset unit length as slot #3, slot #4, slot #5, slot #8, and slot #9 in sequential order, and respectively determines sub-indications corresponding to slot #3, slot #4, slot #5, slot #8, and slot #9.

The above example is only for illustrating how to determine in sequential order the first slots within the preset unit length and the sub-indication corresponding to each first slot, and the disclosure is not limited thereto.

In some other optional embodiments, the first slots within the preset unit length and the sub-indication corresponding to each first slot are determined a reverse order.

That is, the above S801 can be implemented in the following manner.

For any preset unit length, according to a sequence of slots not carrying the SSB in the preset unit length and the preset indication rule, determining, by the network side device, the first slots that can be indicated within the preset unit length in a reverse sequence from the slots not carrying the SSB in the preset unit length, and determining the sub-indication corresponding to each first slot in the preset unit length in the reverse sequence.

The above S802 can be realized in the following ways.

Determining, by the network side device, the ECP slot indication for the preset unit length based on the sub-indication corresponding to each first slot within the preset unit length in the reverse sequence.

The above S804 can be realized in the following manner.

For any preset unit length, according to a sequence of slots not carrying the SSB in the preset unit length and the preset indication rule, determining, by the UE, the first slots that may be indicated within the preset unit length from the slots not carrying the SSB in the preset unit length in a reverse sequence.

The above S805 can be realized in the following manner.

According to the sequence of the first slots in the preset unit length and the ECP slot indication for the preset unit length, determining sub-indication corresponding to each first slot in the preset unit length in a reverse sequence.

Following is a specific example for illustration.

Taking SCS=15 KHz and the preset unit length is one radio frame as an example, there are 10 slots in the preset unit length, which are respectively indicated as slot #0 to slot #9 in sequence, and slot #1 and slot #2 are slots carrying the SSB, the preset indication rule is that the first one to the eighth one of slots within the preset unit length need to be indicated, and the network side device determines in reverse sequence that the first one to the eighth one of slots not carrying the SSB within the preset unit length are respectively slot #9, slot #8, slot #7, slot #6, slot #5, slot #4, slot #3, and slot #0. The network side device determines a sub-indication corresponding to slot #9, a sub-indication corresponding to slot #8, a sub-indication corresponding to slot #7, a sub-indication corresponding to slot #6, a sub-indication corresponding to slot #5, a sub-indication corresponding to slot #4, a sub-indication corresponding to slot #3 and a sub-indication corresponding to slot #0 in sequential order, and determines the ECP slot indication of the radio frame, and further determines the ECP slot indication for the radio frame according to the sub-indication corresponding to slot #9, the sub-indication corresponding to slot #8, the sub-indication corresponding to slot #7, the sub-indication corresponding to slot #6, the sub-indication corresponding to slot #5, the sub-indication corresponding to slot #4, the sub-indication corresponding to slot #3, and the sub-indication corresponding to slot #0 in that order. The UE determines in reverse sequence that the first one to the eighth one of slots not carrying the SSB within the preset unit length are respectively slot #9, slot #8, slot #7, slot #6, slot #5, slot #4, slot #3 and slot #0, and determines sub-indications respectively corresponding to slot #9, slot #8, slot #7, slot #6, slot #5, slot #4, slot #3 and slot #0.

The above example is only for illustrating how to determine the first slots within the preset unit length and the sub-indication corresponding to each first slot in reverse sequence, and the disclosure is not limited thereto.

By determining the first slots within the preset unit length in reverse sequence and the sub-indication corresponding to each first slot, the network side device can centrally configure the positions for sending the SSB in the first few slots of the preset unit length. In this way, the impact of deploying the SSB by the network side device on the ECP slot indication is reduced.

Figure 9:
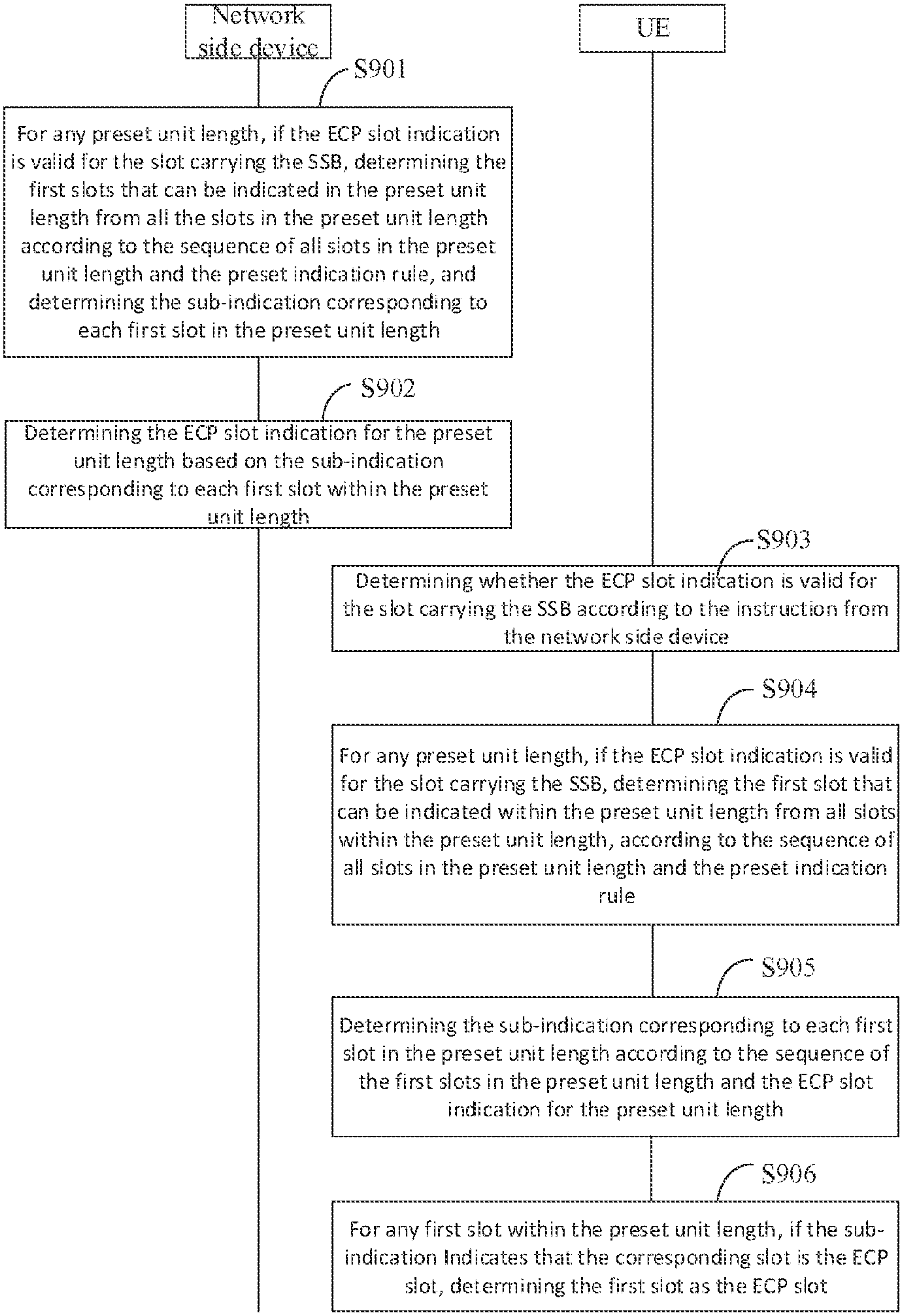
FIG. 9 is a flowchart of an interaction illustrating a seventh method for determining an ECP slot provided by an embodiment of the disclosure.

For a scenario where the ECP slot indication is valid for a slot carrying an SSB, FIG. 9 is a seventh flowchart of interaction illustrating a method for determining an ECP slot provided in the embodiment of the disclosure. As shown in FIG. 9, the method may include:

S901: for any preset unit length, in response to that the ECP slot indication is valid for a slot carrying an SSB, determining, by the network side device, first slots that can be indicated in the preset unit length from all slots in the preset unit length according to a sequence of the all slots in the preset unit length and a preset indication rule, and determining a sub-indication corresponding to each first slot in the preset unit length.

Here, for the preset indication rule, reference may be made to the above-mentioned embodiments.

Exemplarily, the network side device can determine which slot can be indicated based on the preset indication rule, determine the first slot that can be indicated within the preset unit length according to the sequence of all slots within the preset unit length, and then determine the sub-indication corresponding to each first slot according to whether the first slot is an ECP slot (indicating that the corresponding slot is an ECP slot, or indicating that the corresponding slot is not an ECP slot).

S902: determining, by the network side device, the ECP slot indication for the preset unit length based on the sub-indication corresponding to each first slot within the preset unit length.

S903: determining, by the UE, whether the ECP slot indication is valid for the slot carrying the SSB according to the instruction from the network side device.

The specific embodiments of the steps S902-S903 may refer to the above-mentioned embodiments, which will not be repeated here.

S904: for any preset unit length, in response to that the ECP slot indication is valid for the slot carrying the SSB, determining the first slot that can be indicated within the preset unit length from all slots within the preset unit length, according to the sequence of the all slots in the preset unit length and the preset indication rule.

The determination of the first slot that can be indicated within the preset unit length at the UE is similar to the above determination of the first slot that can be indicated within the preset unit length at the network side device, which will not be repeated here.

S905: determining, by the UE, the sub-indication corresponding to each first slot in the preset unit length according to the sequence of the first slots in the preset unit length and the ECP slot indication for the preset unit length.

S906: for any first slot within the preset unit length, in response to that the sub-indication indicates that the corresponding slot is an ECP slot, determining, by the UE, the first slot as an ECP slot.

For the specific implementation of steps S905-S906, reference may be made to the above-mentioned embodiments, which will not be repeated here.

For a scenario where the ECP slot indication is valid for a slot carrying an SSB, the above-mentioned first slot within the preset unit length and the sub-indication corresponding to each first slot can also be determined in sequential order or in reverse order. For the specific implementation manner, reference may be made to the foregoing embodiments, and details are not repeated here.

In implementation, for the scenario where the ECP slot indication is valid for a slot carrying an SSB, the slot carrying the SSB may be indicated as an ECP slot. Since the SSB needs to be sent using NCP, when the slot carrying the SSB is indicated as the ECP slot, only some of the position symbols are position symbols for the ECP.

Based on this, in some optional embodiments, in response to that the ECP slot indication is valid for the slot carrying the SSB, and it is determined that the slot carrying the SSB is the ECP slot, after S902, the method further includes:

determining, by the network side device, an NCP position symbol based on an SSB position symbol in the slot carrying the SSB.

Correspondingly, after S906, the method further includes:

determining, by the UE, a position symbol for NCP based on an SSB position symbol in the slot carrying the SSB.

Figure 10A:
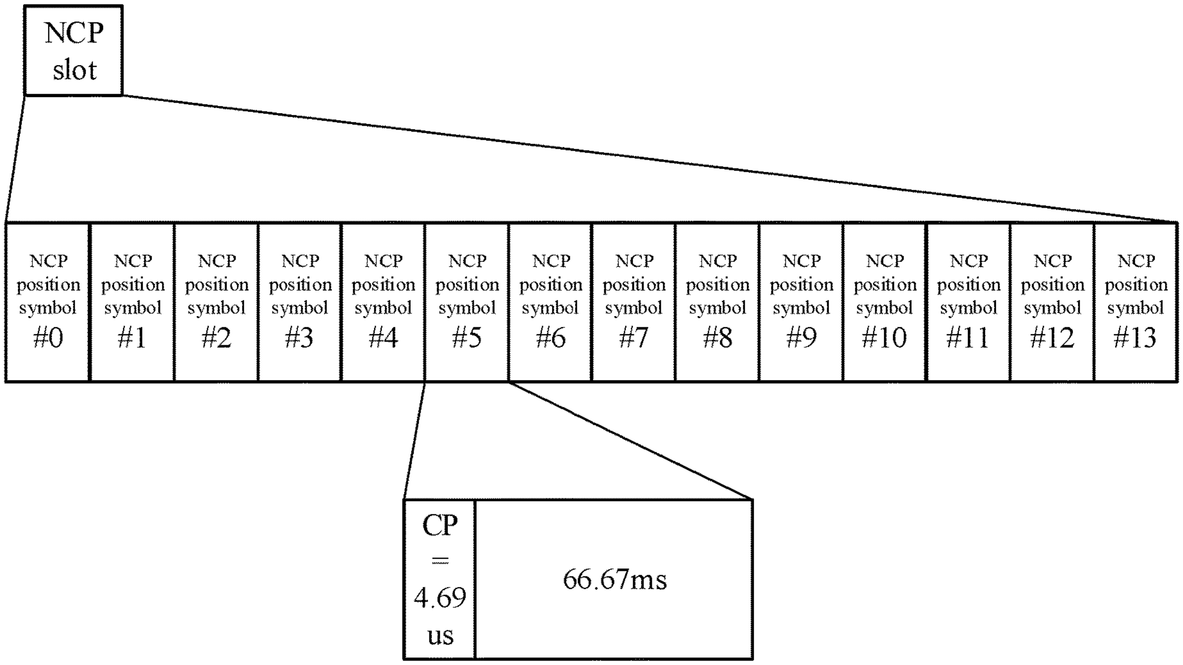
FIG. 10A is a schematic diagram of an NCP slot provided by an embodiment of the disclosure.

Referring to FIG. 10A, one NCP slot includes 14 position symbols for NCP.

Figure 10B:
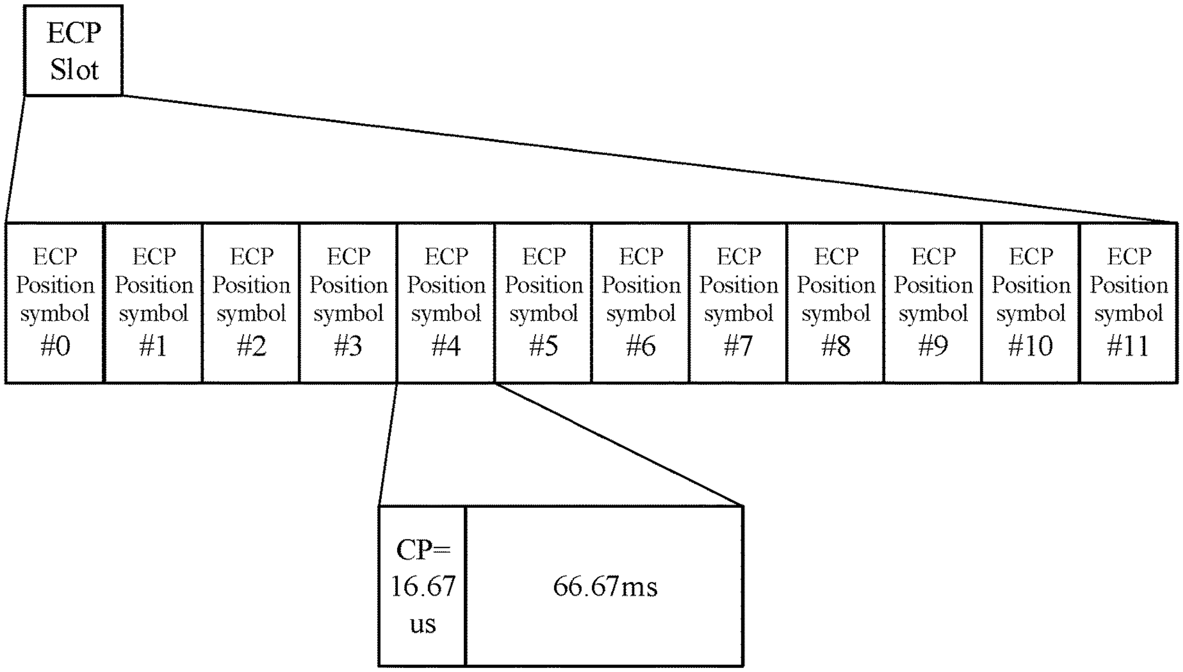
FIG. 10B is a schematic diagram of an ECP slot provided by an embodiment of the disclosure.

Referring to FIG. 10B, one ECP slot includes 12 position symbols for ECP.

Based on the SSB position symbol in the slot carrying the SSB, determining the position symbol for the NCP can be realized by but not limited to the following methods.

1) The SSB position symbol in the slot carrying the SSB is determined as the position symbol for the NCP. For example:

the position symbols for SSB in the slot carrying the SSB are position symbol #8 to position symbol #11, and position symbol #8 to position symbol #11 are determined as position symbols for the NCP.

2) All the position symbols in the half, where the position symbols for SSB are located, of the slot carrying the SSB are determined as the position symbols for the NCP. For example:

the position symbols for SSB in the slot carrying the SSB are position symbol #8 to position symbol #11, there are 14 position symbols of NCP in a slot, or 12 position symbols of ECP, and the last 7 position symbols are determined as position symbols used for the NCP; the first 6 position symbols are determined as position symbols used for the ECP.

The above two methods are only illustrative, and other methods may be used to determine the position symbols used for the NCP during implementation.

Further, besides that the NCP is used for sending the SSB, it is also necessary to send the PDCCH of the system broadcast message using the NCP. Therefore, when the slot carrying the SSB is determined as an ECP slot, some position symbols are position symbols for the NCP and used to send the PDCCH of the system broadcast message.

In some optional embodiments, determining the position symbol used for the NCP based on the SSB position symbol in the slot carrying the SSB further includes:

determining a position symbol for sending PDCCH of a system broadcast message in the slot carrying the SSB as the position symbol used for the NCP.

By using ECP symbol to schedule PDSCH or communicate PDCCH, it can be better compatible with NR unicast design.

Figure 11:
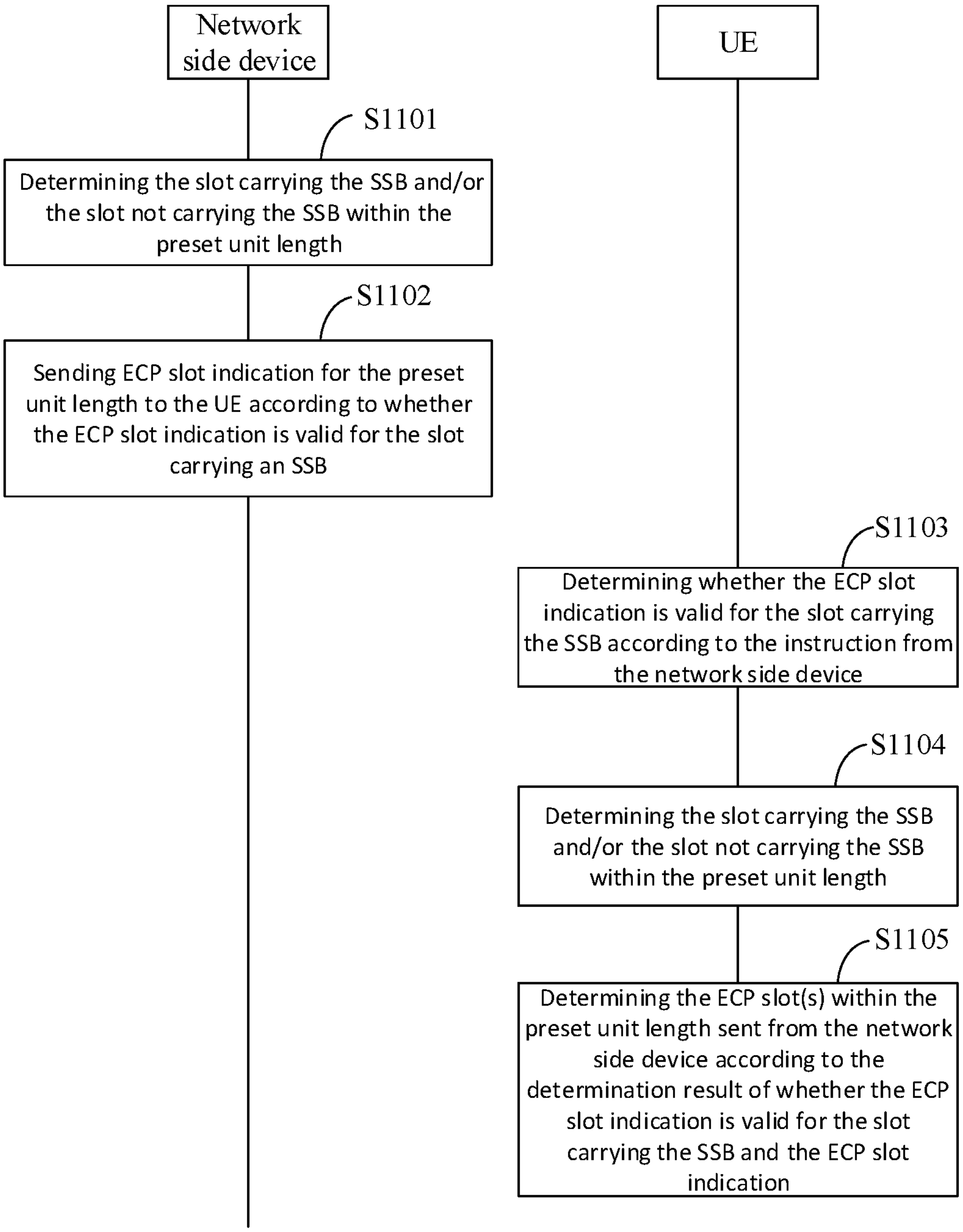
FIG. 11 is a flowchart of an interaction illustrating an eighth method for determining an ECP slot provided by an embodiment of the disclosure.

FIG. 11 is an eighth flowchart of interaction illustrating a method for determining an ECP slot provided by the embodiment of the disclosure, as shown in FIG. 11, the method may include:

S1101: determining, by the network side device, a slot carrying an SSB and/or a slot not carrying an SSB within the preset unit length.

As mentioned above, in some scenarios, the ECP slot indication is invalid for the slot carrying the SSB, and the first slot needs to be determined from the slots not carrying the SSB within the preset unit length; in some scenarios, the ECP slot indication is valid for the slot carrying the SSB, and the slot carrying the SSB is the ECP slot, it is necessary to determine the position symbol used for the NCP in the slot carrying the SSB. Based on this, the network side device and the UE need to determine the slots carrying the SSB and/or the slots not carrying the SSB within the preset unit length.

Figure 12:
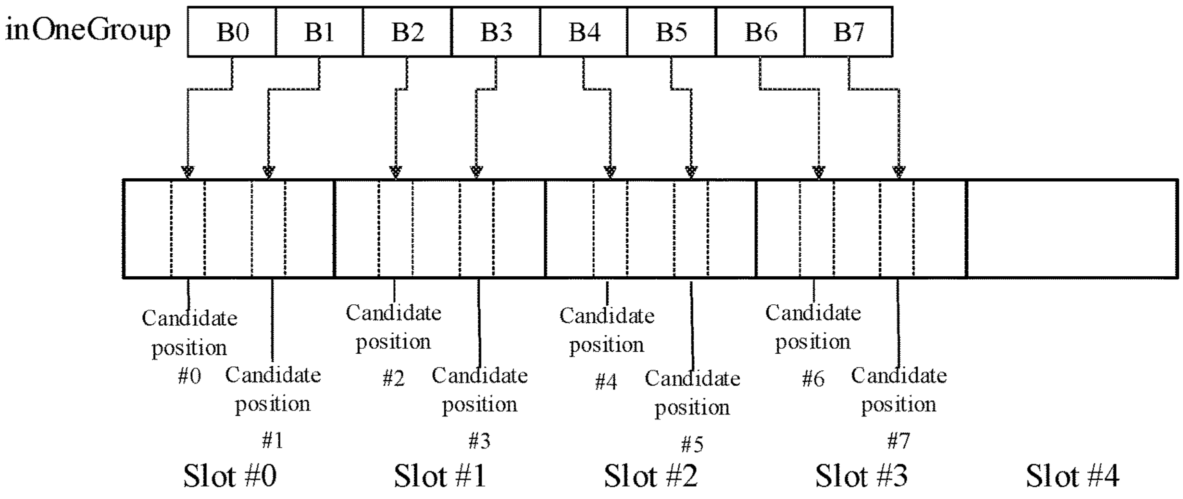
FIG. 12 is a first schematic diagram of an indication for an SSB sending position provided by an embodiment of the disclosure.

Still taking SCS=15 KHz and the preset unit length as one radio frame as an example, according to the above-mentioned FIG. 2A to FIG. 2C, it can be known that there are at most 8 candidate positions for sending SSB in one radio frame, and the network side device can instruct whether each candidate position is used for sending the SSB through a group of values (inOneGroup) in a SSB position parameter (for example, ssb-PositionsInBurst). As shown in FIG. 12, the network side device uses the 8-bit indication of inOneGroup (B0-B8). The value of inOneGroup is 0, indicating that the corresponding candidate position is not used for sending the SSB; and the value of inOneGroup is 1, indicating that the corresponding candidate position is used for sending SSB.

It can be understood that the above inOneGroup value is just an example. When the inOneGroup value is 1, it can indicate that the corresponding candidate position is not used for sending the SSB; when the inOneGroup value is 0, it can indicate that the corresponding candidate position is used for sending the SSB; or inOneGroup can be configured as other values, which are not specifically limited in this disclosure, and can be configured according to actual application scenarios.

In addition, the network side device can further instruct the sending period for the SSB burst block through the SSB period parameter (ssb-PeriodicityServingCell) of the serving cell, and the sending period can be 5 ms, 10 ms, 20 ms, 40 ms, 80 ms or 160 ms, etc.

S1102: sending, by the network side device, an ECP slot indication for a preset unit length to the UE according to whether the ECP slot indication is valid for a slot carrying an SSB.

S1103: determining, by the UE, whether the ECP slot indication is valid for the slot carrying the SSB according to the instruction from the network side device.

For the specific implementation of the steps S1102-S1103, reference may be made to the above-mentioned embodiments, which will not be repeated here.

S1104: determining, by the UE, the slots carrying the SSB and/or the slots not carrying the SSB within the preset unit length.

As mentioned above, the network side device can instruct whether each candidate position is used for sending SSB through the inOneGroup value in the SSB position parameter ssb-PositionsInBurst. Correspondingly, the UE determines whether each candidate position is used for sending the SSB according to the inOneGroup value in the SSB position parameter ssb-PositionsInBurst.

S1105: determining, by the UE, ECP slot(s) within the preset unit length sent from the network side device, according to a determination result of whether the ECP slot indication is valid for the slot carrying the SSB, and the ECP slot indication.

For a specific implementation manner of S1105, reference may be made to the foregoing embodiments, and details are not repeated here.

The following will describe in detail in conjunction with three specific embodiments.

Embodiment 1

The network side device sends a higher layer signaling to UE, such as system broadcast message through broadcast control channel, broadcast/multicast configuration message through multicast control channel, UE-based radio link control message or control message based on the media access layer. Referring to the above-mentioned FIG. 4 and FIG. 5, the higher layer signaling includes configuration information. The UE determines whether the ECP slot indication is valid for a slot carrying an SSB according to the configuration information; or the higher layer signaling does not include configuration information, and the UE determines whether the ECP slot indication is valid for a slot carrying an SSB bases on the default rule. For a specific implementation manner of this step, reference may be made to the above embodiments in FIG. 4 and FIG. 5, and details are not repeated here.

Figure 13A:
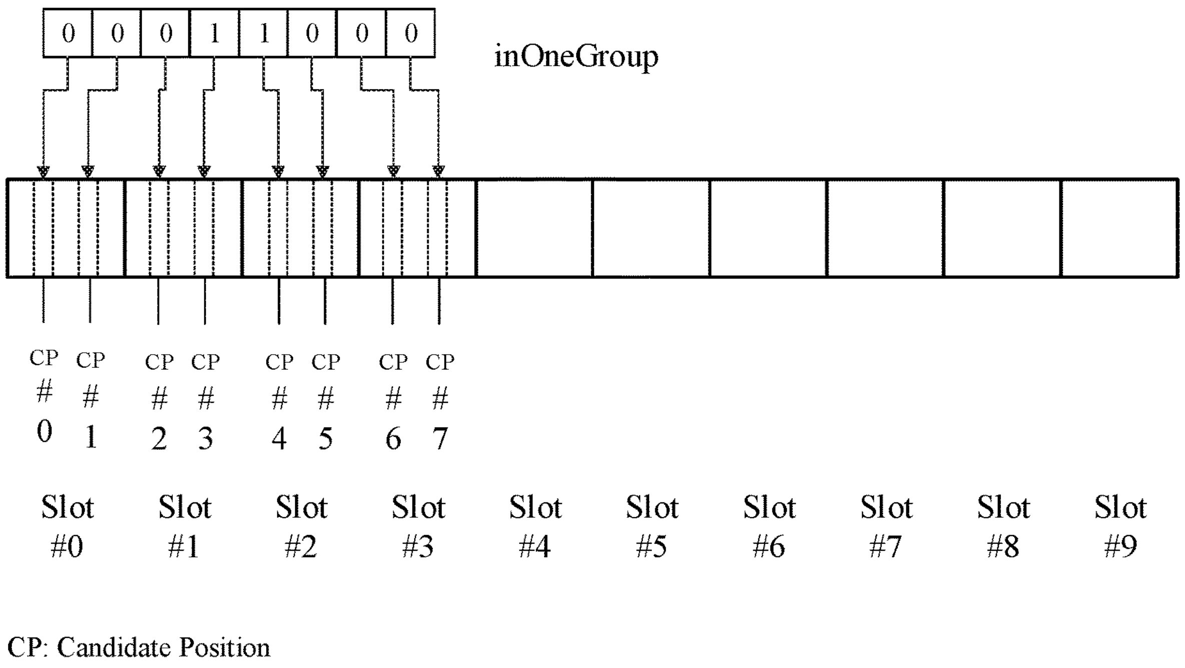
FIG. 13A is a second schematic diagram of an indication for an SSB sending position provided by an embodiment of the disclosure.

Based on the system broadcast message, the UE obtains the inOneGroup value in the SSB position parameter ssb-PositionsInBurst sent from the network side device, and determines whether the corresponding candidate position is used for sending the SSB based on the inOneGroup value. In the embodiments, SCS=15 KHz, and the preset unit length is one radio frame. As shown in FIG. 12, the network side device uses the 8-bit indication of inOneGroup (B0-B8). The value of inOneGroup is 0, indicating that the corresponding candidate position is not used for sending the SSB, and the value of inOneGroup is 1, indicating that the corresponding candidate position is used for sending the SSB. Referring to FIG. 13A, in the embodiments, the inOneGroup value corresponding to candidate position #3 and candidate position #4 is 1, and the inOneGroup value corresponding to other candidate positions is 0, and candidate position #3 and candidate position #4 are used for sending the SSB. Therefore slot #1 and slot #2 are slots carrying the SSB; slot #0, slot #3, slot #4, slot #5, slot #6, slot #7, slot #8 and slot #9 are slots not carrying the SSB.

In the embodiments, the preset indication rule is to indicate the second one, the third one, the fourth one, the seventh one, the eighth one, and the ninth one of slots in the preset unit length, the first slots in the preset unit length and the sub-indication corresponding to each first slot is determined in sequential order.

Figure 13B:
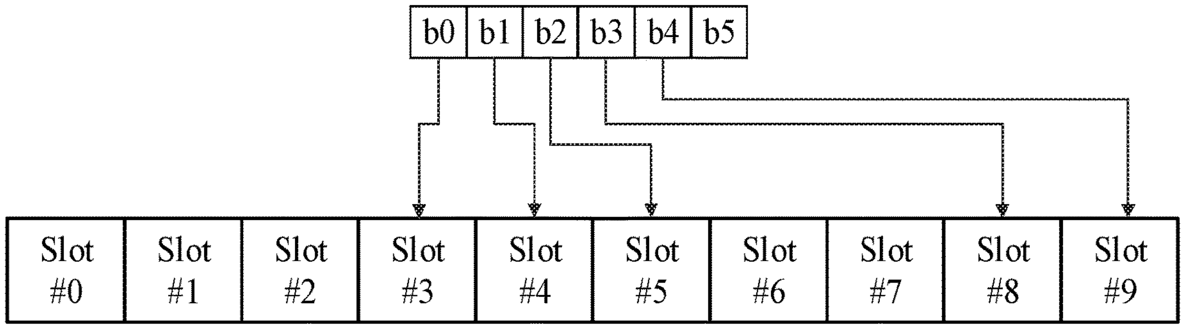
FIG. 13B is a first schematic diagram of an ECP slot indication in the NR system provided by an embodiment of the disclosure.

If the ECP slot indication is invalid for the slot carrying the SSB, the slot carrying the SSB needs to be skipped (that is, slot #1 and slot #2 are skipped). After skipping slot #1 and slot #2, the second one, the third one, the fourth one, the seventh one, and the eighth one of slots not carrying the SSB are respectively slot #3, slot #4, slot #5, slot #8, and slot #9, that is, these five slots are the first slots indicatable. There is no ninth one of slots not carrying the SSB within the preset unit length. In addition, slot #0, slot #6, and slot #7 are the second slots which are slots not carrying the SSB except for the first slots. Referring to FIG. 13B, b0 in the ECP slot indication is valid for whether slot #3 is an ECP slot, b1 indicates whether slot #4 is an ECP slot, b2 indicates whether slot #5 is an ECP slot, and b3 indicates whether slot #8 is an ECP slot, b4 indicates whether slot #9 is an ECP slot, and b5 has no corresponding first slot.

In some scenarios, b5 may indicate the first one of second slots in the above radio frame, that is, slot #0; in some other scenarios, b5 may indicate the first one of first slots in the next radio frame.

Figure 13C:
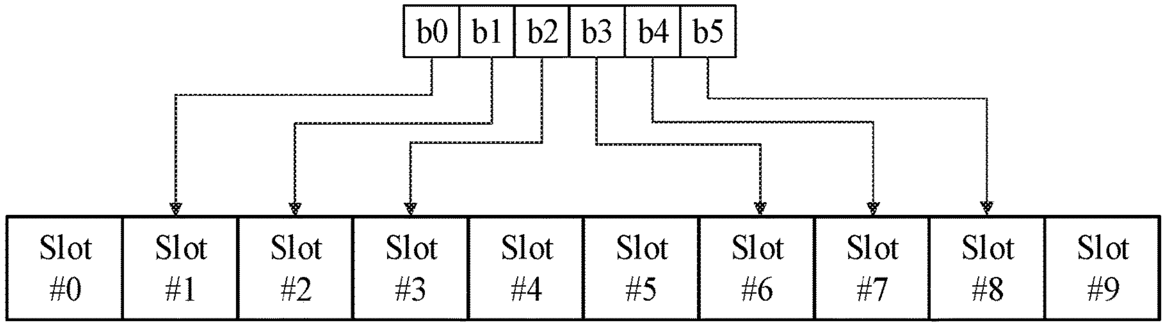
FIG. 13C is a second schematic diagram of an ECP slot indication in the NR system provided by an embodiment of the disclosure.

If the ECP slot indication is valid for the slot carrying the SSB, there is no need to skip the slot carrying the SSB. Among all the slots in the radio frame, the second one, the third one, the fourth one, the seventh one, the eighth one, and the ninth one of slots are slot #1, slot #2, slot #3, slot #6, slot #7, and slot #8 respectively, that is, these six slots are the first slots that can be indicated. Referring to FIG. 13C, in the ECP slot indication, b0 indicates whether slot #1 is an ECP slot, b1 indicates whether slot #2 is an ECP slot, b2 indicates whether slot #3 is an ECP slot, and b3 indicates whether slot #6 is an ECP slot, b4 indicates whether slot #7 is an ECP slot, and b5 indicates whether slot #8 is an ECP slot.

Figure 13D:
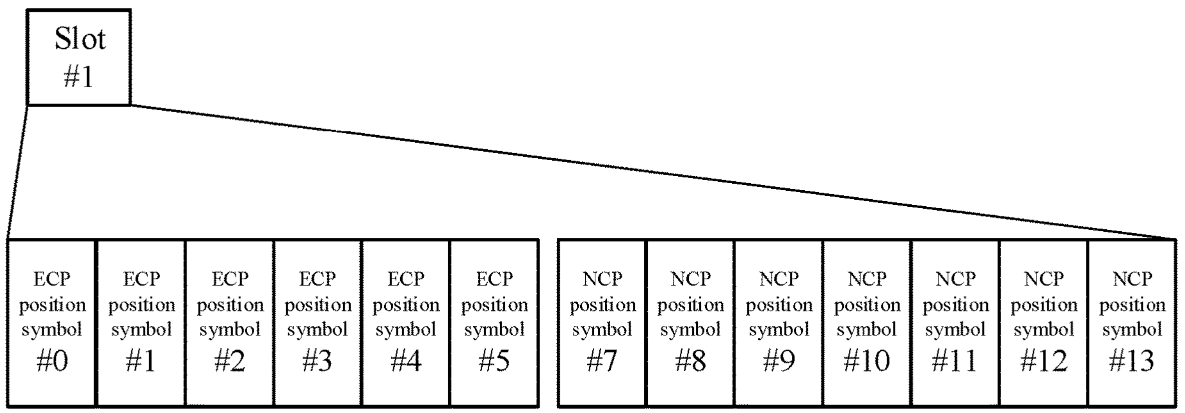
FIG. 13D is a first schematic diagram showing position symbols in the slot carrying the SSB provided by an embodiment of the disclosure.
Figure 13E:
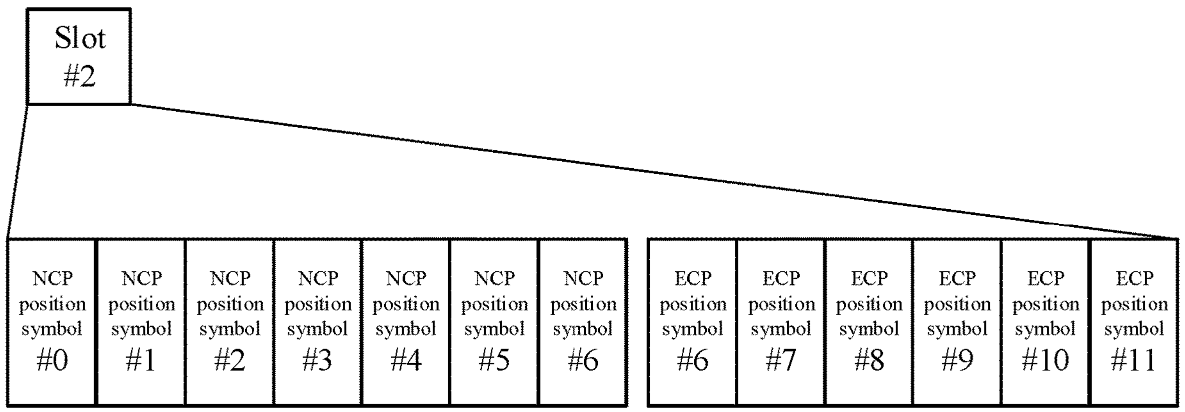
FIG. 13E is a second schematic diagram showing position symbols in the slot carrying the SSB provided by an embodiment of the disclosure.

Since the SSB still needs to use the NCP for transmission, when the above-mentioned slot #1 and slot #2 are ECP slots, only part of the position symbols are used for the ECP. Referring to FIG. 13D, in slot #1, the SSB position symbols are NCP position symbols #8 to position symbols #11, at least the time domain positions where these position symbols are located cannot be for ECP, and the last 7 position symbols (NCP position symbol #7 to NCP position symbol #13) are determined as that used for the NCP. In addition, ECP position symbol #0 to ECP position symbol #5 in the ECP slot can be used to schedule the PDSCH using the ECP symbol. Referring to FIG. 13E, in slot #2, the SSB position symbols are NCP position symbols #2 to position symbols #5, at least the time domain positions of these position symbols cannot be for ECP, and the first 7 position symbols (NCP position symbol #0 to NCP position symbol #6) are determined as that used for the NCP; in addition, ECP position symbol #6 to ECP position symbol #11 in the ECP slot can be used to schedule the PDSCH using the ECP symbol.

Embodiment 1 takes the preset unit length as one radio frame as an example. In practical applications, the preset unit length can also be other lengths, such as 5 ms (5 slots when SCS=15 KHz), or 20 ms (20 slots when SCS=15 KHz), or 4 ms (4 slots when SCS=15 KHz). Embodiment 1 takes the ECP slot indication to include 6 sub-indications as an example, the sub-indication included in the ECP slot indication in practical applications may be more or less, such as 5, 10, or 8. The position symbols used for the ECP in the ECP slot carrying the SSB in Embodiment 1 are only illustrative, and the disclosure is not limited thereto.

Embodiment 2

If the network side device determines that the ECP slot indication is valid for a slot carrying an SSB, ECP slot indication is configured in such a way that the total quantity of sub-indications in the ECP slot indication is greater than the first preset quantity; otherwise, ECP slot indication is configured in such a way that the total quantity of sub-indication in the ECP slot indication is not greater than the first preset quantity. For a specific implementation manner of this step, reference may be made to the above-mentioned embodiment in FIG. 6, which will not be repeated here.

Figure 14A:
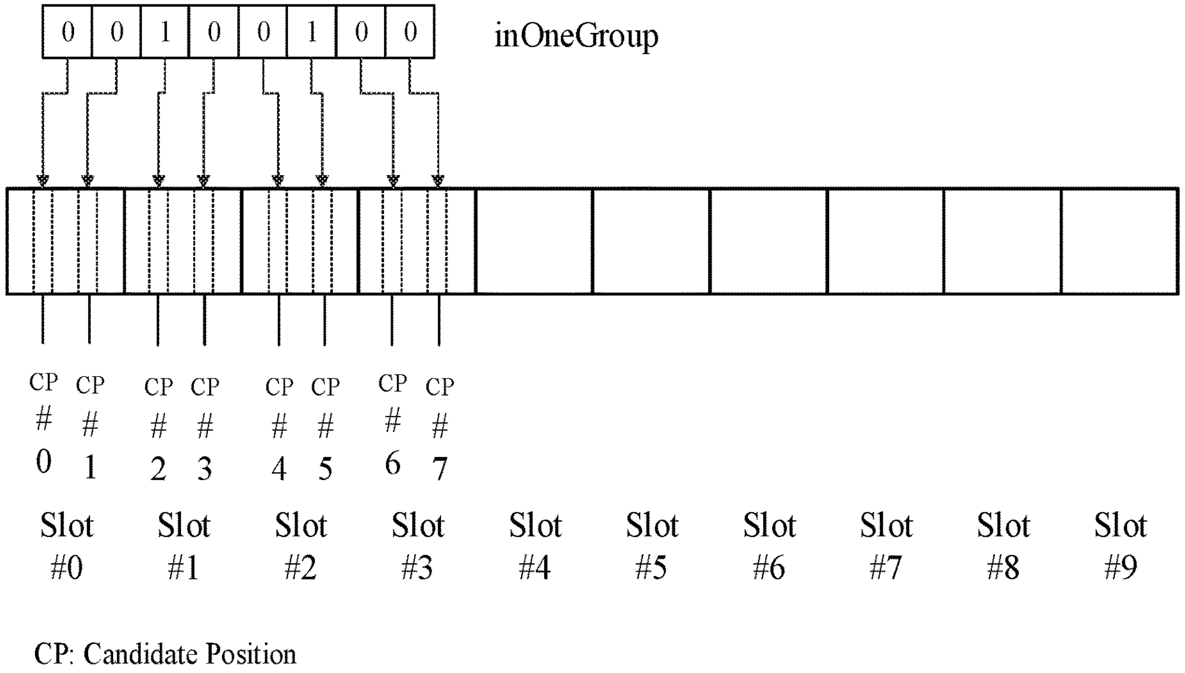
FIG. 14A is a third schematic diagram of an indication of an SSB sending position provided by an embodiment of the disclosure.

Based on the system broadcast message, the UE obtains the inOneGroup value in the SSB position parameter ssb-PositionsInBurst sent from the network side device, and determines whether the corresponding candidate position is used for sending the SSB based on the inOneGroup value. In the embodiments, SCS=15 KHz, and the preset unit length is one radio frame. As shown in FIG. 12, the network side device uses the 8-bit indication of inOneGroup (B0-B8). The value of inOneGroup is 0, indicating that the corresponding candidate position is not used for sending the SSB, and the value of inOneGroup is 1, indicating that the corresponding candidate position is used for sending the SSB. Referring to FIG. 14A, in the embodiments, the inOneGroup value corresponding to candidate position #2 and candidate position #5 is 1, and the inOneGroup value corresponding to other candidate positions is 0, and candidate position #2 and candidate position #5 are used for sending the SSB. Therefore, slot #1 and slot #2 are slots carrying the SSB, slot #0, slot #3, slot #4, slot #5, slot #6, slot #7, slot #8 and slot #9 are slots not carrying the SSB.

In this embodiment, the first slots within the preset unit length and the sub-indication corresponding to each first slot are determined in reverse order; the first preset quantity is 8, and the total quantity of sub-indications in the ECP slot indication is greater than 8, and the ECP slot indication is valid for the slot carrying the SSB. The total quantity of sub-indications in the ECP slot indication is less than or equal to 8, and the ECP slot indication is invalid for the slot carrying the SSB.

Figure 14B:
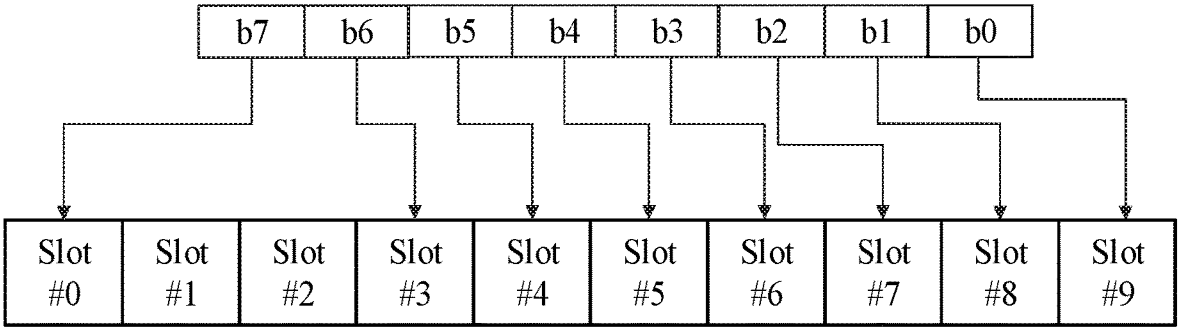
FIG. 14B is a third schematic diagram of an ECP slot indication in the NR system provided by an embodiment of the disclosure.

If the preset indication rule is to indicate the first to eighth slots within the preset unit length, the total quantity of sub-indications in the ECP slot indication is equal to 8, and the ECP slot indication is invalid for the slot carrying the SSB, and it needs to skip the slot carrying the SSB (that is, skipping slot #1 and slot #2); after skipping slot #1 and slot #2, the first to eighth slots not carrying the SSB are slot #9, slot #8, slot #7, slot #6, slot #5, slot #4, slot #3, and slot #0. Referring to FIG. 14B, in the ECP slot indication, b0 indicates whether slot #9 is an ECP slot, b1 indicates whether slot #8 is an ECP slot, b2 indicates whether slot #7 is an ECP slot, b3 indicates whether slot #6 is an ECP slot, b4 indicates whether slot #5 is an ECP slot, b5 indicates whether slot #4 is an ECP slot, b6 indicates whether slot #3 is an ECP slot, and b7 indicates a slot whether #0 is an ECP slot.

Figure 14C:
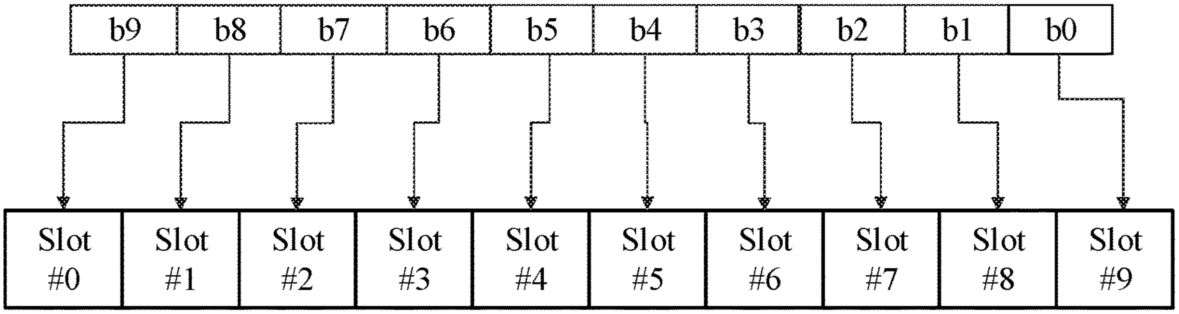
FIG. 14C is a fourth schematic diagram of an ECP slot indication in the fourth NR system provided by an embodiment of the disclosure.

If the preset indication rule is to indicate the first to tenth slots within the preset unit length, the total quantity of sub-indications in the ECP slot indication is greater than 8, and the ECP slot indication is valid for the slot carrying the SSB, there is no need to skip the slots carrying the SSB. In all slots of the radio frame, the first to tenth slots are slot #9, slot #8, slot #7, slot #6, slot #5, slot #4, slot #3, slot #2, slot #1, and slot #0 respectively. Referring to FIG. 14C, in the ECP slot indication, b0 indicates whether slot #9 is an ECP slot, b1 indicates whether slot #8 is an ECP slot, b2 indicates whether slot #7 is an ECP slot, b3 indicates whether slot #6 is an ECP slot, b4 indicates whether slot #5 is an ECP slot, b5 indicates whether slot #4 is an ECP slot, b6 indicates whether slot #3 is an ECP slot, b7 indicates a slot whether #2 is an ECP slot, b8 indicates whether slot #1 is an ECP slot, and b9 indicates whether slot #0 is an ECP slot.

Figure 14D:
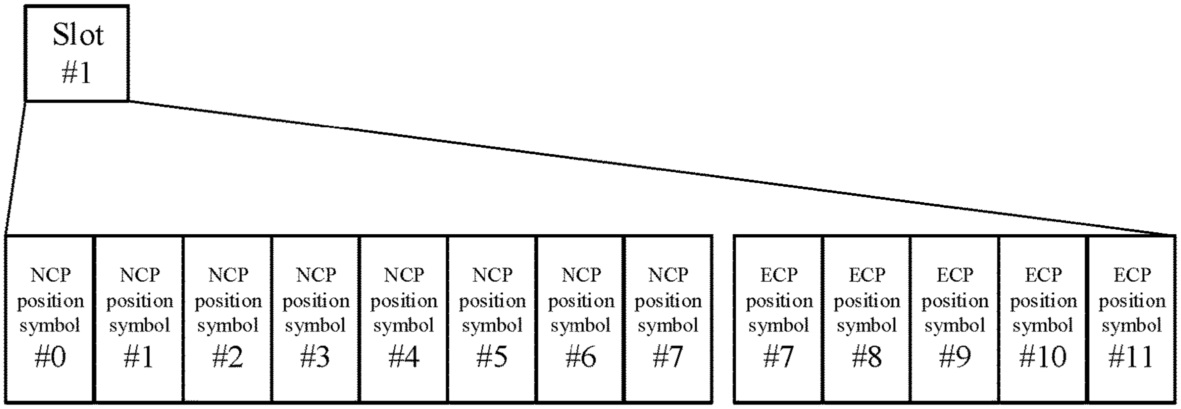
FIG. 14D is a third schematic diagram showing position symbols in the slot carrying the SSB provided by an embodiment of the disclosure.
Figure 14E:
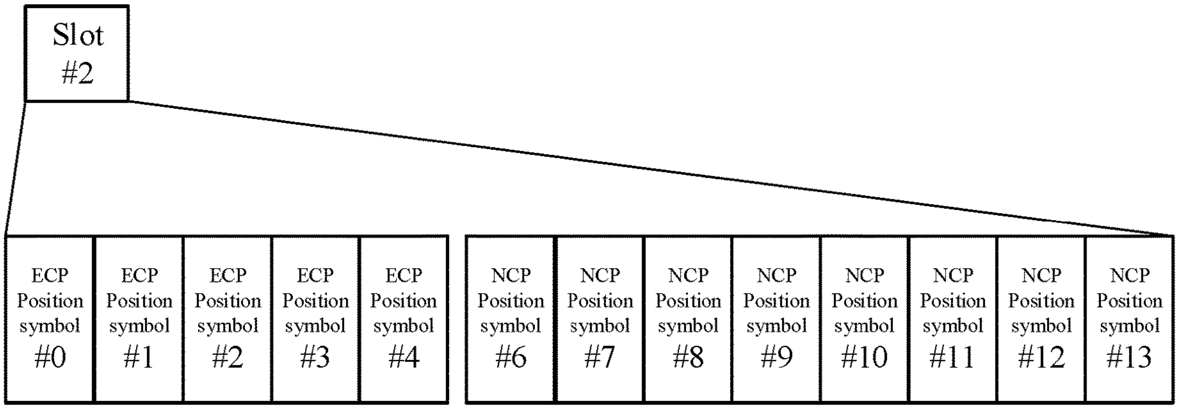
FIG. 14E is a fourth schematic diagram showing the position symbols in the slot carrying the SSB provided by an embodiment of the disclosure.

Since the transmission of SSB still needs to use the NCP, when the above-mentioned slot #1 and slot #2 are ECP slots, only part of the position symbols are used for the ECP. Referring to FIG. 14D, in slot #1, the SSB position symbols are NCP position symbol #2 to NCP position symbol #5, and the position symbols for the PDCCH for sending system broadcast messages are NCP position symbol #6 and NCP position symbol #7. The NCP position symbol #0 to NCP position symbol #7 are determined as position symbols used for the NCP. In addition, ECP position symbol #7 to ECP position symbol #11 of the ECP slot can be used to schedule the PDSCH by using the ECP symbol. Referring to FIG. 14E, in slot #2, the SSB position symbols are NCP position symbol #8 to NCP position symbol #11, and the position symbols for PDCCH for sending system broadcast messages are NCP position symbol #6 and position symbol #7. The NCP position symbol #6 to NCP position symbol #13 are determined as position symbols used for the NCP. In addition, ECP position symbol #0 to ECP position symbol #4 of the ECP slot can be used to schedule the PDSCH by using the ECP symbol.

Embodiment 2 takes the preset unit length as one radio frame as an example. In practical applications, the preset unit length can also be other lengths, such as 5 ms (5 slots when SCS=15 KHz), or 20 ms (20 slots when SCS=15 KHz), or 4 ms (4 slots when SCS=15 KHz). Embodiment 2 is an example that the ECP slot indication includes 8 sub-indications or 10 sub-indications. In practical application, the sub-indications included in the ECP slot indication can be more or less, such as 5, 6 or 7, etc. The position symbol used for the ECP in the ECP slot carrying the SSB in embodiment 2 is only an illustrative, which is not limited to in this disclosure.

Embodiment 3

If the network side device determines that the ECP slot indication is valid for a slot carrying an SSB, for the preset unit length, the first ECP slot indication that is invalid for the slot carrying the SSB, and the second ECP slot indication being valid for the slot carrying the SSB are configured, and the first ECP slot indication is sent to the UE after sending the second ECP slot indication to the UE. If it is determined that the ECP slot indication is invalid for the slot carrying the SSB, the network side device configures one ECP slot indication corresponding to the preset unit length. For the specific implementation manner of this step, reference may be made to the above-mentioned embodiment in FIG. 7, which will not be repeated here.

Figure 15A:
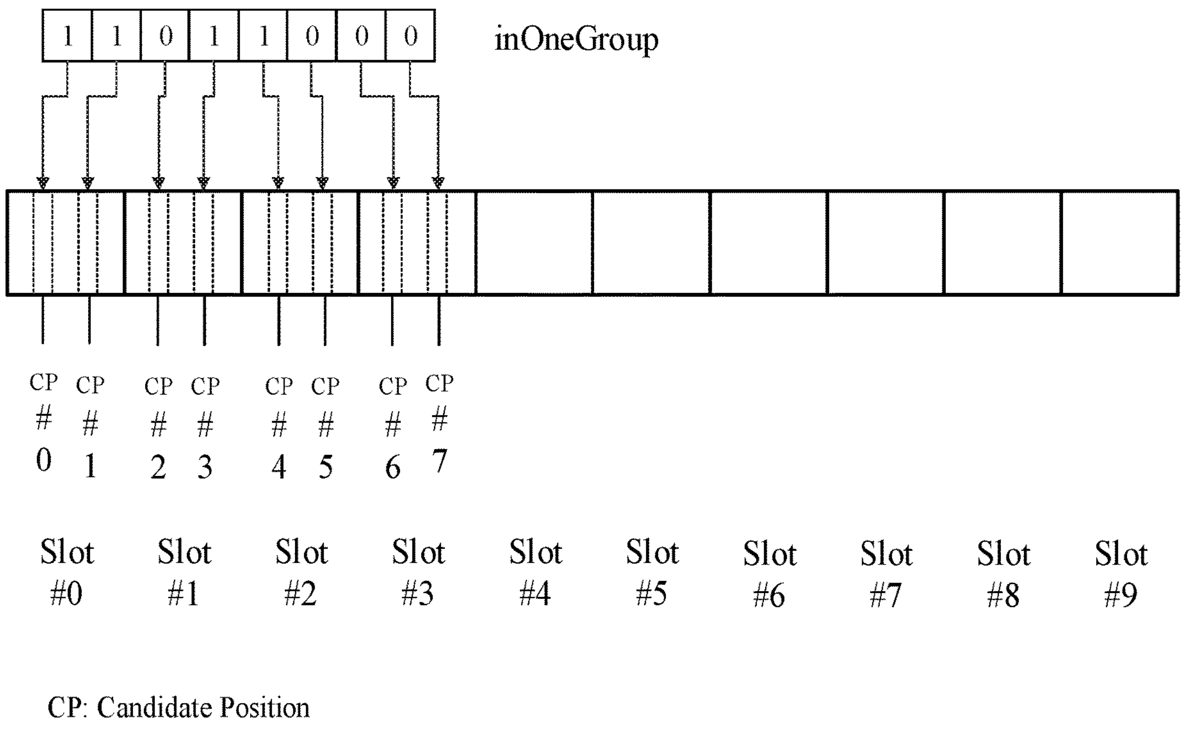
FIG. 15A is a fourth schematic diagram of an indication of an SSB sending position provided by an embodiment of the disclosure.

Based on the system broadcast message, the UE obtains the inOneGroup value in the SSB position parameter ssb-PositionsInBurst sent from the network side device, and determines whether the corresponding candidate position is used for sending the SSB based on the inOneGroup value. In this embodiment, SCS=15 KHz, and the preset unit length is one radio frame. As shown in FIG. 12, the network side device uses the 8-bit indication of inOneGroup (B0-B8). The value of inOneGroup is 0, indicating that the corresponding candidate position is not used for sending the SSB, and the value of inOneGroup is 1, indicating that the corresponding candidate position is used for sending the SSB. Referring to FIG. 15A, in the embodiments, the inOneGroup value corresponding to candidate position #0, candidate position #1, candidate position #3, and candidate position #4 is 1, and the inOneGroup value corresponding to the remaining candidate positions is 0. Candidate position #0, candidate position #1, candidate position #3 and candidate position #4 are used for sending the SSB, and slot #0, slot #1 and slot #2 are slots carrying the SSB; slot #3, slot #4, slot #5, slot #6, slot #7, slot #8 and slot #9 are slots not carrying the SSB.

In the embodiments, the first slot within the preset unit length and the sub-indication corresponding to each first slot are determined in sequential order. The network side device configures, for the preset unit length, a first ECP slot indication being invalid for the slot carrying the SSB, and a second ECP slot indication being valid for the slot carrying the SSB. Here, the first ECP slot indication includes 6 sub-indications, and the second ECP slot indication Includes 4 sub-indications.

Figure 15B:
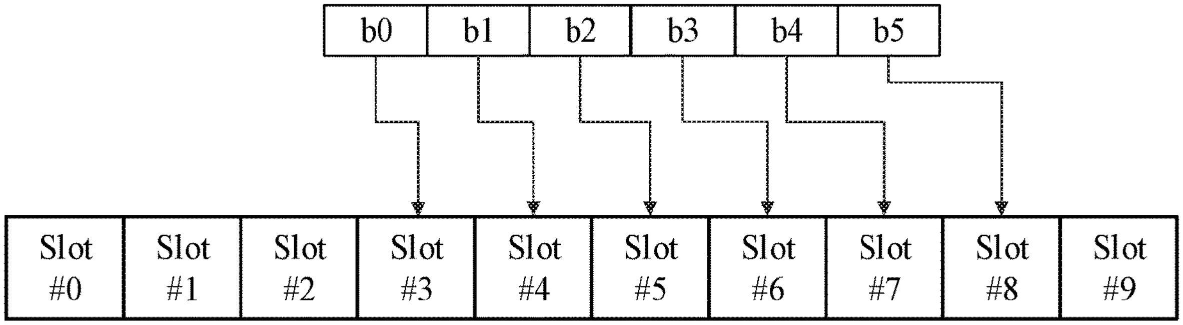
FIG. 15B is a fifth schematic diagram of an ECP slot indication in the NR system provided by an embodiment of the disclosure.

If the indication rule corresponding to the first ECP slot indication is to indicate the first to sixth slots within the preset unit length, the first ECP slot indication is invalid for the slot carrying the SSB, and the slot carrying the SSB needs to be skipped (that is, skipping slot #0, slot #1, and slot #2), after skipping slot #0, slot #1, and slot #2, the first to sixth slots not carrying the SSB are slot #3 to slot #8 respectively. Referring to FIG. 15B, b0 in the ECP slot indication is valid for whether slot #3 is an ECP slot, b1 indicates whether slot #4 is an ECP slot, b2 indicates whether slot #5 is an ECP slot, b3 indicates whether slot #6 is an ECP slot, b4 indicates whether slot #7 is an ECP slot, and b5 indicates whether slot #8 is an ECP slot.

Figure 15C:
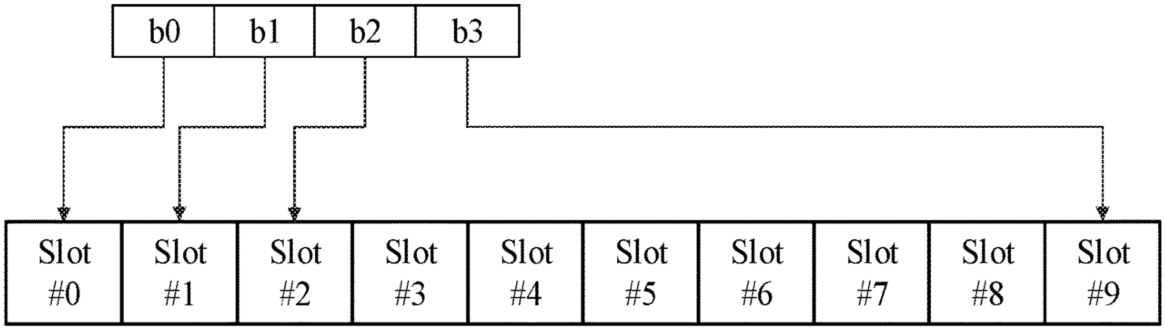
FIG. 15C is a sixth schematic diagram of an ECP slot indication in the NR system provided by an embodiment of the disclosure.

If the indication rule corresponding to the second ECP slot indication is to indicate the first to fourth slots within the preset unit length, the second ECP slot indication is valid for the slot carrying the SSB, and there is no need to skip the slot carrying the SSB. In all the slots of the radio frame, the first to fourth slots except the slots indicated by the above-mentioned first ECP slot indication (slot #3 to slot #8) are slot #0, slot #1, slot #2, and slot #9 respectively. Referring to FIG. 15C, b0 in the ECP slot indication is valid for whether slot #0 is an ECP slot, b1 indicates whether slot #1 is an ECP slot, b2 indicates whether slot #2 is an ECP slot, and b3 indicates whether slot #9 is an ECP slot.

Figure 15D:
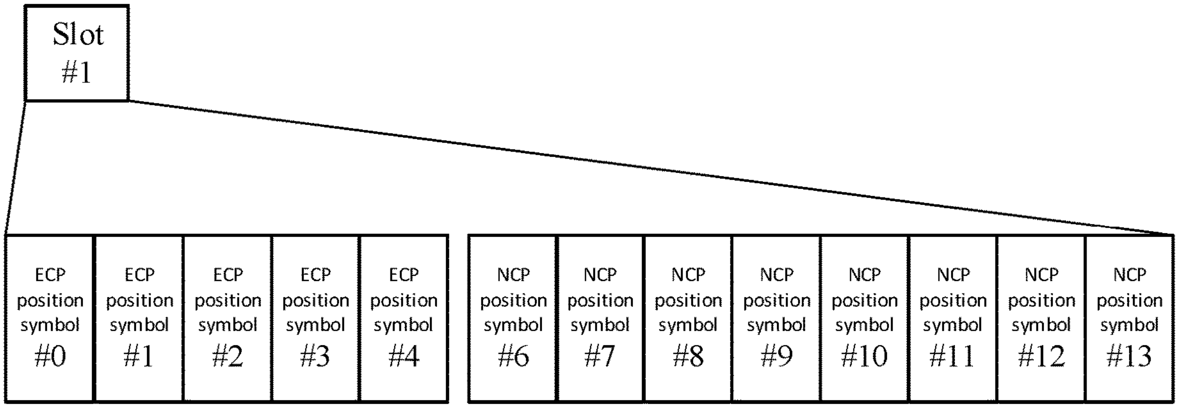
FIG. 15D is a fifth schematic diagram showing position symbols in the slot carrying the SSB provided by an embodiment of the disclosure.
Figure 15E:
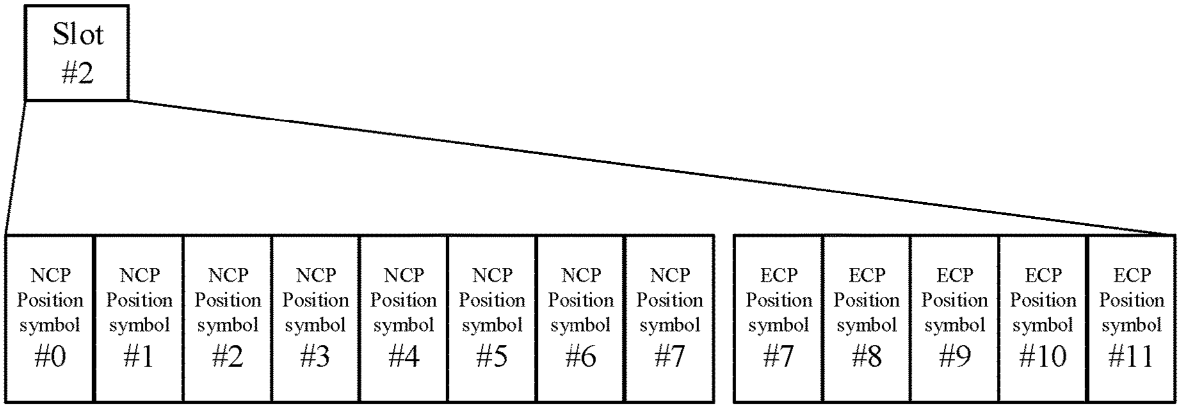
FIG. 15E is a sixth schematic diagram showing position symbols in the slot carrying the SSB provided by an embodiment of the disclosure.

Since transmission of the SSB still needs to use the NCP, the above-mentioned slot #0 can only be an NCP slot, and when the above-mentioned slot #1 and slot #2 are ECP slots, only part of the position symbols are used for ECP. Referring to FIG. 15D, in slot #1, the SSB position symbols are NCP position symbol #8 to NCP position symbol #11, and the position symbols of the PDCCH for sending system broadcast messages are NCP position symbol #6 and position symbol #7. The NCP position symbol #6 to NCP position symbol #13 are determined as position symbols used for the NCP. In addition, ECP position symbol #0 to ECP position symbol #4 of the ECP slot can be used to schedule the PDSCH using the ECP symbol. Referring to FIG. 15E, in slot #2, the SSB position symbols are NCP position symbol #2 to NCP position symbol #5, and the PDCCH position symbols for sending system broadcast messages are NCP position symbol #6 and NCP position symbol #7. The NCP position symbol #0 to NCP position symbol #7 are determined as position symbols used for the NCP. In addition, ECP position symbol #7 to ECP position symbol #11 of the ECP slot can be used to schedule the PDSCH using the ECP symbol.

Embodiment 3 takes the preset unit length as one radio frame as an example. In practical applications, the preset unit length can also be other lengths, such as 5 ms (5 slots when SCS=15 KHz), or 20 ms (20 slots when SCS=15 KHz), or 4 ms (4 slots when SCS=15 KHz). Embodiment 3 takes the ECP slot indication including 6 sub-indications and 4 sub-indications as an example. The sub-indication included in the ECP slot indication in practical applications may be more or less. The position symbol used for the ECP in the ECP slot carrying the SSB in Embodiment 3 is just an illustration, and the disclosure is not limited thereto.

Above-mentioned embodiments 1-3 support the ECP slot that includes NCP position symbol, improve transmission efficiency of the ECP slot from previous 60% to 97.5% (in 20 slots of 20 ms, only half of slot does not used for transmission of broadcast data).

Figure 16:
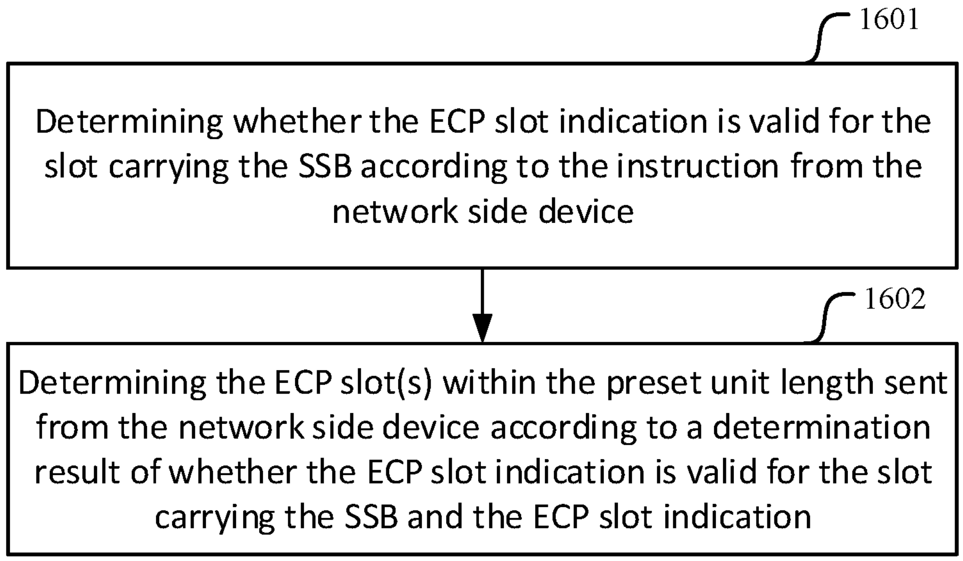
FIG. 16 is a schematic flowchart of a method for determining an ECP slot provided in an embodiment of the disclosure.

One embodiment of the disclosure further provides a method for determining an ECP slot, which is applied to the above-mentioned UE, as shown in FIG. 16, the method includes:

S1601: determining whether an ECP slot indication is valid for a slot carrying an SSB according to an instruction from the network side device;

S1602: determining an ECP slot within a preset unit length sent from the network side device, according to a determination result of whether the ECP slot indication is valid for the slot carrying the SSB, and the ECP slot indication.

In one embodiment, determining whether the ECP slot indication is valid for the slot carrying the SSB according to the indication from the network side device, includes:

in response to receiving a higher layer signaling including configuration information sent from the network side device, determining whether the ECP slot indication is valid for the slot carrying the SSB according to the configuration information.

In one embodiment, determining whether the ECP slot indication is valid for the slot carrying the SSB according to the instruction from the network side device, includes:

in response to receiving a higher layer signaling not including configuration information sent from the network side device, determining whether the ECP slot indication is valid for the slot carrying the SSB based on a default rule;

where the default rule is that the ECP slot indication is valid for the slot carrying the SSB, or the ECP slot indication is invalid for the slot carrying the SSB.

In one embodiment, determining whether the ECP slot indication is valid for the slot carrying the SSB according to the instruction from the network side device, includes:

for any preset unit length, determining whether a total quantity of sub-indications in the ECP slot indication for the preset unit length is greater than a first preset quantity; where the sub-indication is configured to indicate whether a corresponding slot is the ECP slot;

in response to the total quantity of sub-indications in the ECP slot indication for the preset unit length being greater than the first preset quantity, determining that the ECP slot indication is valid for the slot carrying the SSB; in response to the total quantity of sub-indications in the ECP slot indication for the preset unit length not being greater than the first preset quantity, determining that the ECP slot indication is invalid for the slot carrying the SSB.

In one embodiment, the first preset quantity is a difference between a total quantity of slots within the preset unit length and a slot adjustment amount.

In one embodiment, determining whether the ECP slot indication is valid for the slot carrying the SSB according to the instruction from the network side device, includes:

for any preset unit length, if one ECP slot indication corresponding to the preset unit length is received, determining that the ECP slot indication is invalid for the slot carrying the SSB;

if two ECP slot indications corresponding to the preset unit length are received, determining that a first ECP slot indication is invalid for the slot carrying the SSB, and the second ECP slot indication is valid for the slot carrying the SSB.

In one embodiment, a sum of a total quantity of sub-indications in the first ECP slot indication and a total quantity of sub-indications in the second ECP slot indication is the total quantity of slots within the preset unit length; the sub-indication is configured to indicate whether a corresponding slot is the ECP slot.

In one embodiment, determining the ECP slot(s) within the preset unit length sent from the network side device according to the determination result of whether the ECP slot indication is valid for the slot carrying the SSB and the ECP slot indication, includes:

for any preset unit length, if the ECP slot indication is invalid for the slot carrying the SSB, determining a first slot indicatable in the preset unit length from slots not carrying the SSB in the preset unit length according to a sequence of the slots not carrying the SSB in the preset unit length and a preset indication rule; if the ECP slot indication is valid for the slot carrying the SSB, determining the first slot indicatable in the preset unit length from all the slots in the preset unit length according to a sequence of all slots in the preset unit length and the preset indication rule;

determining a sub-indication corresponding to each first slot in the preset unit length according to a sequence of first slots in the preset unit length and the ECP slot indication of the preset unit length; where the ECP slot indication includes a plurality of sub-indications, and the sub-indication is configured to indicate whether a corresponding slot is the ECP slot;

for any first slot within the preset unit length, if the sub-indication indicates that the corresponding slot is the ECP slot, determining the first slot as the ECP slot.

In one embodiment, if the ECP slot indication is invalid for the slot carrying the SSB, and the total quantity of sub-indications in the ECP slot indication for the preset unit length is greater than the total quantity of first slots within the preset unit length, the method further includes:

determining remaining sub-indication(s) corresponding to part or all of first slots in a next preset unit length according to a sequence of the first slots in the next preset unit length, and/or determining remaining sub-indication(s) corresponding to part or all of second slots according to a sequence of the second slots in the preset unit length, where the second slots are slots other than the first slot among the slots not carrying the SSB within the preset unit length;

the remaining sub-indication is a sub-indication with no corresponding first slot in the ECP slot indication for the preset unit length.

In one embodiment, the first slots within the preset unit length and the sub-indication corresponding to each first slot are determined in sequential order; or the first slots within the preset unit length and the sub-indication corresponding to each first slot are determined in reverse order.

In one embodiment, if the ECP slot indication is valid for the slot carrying the SSB, after determining the slot carrying the SSB as an ECP slot, the method further includes:

determining position symbols used for the NCP based on an SSB position symbol in the slot carrying the SSB.

In one embodiment, determining the position symbol used for the NCP based on the SSB position symbol in the slot carrying the SSB, includes:

determining the SSB position symbol in the slot carrying the SSB as a position symbol used for the NCP; or determining all position symbols in a half of the slot carrying the SSB as the position symbols used for the NCP, where the SSB position symbol is located in this half.

In one embodiment, determining the position symbol used for the NCP based on the SSB position symbol in the slot carrying the SSB, further includes:

determining a position symbol of the PDCCH for sending a system broadcast message in the slot carrying the SSB as the position symbol used for the NCP.

In one embodiment, before determining the ECP slot(s) within the preset unit length sent from the network side device according to the determination result of whether the ECP slot indication is valid for the slot carrying the SSB and the ECP slot indication, the method further includes:

determining a slot carrying the SSB and/or a slot not carrying the SSB within the preset unit length.

Since this method is a method corresponding to the above-mentioned UE, reference may be made to the above-mentioned embodiment for the specific implementation manner of this method, and repeated descriptions will be omitted.

In one embodiment, another method for determining an ECP slot is provided in the embodiment of the disclosure, which is applied to the above-mentioned network side device, and the method includes:

sending an ECP slot indication for a preset unit length to the UE according to whether the ECP slot indication is valid for a slot carrying an SSB.

In one embodiment, the method further includes:

sending a higher layer signaling including configuration information to the UE;

where the configuration information indicates that the ECP slot indication is valid for the slot carrying the SSB; or the configuration information indicates that the ECP slot indication is invalid for the slot carrying the SSB.

In one embodiment, the method further includes:

sending a higher layer signaling not including configuration information to the UE, where the higher layer signaling not including the configuration information is configured to instruct the UE to determine whether the ECP slot indication is valid for the slot carrying the SSB based on a default rule; where the default rule is that the ECP slot indication is valid for the slot carrying the SSB, or the ECP slot indication is invalid for the slot carrying the SSB.

In one embodiment, sending the ECP slot indication for the preset unit length to the UE according to whether the ECP slot indication is valid for the slot carrying the SSB, includes:

in response to the ECP slot indication being valid for the slot carrying the SSB, configuring the ECP slot indication in such a way that a total quantity of sub-indications is greater than a first preset quantity; in response to the ECP slot indication being invalid for the slot carrying the SSB, configuring the ECP slot indication in such a way that the total quantity of sub-indications is not greater than the first preset quantity;

where the sub-indication is configured to indicate whether a corresponding slot is the ECP slot.

In one embodiment, the first preset quantity is a difference between a total quantity of slots within the preset unit length and a slot adjustment amount.

In one embodiment, sending the ECP slot indication for the preset unit length to the UE according to whether the ECP slot indication is valid for the slot carrying the SSB, includes:

in response to the ECP slot indication being valid for the slot carrying the SSB, configuring, for the preset unit length, a first ECP slot indication being invalid for the slot carrying the SSB, and a second ECP slot indication being valid for the slot carrying the SSB; and after sending the first ECP slot indication to the UE, sending the second ECP slot indication to the UE;

in response to the ECP slot indication being invalid for the slot carrying the SSB, configuring one ECP slot indication for the preset unit length.

In one embodiment, a sum of a total quantity of sub-indications in the first ECP slot indication and a total quantity of sub-indications in the second ECP slot indication is the total quantity of slots within the preset unit length; where the sub-indication is configured to indicate whether a corresponding slot is the ECP slot.

In one embodiment, sending the ECP slot indication for the preset unit length to the UE according to whether the ECP slot indication is valid for the slot carrying the SSB, includes:

for any preset unit length, if the ECP slot indication is invalid for the slot carrying the SSB, determining a first slot indicatable in the preset unit length according to a sequence of slots not carrying the SSB in the preset unit length and a preset indication rule, from the slots not carrying the SSB in the present unit length; if the ECP slot indication is valid for the slot carrying the SSB, determining the first slot indicatable in the preset unit length from all the slots in the preset unit length according to a sequence of all slots in the preset unit length and a preset indication rule;

determining a sub-indication corresponding to each first slot in the preset unit length based on whether each first slot in the preset unit length is an ECP slot; where the sub-indication is configured to indicate whether a corresponding slot is the ECP slot;

determining the ECP slot indication for the preset unit length based on the sub-indication corresponding to each first slot within the preset unit length.

In one embodiment, if the ECP slot indication is invalid for the slot carrying the SSB, determining the ECP slot indication based on the sub-indication corresponding to each first slot in the preset unit length, includes:

determining the ECP slot indication for the preset unit length, based on the sub-indication corresponding to each first slot in the preset unit length and remaining sub-indication(s) corresponding to part or all of first slots in a next preset unit length; and/or determining the ECP slot indication for the preset unit length, based on the sub-indication corresponding to each first slot in the preset unit length, and remaining sub-indication(s) corresponding to part or all of second slots, where the second slot is a slot other than the first slot among the slots not carrying the SSB within the preset unit length.

In one embodiment, the first slots within the preset unit length and the ECP slot indications are determined in sequential order; or both the first slots within the preset unit length and the EPC slot indications are determined in reverse order.

In one embodiment, if the ECP slot indication is valid for the slot carrying the SSB, after determining that the slot carrying the SSB is an ECP slot, the method further includes:

determining a position symbol used for NCP based on an SSB position symbol in the slot carrying the SSB.

In one embodiment, determining the position symbol used for the NCP based on the SSB position symbol in the slot carrying the SSB, includes:

determining the SSB position symbol in the slot carrying the SSB as the position symbol used for the NCP; or determining each of all position symbols in a half of slot carrying the SSB where the SSB position symbol is located as the position symbol used for the NCP.

In one embodiment, determining the position symbol used for the NCP based on the SSB position symbol in the slot carrying the SSB, further includes:

determining the position symbol of the PDCCH for sending a system broadcast message in the slot carrying the SSB as the position symbol used for the NCP.

In one embodiment, before sending the ECP slot indication of the preset unit length to the UE according to whether the ECP slot indication is valid for the slot carrying the SSB, the method further includes:

determining the slot carrying the SSB and/or the slot not carrying the SSB within the preset unit length.

Since this method is a method corresponding to the foregoing network side device, reference may be made to the foregoing embodiments for the specific implementation manner of this method, and repeated descriptions will not be omitted.

Figure 17:
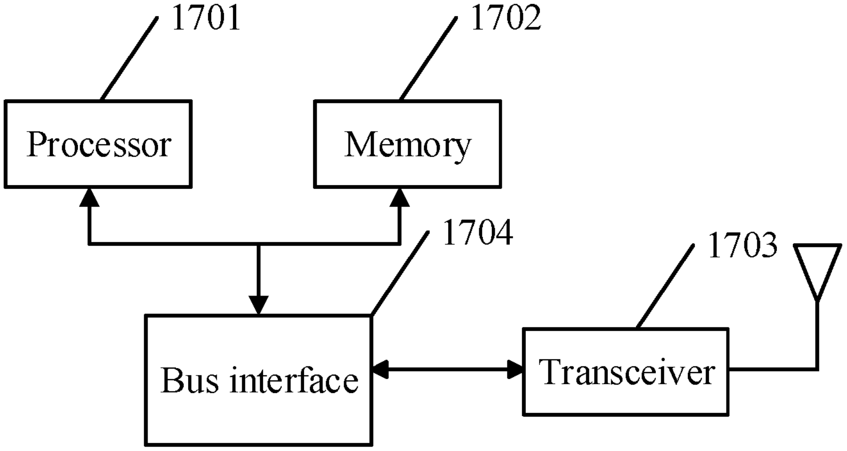
FIG. 17 is a structural diagram of a UE provided in an embodiment of the disclosure.

As shown in FIG. 17, a UE provided in this embodiment of the disclosure includes: a processor 1701, a memory 1702, a transceiver 1703 and a bus interface 1704.

The processor 1701 is responsible for managing the bus architecture and general processing. The memory 1702 can store data used by the processor 1701 when performing operations. The transceiver 1703 is configured to receive and transmit data under the control of the processor 1701.

The bus architecture may include any number of interconnected buses and bridges, various circuits including one or more processors represented by the processor 1701 and the memory represented by the memory 1702 are linked together. The bus architecture can also link together various other circuits such as peripherals, voltage regulators, and power management circuits, etc., which are well known in the art and therefore will not be further described herein. The bus interface provides the interface. The processor 1701 is responsible for managing the bus architecture and general processing, and the memory 1702 can store data used by the processor 1701 when performing operations.

The process disclosed in the embodiment of the disclosure may be applied to the processor 1701 or implemented by the processor 1701. During implementation, each step of the method for determining an ECP slot may be implemented by an integrated logic circuit of hardware in the processor 1701 or instructions in the form of software. The processor 1701 may be a general-purpose processor, a digital signal processor, an application-specific integrated circuit, a field programmable gate array or other programmable logic device, a discrete gate or transistor logic device, or a discrete hardware component, and may realize or execute the disclosed methods, steps and logical block diagrams. A general purpose processor may be a microprocessor or any conventional processor or the like. The steps of the methods disclosed in connection with the embodiments of the disclosure may be directly implemented by a hardware processor, or implemented by a combination of hardware and software modules in the processor. The software module can be in random access memory, flash memory, read-only memory, programmable read-only memory or electrically erasable programmable memory, registers and other mature storage media in this field. The storage medium is in the memory 1702, and the processor 1701 reads the information in the memory 1702, and completes the steps of the method for determining the ECP slot in combination with its hardware.

Specifically, the processor 1701 is configured to read computer instructions in the memory 1702, and perform the following operations:

determining whether the ECP slot indication is valid for a slot carrying an SSB according to an instruction from the network side device;

determining ECP slot(s) within the preset unit length sent from the network side device according to a determination result of whether the ECP slot indication is valid for the slot carrying the SSB and the ECP slot indication.

In one embodiment, determining whether the ECP slot indication is valid for the slot carrying the SSB according to the instruction from the network side device, includes:

if a higher layer signaling including configuration information sent from the network side device is received, determining whether the ECP slot indication is valid for the slot carrying the SSB according to the configuration information.

In one embodiment, determining whether the ECP slot indication is valid for the slot carrying the SSB according to the instruction from the network side device, includes:

if the higher layer signaling not including configuration information sent from the network side device is received, determining whether the ECP slot indication is valid for the slot carrying the SSB based on a default rule;

where the default rule is that the ECP slot indication is valid for the slot carrying the SSB, or the ECP slot indication is invalid for the slot carrying the SSB.

In one embodiment, determining whether the ECP slot indication is valid for the slot carrying the SSB according to the instruction from the network side device, includes:

for any preset unit length, determining whether a total quantity of sub-indications in the ECP slot indication for the preset unit length is greater than a first preset quantity; where the sub-indication is configured to indicate whether a corresponding slot is the ECP slot;

in response to the total quantity of sub-indications in the ECP slot indication for the preset unit length being greater than the first preset quantity, determining that the ECP slot indication is valid for the slot carrying the SSB; in response to the total quantity of sub-indications in the ECP slot indication for the preset unit length not being greater than the first preset quantity, determining that the ECP slot indication is invalid for the slot carrying the SSB.

In one embodiment, the first preset quantity is a difference between a total quantity of slots within the preset unit length and a slot adjustment amount.

In one embodiment, determining whether the ECP slot indication is valid for the slot carrying the SSB according to the instruction from the network side device, includes:

for any preset unit length, if one ECP slot indication corresponding to the preset unit length is received, determining that the ECP slot indication is invalid for the slot carrying the SSB;

if two ECP slot indications corresponding to the preset unit length are received, determining that the first ECP slot indication is invalid for the slot carrying the SSB, and the second ECP slot indication is valid for the slot carrying the SSB.

In one embodiment, a sum of the total quantity of sub-indications in the first ECP slot indication and the total quantity of sub-indications in the second ECP slot indication is the total quantity of slots within the preset unit length; where the sub-indication is configured to indicate whether a corresponding slot is the ECP slot.

In one embodiment, determining the ECP slot(s) within the preset unit length sent from the network side device according to the determination result of whether the ECP slot indication is valid for the slot carrying the SSB and the ECP slot indication, includes:

for any preset unit length, if the ECP slot indication is invalid for the slot carrying the SSB, determining a first slot indicatable in the preset unit length according to a sequence of slots not carrying the SSB in the preset unit length and a preset indication rule, from the slots not carrying the SSB in the preset unit length; if the ECP slot indication is valid for the slot carrying the SSB, determining the first slot indicatable in the preset unit length from all slots in the preset unit length according to a sequence of the all slots in the preset unit length and the preset indication rule;

determining the sub-indication corresponding to each first slot in the preset unit length according to a sequence of first slots in the preset unit length and the ECP slot indication for the preset unit length; where the ECP slot indication includes a plurality of sub-indications, and the sub-indication is configured to indicate whether a corresponding slot is the ECP slot;

for any first slot within the preset unit length, if the sub-indication indicates that the corresponding slot is an ECP slot, determining the first slot as an ECP slot.

In one embodiment, if the ECP slot indication is invalid for the slot carrying the SSB, and the total quantity of sub-indications in the ECP slot indication of the preset unit length is greater than the total quantity of first slots within the preset unit length, the operations further include:

determining remaining sub-indication(s) corresponding to part or all of first slots in a next preset unit length according to a sequence of the first slots in the next preset unit length; and/or determining remaining sub-indication(s) corresponding to part or all of second slots according to a sequence of the second slots in the preset unit length, and the second slot is other than the first slot among the slots not carrying the SSB within the preset unit length;

where the remaining sub-indication is a sub-indication with no corresponding the first slot in the ECP slot indication for the preset unit length.

In one embodiment, the first slot within the preset unit length and the sub-indication corresponding to each first slot are determined in sequential order; or the first slot within the preset unit length and the sub-indication corresponding to each first slot are determined in reverse order.

In one embodiment, if the ECP slot indication is valid for the slot carrying the SSB, after determining the slot carrying the SSB as an ECP slot, the operation further includes:

determining a position symbol used for NCP based on a SSB position symbol in the slot carrying the SSB.

In one embodiment, determining the position symbol used for the NCP based on the SSB position symbol in the slot carrying the SSB, includes:

determining the SSB position symbol in the slot carrying the SSB as the position symbol used for the NCP; or determining each of all position symbols in a half of the slot carrying the SSB where the SSB position symbol is located as the position symbol used for the NCP.

In one embodiment, determining the position symbol used for the NCP based on the SSB position symbol in the slot carrying the SSB, and the operation further includes:

determining the position symbol of the PDCCH for sending a system broadcast message in the slot carrying the SSB as the position symbol used for the NCP.

In one embodiment, before determining the ECP slot(s) within the preset unit length sent from the network side device according to the determination result of whether the ECP slot indication is valid for the slot carrying the SSB and the ECP slot indication, the operation further includes:

determining the slot carrying the SSB and/or the slot not carrying the SSB within the preset unit length.

Figure 18:
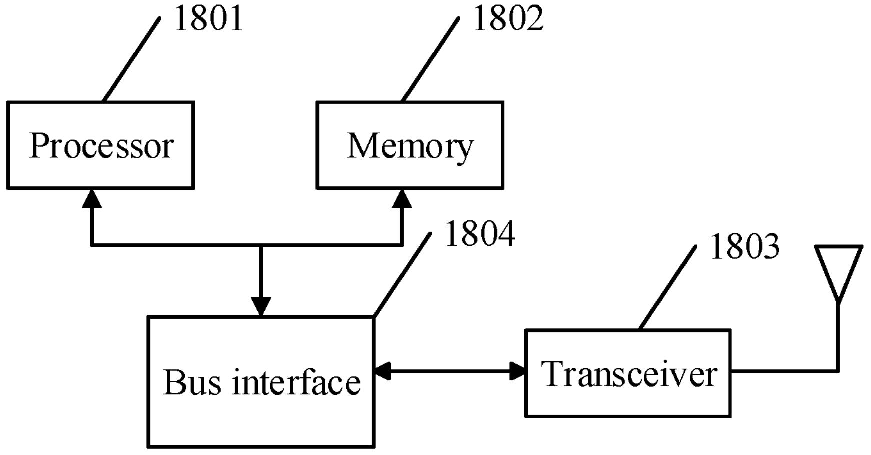
FIG. 18 is a structural diagram of a network side device provided in an embodiment of the disclosure.

As shown in FIG. 18, a network side device provided by the embodiment of the disclosure includes: a processor 1801, a memory 1802, a transceiver 1803 and a bus interface 1804.

The processor 1801 is responsible for managing the bus architecture and general processing. The memory 1802 can store data used by the processor 1801 when performing operations. The transceiver 1803 is configured to receive and transmit data under the control of the processor 1801.

The bus architecture may include any number of interconnected buses and bridges, various circuits including one or more processors represented by the processor 1801 and the memory represented by the memory 1802 are linked together. The bus architecture can also link together various other circuits such as peripherals, voltage regulators, and power management circuits, etc., which are well known in the art and therefore will not be further described herein. The bus interface provides the interface. The processor 1801 is responsible for managing the bus architecture and general processing, and the memory 1802 can store data used by the processor 1801 when performing operations.

The processes disclosed in the embodiments of the disclosure may be applied to the processor 1801 or implemented by the processor 1801. In the implementation process, each step of the method for determining the ECP slot may be completed by an integrated logic circuit of hardware in the processor 1801 or instructions in the form of software. The processor 1801 may be a general-purpose processor, a digital signal processor, an application-specific integrated circuit, a field programmable gate array or other programmable logic device, a discrete gate or transistor logic device, or a discrete hardware component, and may realize or execute the disclosed methods, steps and logical block diagrams. A general purpose processor may be a microprocessor or any conventional processor or the like. The steps of the methods disclosed in connection with the embodiments of the disclosure may be directly implemented by a hardware processor, or implemented by a combination of hardware and software modules in the processor. The software module can be located in a mature storage medium in the field such as random access memory, flash memory, read-only memory, programmable read-only memory or electrically erasable programmable memory, register. The storage medium is located in the memory 1802, and the processor 1801 reads the information in the memory 1802, and completes the steps of the method for determining the ECP slot in combination with its hardware.

Specifically, the processor 1801 is configured to read computer instructions in the memory 1802, and perform the following operations:

sending an ECP slot indication for a preset unit length to the UE according to whether the ECP slot indication is valid for a slot carrying an SSB.

In one embodiment, the operations further include:

sending a higher layer signaling including configuration information to the UE;

where the configuration information indicates that the ECP slot indication is valid for the slot carrying the SSB; or the configuration information indicates that the ECP slot indication is invalid for the slot carrying the SSB.

In one embodiment, the operations further include:

sending a higher layer signaling not including configuration information to the UE, where the higher layer signaling not including configuration information is configured to instruct the UE to determine whether the ECP slot indication is valid for the slot carrying the SSB based on a default rule; where the default rule is that the ECP slot indication is valid for the slot carrying the SSB, or the ECP slot indication is invalid for the slot carrying the SSB.

In one embodiment, sending the ECP slot indication for the preset unit length to the UE according to whether the ECP slot indication is valid for the slot carrying the SSB, includes:

in response to the ECP slot indication being valid for the slot carrying the SSB, configuring the ECP slot indication in such a way that a total quantity of sub-indications is greater than a first preset quantity; in response to the ECP slot indication being invalid for the slot carrying the SSB, configuring the ECP slot indication in such a way that the total quantity of sub-indications is not greater than the first preset quantity;

where the sub-indication is configured to indicate whether a corresponding slot is the ECP slot.

In one embodiment, the first preset quantity is a difference between a total quantity of slots within the preset unit length and a slot adjustment amount.

In one embodiment, sending the ECP slot indication for a preset unit length to the UE according to whether the ECP slot indication is valid for the slot carrying the SSB, includes:

if the ECP slot indication is valid for the slot carrying the SSB, configuring, for the preset unit length, a first ECP slot indication being invalid for the slot carrying the SSB, and a second ECP slot indication being valid for the slot carrying the SSB; and after sending the first ECP slot indication to the UE, sending the second ECP slot indication to the UE;

if the ECP slot indication is invalid for the slot carrying the SSB, configuring one ECP slot indication for the preset unit length.

In one embodiment, a sum of the total quantity of sub-indications in the first ECP slot indication and the total quantity of sub-indications in the second ECP slot indication is the total quantity of slots within the preset unit length; where the sub-indication is configured to indicate whether a corresponding slot is the ECP slot.

In one embodiment, sending the ECP slot indication for the preset unit length to the UE according to whether the ECP slot indication is valid for the slot carrying the SSB, includes:

for any preset unit length, if the ECP slot indication is invalid for the slot carrying the SSB, determining the first slot indicatable in the preset unit length according to a sequence of slots not carrying the SSB in the preset unit length and the preset indication rule, from the slots not carrying the SSB in the preset unit length; if the ECP slot indication is valid for the slot carrying the SSB, determining the first slot indicatable in the preset unit length from all slots in the preset unit length according to a sequence of all slots in the preset unit length and the preset indication rule;

determining a sub-indication corresponding to each first slot in the preset unit length based on whether each first slot in the preset unit length is an ECP slot; where the sub-indication is configured to indicate a corresponding slot whether the slot is an ECP slot;

determining the ECP slot indication for the preset unit length based on the sub-indication corresponding to each first slot within the preset unit length.

In one embodiment, if the ECP slot indication is invalid for the slot carrying the SSB, determining the ECP slot indication based on the sub-indication corresponding to each first slot in the preset unit length, includes:

determining the ECP slot indication for the preset unit length based on the sub-indication corresponding to each first slot in the preset unit length and the remaining sub-indication(s) corresponding to part or all of first slots in a next preset unit length slot indication; and/or determining the ECP slot indication for the preset unit length based on the sub-indication corresponding to each first slot in the preset unit length, and the remaining sub-indication(s) corresponding to part or all of second slots, where the second slot is a slot other than the first slot among the slots not carrying the SSB within the preset unit length.

In one embodiment, the first slot within the preset unit length and the ECP slot indication are determined in sequential order; or both the first slot within the preset unit length and the ECP slot indication are determined in reverse order.

In one embodiment, if the ECP slot indication is valid for a slot carrying the SSB, after determining that the slot carrying the SSB is an ECP slot, the operation further includes:

determining a position symbol used for the NCP based on a SSB position symbol in the slot carrying the SSB.

In one embodiment, determining the position symbol used for the NCP based on the SSB position symbol in the slot carrying the SSB, includes:

determining the SSB position symbol in the slot carrying the SSB as the position symbol used for the NCP; or determining each of all position symbols in a half of the slot carrying the SSB where the SSB position symbol is located as the position symbol used for the NCP.

In one embodiment, determining the position symbol used for the NCP based on the SSB position symbol in the slot carrying the SSB, and the operation further includes:

determining the position symbol of the PDCCH for sending the system broadcast message in the slot carrying the SSB as the position symbol used for the NCP.

In one embodiment, before sending the ECP slot indication for the preset unit length to the UE according to whether the ECP slot indication is valid for the slot carrying the SSB, the operation further includes:

determining the slot carrying the SSB and/or the slot not carrying the SSB within the preset unit length.

Figure 19:
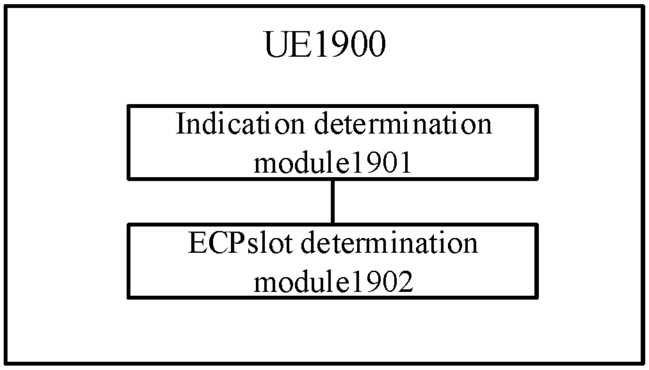
FIG. 19 is another structural diagram of a UE provided in an embodiment of the disclosure.

As shown in FIG. 19, a UE 1900 provided in the embodiment of this disclosure includes:

an indication determination module 1901, configured to determine whether the ECP slot indication is valid for a slot carrying an SSB according to an instruction from the network side device; and/or an ECP slot determination module 1902, configured to determine the ECP slot(s) within the preset unit length sent from the network side device according to a determination result of whether the ECP slot indication is valid for the slot carrying the SSB and the ECP slot indication.

In one embodiment, the indication determination module 1901 determining whether the ECP slot indication is valid for the slot carrying the SSB according to the instruction from the network side device, includes:

if a higher layer signaling including configuration information sent from the network side device is received, determining whether the ECP slot indication is valid for the slot carrying the SSB according to the configuration information.

In one embodiment, the indication determination module 1901 determining whether the ECP slot indication is valid for the slot carrying the SSB according to the instruction from the network side device, includes:

if the higher layer signaling sent from the network side device does not include configuration information, determining whether the ECP slot indication is valid for the slot carrying the SSB based on a default rule;

where the default rule is that the ECP slot indication is valid for the slot carrying the SSB, or the ECP slot indication is invalid for the slot carrying the SSB.

In one embodiment, the indication determination module 1901 determining whether the ECP slot indication is valid for the slot carrying the SSB according to the instruction from the network side device, includes:

for any preset unit length, determining whether a total quantity of sub-indications in the ECP slot indication for the preset unit length is greater than a first preset quantity; where the sub-indication is configured to indicate whether a corresponding slot is the ECP slot;

in response to the total quantity of sub-indications in the ECP slot indication for the preset unit length being greater than the first preset quantity, determining that the ECP slot indication is valid for the slot carrying the SSB; in response to the total quantity of sub-indications in the ECP slot indication for the preset unit length not being greater than the first preset quantity, determining that the ECP slot indication is invalid for the slot carrying the SSB.

In one embodiment, the first preset quantity is a difference between a total quantity of slots within the preset unit length and a slot adjustment amount.

In one embodiment, the indication determination module 1901 determining whether the ECP slot indication is valid for the slot carrying the SSB according to the instruction from the network side device, includes:

for any preset unit length, if one ECP slot indication corresponding to the preset unit length is received, determining that the ECP slot indication is invalid for the slot carrying the SSB;

if two ECP slot indications corresponding to the preset unit length are received, determining that the first ECP slot indication is invalid for the slot carrying the SSB, and the second ECP slot indication is valid for the slot carrying the SSB.

In one embodiment, a sum of a total quantity of sub-indications in the first ECP slot indication and a total quantity of sub-indications in the second ECP slot indication is the total quantity of slots within the preset unit length; where the sub-indication is configured to indicate whether a corresponding slot is the ECP slot.

In one embodiment, the ECP slot determination module 1902 determining the ECP slot(s) within the preset unit length sent from the network side device according to the determination result of whether the ECP slot indication is valid for the slot carrying the SSB and the ECP slot indication, includes:

for any preset unit length, if the ECP slot indication is invalid for the slot carrying the SSB, determining the first slot indicatable in the preset unit length according to a sequence of slots not carrying the SSB in the preset unit length and the preset indication rule, from the slots not carrying the SSB in the preset unit length; if the ECP slot indication is valid for the slot carrying the SSB, determining the first slot indicatable in the preset unit length from all slots in the preset unit length according to a sequence of the all slots in the preset unit length and the preset indication rule;

determining the sub-indication corresponding to each first slot in the preset unit length according to a sequence of first slots in the preset unit length and the ECP slot indication for the preset unit length; where the ECP slot indication includes a plurality of sub-indications, and the sub-indication is configured to indicate whether a corresponding slot is the ECP slot;

for any first slot within the preset unit length, if the sub-indication is valid for that the corresponding slot is the ECP slot, determining the first slot as the ECP slot.

In one embodiment, if the ECP slot indication is invalid for the slot carrying the SSB, and the total quantity of sub-indications in the ECP slot indication of the preset unit length is greater than the total quantity of first slots in the preset unit length, the EPC slot determination module 1902 is further configured to:

determine remaining sub-indication(s) corresponding to part or all of first slots in a next preset unit length according to a sequence of the first slots in the next preset unit length; and/or determine remaining sub-indication(s) corresponding to part or all of second slots according to a sequence of the second slots in the preset unit length, where the second slots are slots other than the first slot among the slots not carrying the SSB within the preset unit length;

where the remaining sub-indication is the sub-indication with no corresponding first slot in the ECP slot indication for the preset unit length.

In one embodiment, the first slots within the preset unit length and the sub-indication corresponding to each first slot are determined in sequential order; or the first slots within the preset unit length and the sub-indication corresponding to each first slot are determined in reverse order.

In one embodiment, if the ECP slot indication is valid for the slot carrying the SSB, after the ECP slot determining module 1902 determines the slot carrying the SSB as the ECP slot, it is further configured to:

determine a position symbol used for the NCP based on an SSB position symbol in the slot carrying the SSB.

In one embodiment, the ECP slot determining module 1902 determining the position symbol used for the NCP based on the SSB position symbol in the slot carrying the SSB, includes:

determining the SSB position symbol in the slot carrying the SSB as the position symbol used for the NCP; or determining each of all position symbols in a half of the slot carrying the SSB where the SSB position symbol is located as the position symbols used for the NCP.

In one embodiment, the ECP slot determination module 1902 determines the position symbol used for the NCP based on the SSB position symbol in the slot carrying the SSB, further including:

determining a position symbol of the PDCCH for sending a system broadcast message in the slot carrying the SSB as the position symbol used for the NCP.

In one embodiment, before determining the ECP slot for the preset unit length sent from the network side device according to the determination result of whether the ECP slot indication is valid for the slot carrying the SSB and the ECP slot indication, the ECP slot determination module 1902 is further configured to:

determine the slot carrying the SSB and/or the slot not carrying the SSB within the preset unit length.

Figure 20:
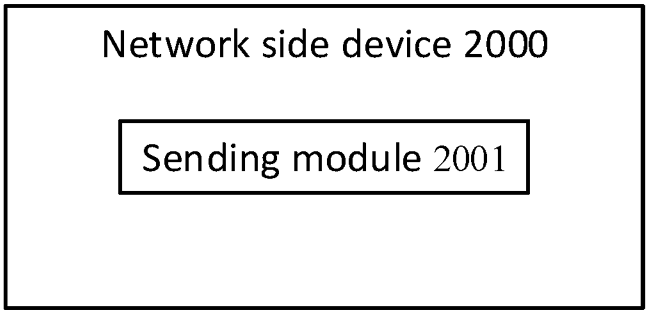
FIG. 20 is another structural diagram of a network side device provided by an embodiment of the disclosure.

As shown in FIG. 20, a network side device 2000 provided in the embodiment of the disclosure includes:

a sending module 2001 configured to send an ECP slot indication for a preset unit length to the UE according to whether the ECP slot indication is valid for a slot carrying an SSB.

In one embodiment, the sending module 2001 is further configured to:

send a higher layer signaling including configuration information to the UE;

where the configuration information indicates that the ECP slot indication is valid for the slot carrying the SSB; or the configuration information indicates that the ECP slot indication is invalid for the slot carrying the SSB.

In one embodiment, the sending module 2001 is further configured to:

send a higher layer signaling not including configuration information to the UE, where the higher layer signaling not including the configuration information is configured to instruct the UE to determine whether the ECP slot indication is valid for the slot carrying the SSB based on a default rule; where the default rule is that the ECP slot indication is valid for the slot carrying the SSB, or the ECP slot indication is invalid for the slot carrying the SSB.

In one embodiment, the sending module 2001 sending the ECP slot indication for the preset unit length to the UE according to whether the ECP slot indication is valid for the slot carrying the SSB, includes:

in response to determining that the ECP slot indication is valid for the slot carrying the SSB, configuring the ECP slot indication in such a way that a total quantity of sub-indications is greater than a first preset quantity; in response to determining that the ECP slot indication is invalid for the slot carrying the SSB, configuring ECP slot indication in such a way that the total quantity of sub-indications is not greater than the first preset quantity;

where the sub-indication is configured to indicate whether a corresponding slot is the ECP slot.

In one embodiment, the first preset quantity is a difference between a total quantity of slots within the preset unit length and a slot adjustment amount.

In one embodiment, the sending module 2001 sending the ECP slot indication for the preset unit length to the UE according to whether the ECP slot indication is valid for the slot carrying the SSB, includes:

if it is determined that the ECP slot indication is valid for the slot carrying the SSB, configuring, for the preset unit length, a first ECP slot indication being invalid for the slot carrying the SSB, and a second ECP slot indication being valid for the slot carrying the SSB; and after sending the first ECP slot indication to the UE, sending the second ECP slot indication to the UE;

if it is determined that the ECP slot indication is invalid for the slot carrying the SSB, configuring one ECP slot indication for the preset unit length.

In one embodiment, a sum of a total quantity of sub-indications in the first ECP slot indication and a total quantity of sub-indications in the second ECP slot indication is the total quantity of slots within the preset unit length; where the sub-indication is configured to indicate whether a corresponding slot is the ECP slot.

In one embodiment, the sending module 2001 sending the ECP slot indication for the preset unit length to the UE according to whether the ECP slot indication is valid for the slot carrying the SSB, includes:

for any preset unit length, if the ECP slot indication is invalid for the slot carrying the SSB, determining the first slot indicatable in the preset unit length according to a sequence of slots not carrying the SSB in the preset unit length and the preset indication rule, from the slots not carrying the SSB in the preset unit length; if the ECP slot indication is valid for the slot carrying the SSB, determining the first slot indicatable in the preset unit length from all slots in the preset unit length according to a sequence of the all slots in the preset unit length and the preset indication rule;

determining a sub-indication corresponding to each first slot in the preset unit length based on a determination result of whether each first slot in the preset unit length is the ECP slot; where the sub-indication is configured to indicate whether the corresponding slot is an ECP slot;

determining the ECP slot indication for the preset unit length based on the sub-indication corresponding to each first slot within the preset unit length.

In one embodiment, if the ECP slot indication is invalid for the slot carrying the SSB, the sending module 2001 determining the ECP slot indication for the preset unit length according to the sub-indication corresponding to each first slot within the preset unit length, includes:

determining the ECP slot indication for the preset unit length based on the sub-indication corresponding to each first slot in the preset unit length and remaining sub-indication(s) corresponding to part or all of first slots in a next preset unit length; and/or determining the ECP slot indication for the preset unit length based on the sub-indication corresponding to each first slot in the preset unit length, and remaining sub-indication(s) corresponding to part or all of second slots within the preset unit length, where the second slot is a slot other than the first slot among the slots not carrying the SSB within the preset unit length.

In one embodiment, the first slots within the preset unit length and the ECP slot indication are determined in sequential order; or the first slots within the preset unit length and the ECP slot indication are determined in reverse order.

In one embodiment, if the ECP slot indication is valid for the slot carrying the SSB, after the sending module 2001 determines that the slot carrying the SSB is the ECP slot, the sending module 2001 is further configured to:

determine a position symbol used for the NCP based on a SSB position symbol in the slot carrying the SSB.

In one embodiment, the sending module 2001 determining the position symbol used for the NCP based on the SSB position symbol in the slot carrying the SSB, includes:

determining the SSB position symbol in the slot carrying the SSB as the position symbol used for the NCP; or determining each of all position symbols in a half of the slot carrying the SSB where the SSB position symbol is located as the position symbol used for the NCP.

In one embodiment, the sending module 2001 determining the position symbol used for the NCP based on the SSB position symbol in the slot carrying the SSB, further includes:

determining a position symbol of the PDCCH for sending a system broadcast message in the slot carrying the SSB as the position symbol used for the NCP.

In one embodiment, before the sending module 2001 sends the ECP slot indication for the preset unit length to the UE according to whether the ECP slot indication is valid for the slot carrying the SSB, the sending module 2001 is further configured to:

determine the slot carrying the SSB and/or the slot not carrying the SSB within the preset unit length.

An embodiment of the disclosure provides a storage medium, which stores computer-executable instructions, and the computer-executable instructions are used to cause a computer to execute the method for determining an ECP slot as executed by the above UE.

An embodiment of the disclosure provides a storage medium, which stores computer-executable instructions, and the computer-executable instructions are used to cause a computer to execute the method for determining an ECP slot as executed by the network side device.

The above-mentioned storage medium can be any available medium or data storage device that can be accessed by a computer, including but not limited to magnetic storage (such as floppy disk, hard disk, magnetic tape, magneto-optical disk (MO), etc.), optical storage (such as CD, DVD, BD, HVD, etc.), and semiconductor memory (such as ROM, EPROM, EEPROM, non-volatile memory (NAND FLASH), solid state disk (SSD)) and the like.

Any of the solutions above, in addition to being applied to determining the ECP slot, can also be applied to determining other types of slot, and the specific implementation methods are similar, and will not be repeated here.

The disclosure is described above with reference to block diagrams and/or flowcharts illustrating methods, apparatus (systems) and/or computer program products according to embodiments of the disclosure. It will be understood that one block of the block diagrams and/or flowchart illustrations, and combinations of blocks in the block diagrams and/or flowchart illustrations, can be implemented by computer program instructions. These computer program instructions may be provided to a processor of a general purpose computer, a special purpose computer and/or other programmable data processing apparatus to produce a machine and instructions executed via the computer processor and/or other programmable data processing apparatus create a means of implementing the functions/acts specified in the block diagrams and/or flowchart blocks.

Accordingly, the disclosure may also be implemented in hardware and/or software (including firmware, resident software, microcode, etc.). Still further, the disclosure may take the form of a computer program product on a computer-usable or computer-readable storage medium having computer-usable or computer-readable program code embodied in the medium for use by an instruction execution system or Used in conjunction with command execution systems. In the context of this disclosure, a computer-usable or computer-readable medium may be any medium that may include, store, communicate, transmit, or convey a program for use by an instruction execution system, apparatus or equipment, or used in connection with, an instruction execution system, apparatus, or equipment.

What is claimed is:

1. A method for determining an Extend Cyclic Prefix, ECP, slot, performed by a user equipment, UE, and comprising:

determining whether an ECP slot indication is valid for a slot carrying a Synchronous Signaling Block, SSB, according to an instruction from a network side device; and determining whether an ECP slot, from all slots corresponding to the ECP slot indication which is for a preset time unit length, is sent from the network side device according to a determination result of whether the ECP slot indication is valid for the slot carrying the SSB and the ECP slot indication;

wherein the determining whether the ECP slot indication is valid for the slot carrying the SSB according to the instruction from the network side device, comprises:

for any preset time unit length, in response to receiving one ECP slot indication corresponding to the preset time unit length, determining that the ECP slot indication is invalid for the slot carrying the SSB; or in response to receiving two ECP slot indications corresponding to the preset time unit length, determining that a first ECP slot indication is invalid for the slot carrying the SSB, and a second ECP slot indication is valid for the slot carrying the SSB.

2. The method according to claim 1, wherein the determining whether the ECP slot indication is valid for the slot carrying the SSB according to the instruction from the network side device, comprises:

in response to receiving a higher layer signaling comprising configuration information from the network side device, determining whether the ECP slot indication is valid for the slot carrying the SSB according to the configuration information.

3. The method according to claim 1, wherein the determining whether the ECP slot indication is valid for the slot carrying the SSB according to the instruction from the network side device, comprises:

in response to receiving a higher layer signaling not comprising configuration information from the network side device, determining whether the ECP slot indication is valid for the slot carrying the SSB based on a default rule;

wherein the default rule is that the ECP slot indication is valid for the slot carrying the SSB, or the ECP slot indication is invalid for the slot carrying the SSB.

4. The method according to claim 1, wherein the determining whether the ECP slot indication is valid for the slot carrying the SSB according to the instruction from the network side device, comprises:

for any preset time unit length, determining whether a total quantity of sub-indications in the ECP slot indication for the preset time unit length is greater than a first preset quantity; wherein the sub-indication is used to indicate whether a corresponding slot is the ECP slot; and in response to the total quantity of sub-indications in the ECP slot indication for the preset time unit length being greater than the first preset quantity, determining that the ECP slot indication is valid for the slot carrying the SSB; in response to the total quantity of sub-indications in the ECP slot indication for the preset time unit length not being greater than the first preset quantity, determining that the ECP slot indication is invalid for the slot carrying the SSB.

5. The method according to claim 4, wherein the first preset quantity is a difference between a total quantity of slots within the preset time unit length and a slot adjustment amount.

6. The method according to claim 1, wherein a sum of a total quantity of sub-indications in the first ECP slot indication and a total quantity of sub-indications in the second ECP slot indication is a total quantity of slots within the preset time unit length; wherein the sub-indication is used to indicate whether a corresponding slot is the ECP slot.

7. The method according to claim 1, wherein the determining the ECP slot, from all slots corresponding to the ECP slot indication which is for the preset time unit length, is sent from the network side device according to the determination result of whether the ECP slot indication is valid for the slot carrying the SSB and the ECP slot indication, comprising:

for any preset time unit length:

in response to that the ECP slot indication is invalid for the slot carrying the SSB, determining, from slots not carrying the SSB within the preset time unit length, a first slot indicatable within the preset time unit length according to a sequence of the slots not carrying the SSB within the preset time unit length and a preset indication rule;

in response to that the ECP slot indication is valid for the slot carrying the SSB, determining, from all slots within the preset time unit length, the first slot indicatable within the preset time unit length according to a sequence of the all slots within the preset time unit length and the preset indication rule;

determining a sub-indication corresponding to each first slot within the preset time unit length according to a sequence of first slots within the preset time unit length and the ECP slot indication for the preset time unit length; wherein the ECP slot indication comprises a plurality of sub-indications, and the sub-indication is used to indicate whether a corresponding slot is the ECP slot; and for any first slot within the preset time unit length, in response to the sub-indication indicating that the corresponding slot is the ECP slot, determining that the first slot is the ECP slot.

8. The method according to claim 7, wherein if the ECP slot indication is invalid for the slot carrying the SSB, and a total quantity of sub-indications in the ECP slot indication for the preset time unit length is greater than a total quantity of first slots within the preset time unit length, the method further comprises:

determining a remaining sub-indication corresponding to part or all of first slots within a next preset time unit length according to a sequence of the first slots within the next preset time unit length; and/or determining a remaining sub-indication corresponding to part or all of second slots according to a sequence of the second slots within the preset time unit length, wherein the second slot is a slot other than the first slot among the slots not carrying the SSB in the preset time unit length;

wherein the remaining sub-indication is a sub-indication with no corresponding first slot in the ECP slot indication for the preset time unit length.

9. The method according to claim 7, wherein if the ECP slot indication is valid for the slot carrying the SSB, after determining the slot carrying the SSB as the ECP slot, the method further comprises:

determining a position symbol used for Normal Cyclic Prefix, NCP, based on an SSB position symbol in the slot carrying the SSB.

10. The method according to claim 9, wherein the determining the position symbol used for the NCP based on the SSB position symbol in the slot carrying the SSB, comprises:

determining the SSB position symbol in the slot carrying the SSB as the position symbol used for the NCP; or determining each of all position symbols in a half, where the SSB position symbol is located, of the slot carrying the SSB as the position symbol used for the NCP.

11. A method for determining an Extend Cyclic Prefix, ECP, slot, performed by a network side device, and comprising:

sending an ECP slot indication which is for a preset time unit length to a User Equipment, UE, according to whether the ECP slot indication is valid for a slot carrying a Synchronous Signaling Block, SSB;

wherein the sending the ECP slot indication for the preset time unit length to the UE according to whether the ECP slot indication is valid for the slot carrying the SSB, comprises:

in response to the ECP slot indication being valid for the slot carrying the SSB, configuring, for the preset time unit length, a first ECP slot indication being invalid for the slot carrying the SSB, and a second ECP slot indication being valid for the slot carrying the SSB; and sending the second ECP slot indication to the UE after sending the first ECP slot indication to the UE; or in response to the ECP slot indication being invalid for the slot carrying the SSB, configuring one ECP slot indication for the preset time unit length.

12. The method according to claim 11, further comprising:

sending a higher layer signaling comprising configuration information to the UE;

wherein the configuration information indicates that the ECP slot indication is valid for the slot carrying the SSB; or the configuration information indicates that the ECP slot indication is invalid for the slot carrying the SSB.

13. The method according to claim 11, further comprising:

sending a higher layer signaling not comprising configuration information to the UE, and the higher layer signaling not comprising the configuration information is used to instruct the UE to determine whether the ECP slot indication is valid for the slot carrying the SSB based on a default rule;

wherein the default rule is that the ECP slot indication is valid for the slot carrying the SSB, or the ECP slot indication is invalid for the slot carrying the SSB.

14. The method according to claim 11, wherein the sending the ECP slot indication for the preset time unit length to the UE according to whether the ECP slot indication is valid for the slot carrying the SSB, comprises:

in response to that the ECP slot indication is valid for the slot carrying the SSB, configuring the ECP slot indication in such a way that a total quantity of sub-indications in the ECP slot indication is greater than a first preset quantity; in response to that the ECP slot indication is invalid for the slot carrying the SSB, configuring the ECP slot indication in such a way that the total quantity of sub-indications is not greater than the first preset quantity;

wherein the sub-indication is used to indicate whether a corresponding slot is the ECP slot.

15. The method according to claim 11, wherein the sending the ECP slot indication for the preset unit length to the UE according to whether the ECP slot indication is valid for the slot carrying the SSB, comprises:

for any preset time unit length:

in response to the ECP slot indication being invalid for the slot carrying the SSB, determining, from slots not carrying the SSB within the preset time unit length, a first slot indicatable within the preset time unit length according to a sequence of the slots not carrying the SSB within the preset time unit length and a preset indication rule;

in response to the ECP slot indication being valid for the slot carrying the SSB, determining, from all slots within the preset time unit length, the first slot indicatable within the preset time unit length according to a sequence of the all slots within the preset time unit length and the preset indication rule;

determining a sub-indication corresponding to each first slot within the preset time unit length based on whether each first slot within the preset time unit length is the ECP slot; wherein the sub-indication is used to indicate whether a corresponding slot is the ECP slot; and determining the ECP slot indication for the preset time unit length based on the sub-indication corresponding to each first slot within the preset time unit length.

16. The method according to claim 15, wherein if the ECP slot indication is valid for the slot carrying the SSB, after determining that the slot carrying the SSB is the ECP slot, the method further comprises:

determining a position symbol used for Normal Cyclic Prefix, NCP, based on an SSB position symbol in the slot carrying the SSB.

17. A network side device, comprises a processor and a memory; wherein the memory stores computer instructions;

the processor is configured to read the computer instructions and perform the method according claim 11.

18. A user equipment, UE, comprises a processor and a memory; wherein the memory is configured to store computer instructions;

the processor is configured to read the computer instructions and perform following operations:

determining whether an Extend Cyclic Prefix, ECP slot indication is valid for a slot carrying a Synchronous Signaling Block, SSB, according to an instruction from a network side device; and determining whether an ECP slot, from all slots corresponding to the ECP slot indication which is for a preset time unit length, is sent from the network side device according to a determination result of whether the ECP slot indication is valid for the slot carrying the SSB and the ECP slot indication;

wherein the determining whether the ECP slot indication is valid for the slot carrying the SSB according to the instruction from the network side device, comprises:

for any preset time unit length, in response to receiving one ECP slot indication corresponding to the preset time unit length, determining that the ECP slot indication is invalid for the slot carrying the SSB; or in response to receiving two ECP slot indications corresponding to the preset time unit length, determining that a first ECP slot indication is invalid for the slot carrying the SSB, and a second ECP slot indication is valid for the slot carrying the SSB.

* * * * *